US012404449B2

(12) United States Patent
Elder et al.

(10) Patent No.: US 12,404,449 B2
(45) Date of Patent: Sep. 2, 2025

(54) SEQUENTIAL SYNTHESIS TECHNIQUE FOR DEPOSITION OF ALIGNED ORGANIC ELECTRO-OPTIC MATERIALS

(71) Applicants: University of Washington, Seattle, WA (US); NLM Photonics, Seattle, WA (US)

(72) Inventors: Delwin L. Elder, Seattle, WA (US); Larry R. Dalton, III, Seattle, WA (US); Lewis E. Johnson, Seattle, WA (US); Scott R. Hammond, Seattle, WA (US); Bruce H. Robinson, Seattle, WA (US); Kevin M. O'Malley, Seattle, WA (US)

(73) Assignees: University of Washington, Seattle, WA (US); NLM Photonics, Seattle, WA (US)

( * ) Notice: Subject to any disclaimer, the term of this patent is extended or adjusted under 35 U.S.C. 154(b) by 274 days.

(21) Appl. No.: 18/334,294

(22) Filed: Jun. 13, 2023

(65) Prior Publication Data
US 2023/0399564 A1    Dec. 14, 2023

Related U.S. Application Data

(60) Provisional application No. 63/351,772, filed on Jun. 13, 2022.

(51) Int. Cl.
*C09K 9/02* (2006.01)
(52) U.S. Cl.
CPC ........ *C09K 9/02* (2013.01); *C09K 2211/1033* (2013.01); *C09K 2211/104* (2013.01);
(Continued)

(58) Field of Classification Search
CPC ............... C09K 9/02; C09K 2211/104; C09K 2211/1033; C09K 2211/1059; C09K 2211/1088; C09K 2211/1096
See application file for complete search history.

(56) References Cited

U.S. PATENT DOCUMENTS 7,268,188 B2    9/2007 Jen

OTHER PUBLICATIONS

Victoria Peddie, Jack Anderson, Joanne E. Harvey, Gerald J. Smith, and Andrew Kay, Synthesis and Solution Aggregation Studies of a Suite of Mixed Neutral and Zwitterionic Chromophores for Second-Order Nonlinear Optics, J. Org. Chem. 2014, 79, 10153-10169. (Year: 2014).*

(Continued)

*Primary Examiner* — Bijan Ahvazi
(74) *Attorney, Agent, or Firm* — CHRISTENSEN O'CONNOR JOHNSON KINDNESS PLLC

(57) ABSTRACT

Disclosed are organic electrooptic materials. The electrooptic materials are functionalized by novel methods and structures. The electrooptic materials are structured with a head and a tail where the head and tail sequentially assemble into a non-centrosymmetric ordered array. The electrooptic materials are further structured in covalently bonded dimer pairs where one of the pairs is zwitterionic. The non-centrosymmetric ordered array bonds directly to electrodes which allows for efficient application of the electric field. The organic electrooptic materials disclosed offer greater hyperpolarizability, greater bandwidth, reduced operating voltage with less optical loss.

20 Claims, 31 Drawing Sheets
(13 of 31 Drawing Sheet(s) Filed in Color)

(52) U.S. Cl.
CPC ............. C09K 2211/1059 (2013.01); C09K 2211/1088 (2013.01); C09K 2211/1096 (2013.01)

(56) References Cited

OTHER PUBLICATIONS

Dalton, L., et al., "Polymeric Electro-Optic Modulators: From Chromophore Design to Integration to Integration with Semiconductor Very Large-Scale Integration Electronics and Silica Fiber Optics," Ind. Eng. Chem. Res. 1999, 38:8-33.
Dalton, L. R., et al., "Organic Electro-Optics and Photonics: Molecules, Polymers, and Crystals," 2015, Cambridge University Press, Cambridge, UK, Book review in MRS Bulletin, vol. 41, 1 page.
Shi, Y., et al., "Low (Sub-1 Volt) Halfwave Voltage Polymeric Electrooptic Modulators Achieved by Control of Chromophore Shape," Science 2000, 288(5463):119-122.
Chen, A., and E.J. Murphy (eds.), "Broadband Optical Modulators: Science, Technology, and Applications," 2011 Taylor & Francis, New York, 531 pages.
Almeida, V. R., et al., "Guiding and Confining Light | Void Nanostructure," Optics Letters 2004, 29(11), 1209-1211.
Jalali, B., and S. Fathpour, "Silicon Photonics," Journal of Lightwave Technology 2006, 24(12):4600-4615.
Atwater, H. A., "The Promise of Plasmonics," Scientific American 2007, 296(4):56-63.
Schuller, J. A., et al., Plasmonics for Extreme Light Concentration and Manipulation, Nature Materials 2010, 9 (3):193-204.
Rahim, A., et al., "Taking Silicon Photonics Modulators to a Higher Performance Level: State-of-the-Art and a Review of New Technologies," Advanced Photonics 2021, 3(2):024003-1-23.
Sinatkas, G., et al., "Electro-Optic Modulation in Integrated Photonics," Journal of Applied Physics 2021, 130:010901-35.
Tuniz, A., "Nanoscale Nonlinear Plasmonics in Photonic Waveguides and Circuits," La Rivista del Novo Cimento 2021, 44:193-249.
Gordon, R., and M. Dobinson, "Plasmonics-Mine the Gap: Opinion," Optical Materials Express 2021, 11(7):2192-2196.
Baehr-Jones, T., and M. Hochberg, "Optical Modulation and Detection in Slotted Silicon Waveguides," Optics Express 2005, 13(14):5216-5226.
Hochberg, M., et al., "Terahertz All-Optical Modulation in a Silicon-Polymer Hybrid System," Nature Materieals 2006, 5(9):703-709.
Hochberg, M., et al., "Toward a Millivolt Optical Modulator with Nano-Slot Waveguides," Optics Express 2007, 15 (13):8401-8410.
Baehr-Jones, T., et al., "Nonlinear Polymer-Clad Silicon Slot Waveguide Modulator with a Half Wave Voltage of 0.25 V.," Applied Physics Letters 2008, 92(16):163303-1-163303-3.
Takayesu, J., et al., "A Hybrid Electrooptic Microring Resonator-Based 1×4×1 ROADM for Wafer Scale Optical Interconnects," Journal of Lightwave Technology 2009, 27(4):440-448.
Brosi, J.-M., et al., High-Speed Low-Voltage Electro-Optic Modulator with a Polymer-Infiltrated Silicon Photonic Crystal Waveguide. Optics Express 2008, 16(6):4177-4191.
Koos, C., et al., "All-Optical High-Speed Signal Processing with Silicon-Organic Hybrid Slot Waveguides," Nature Photonics 2009, 3:216-219.
Leuthold, J., et al., "Silicon Organic Hybrid Technology—A Platform for Practical Nonlinear Optics," in Proceedings of IEEE 2009, 97(7):1304-1316.
Ding, R., et al., Demonstration of a Low VπL Modulator with GHz Bandwidth Based on an Electro-Optic Polymer-Clad Silicon Slot Waveguides, Optics Express 2010, 18(15):15618-15623.
Kim, S.-K., et al., "Active Plasmonic and Metamaterials and Devices," in Proceedings of SPIE NanoScience + Engineering 2010, vol. 7754, 775403-1-10.
Leuthold, J., et al., "Nonlinear Silicon Photonics," Nature Photonics 2010, 4:535-544.

Figi, H., et al., "Electro-Optic Modulation in Horizontally Slotted Silicon/Organic Crystal Hybrid Devices," J. of Opt. Soc. Amer. B 2011, 28(9):2291-2300.
Ding, R., et al., "Sub-Volt Silicon-Organic Electro-optic Modulator with 500 MHz Bandwidth," Journal of Lighwave Technology 2011 29(8):1112-1117.
Kim, R. S., et al., "Fabrication and Characterization of a Hybrid SOI 1×4 Silicon-Slot Optical Modulator Array Incorporating EO Polymers for Optical Phase-Array Antenna Applications," in Proceedings of SPIE OPTO 2012, vol. 8259, 82590B-1-15.
Dalton, L. R., "Theory-Guided Nano-Engineering of Organic Electro-Optic Materials for Hybrid Silicon Photonic, Plasmonic, and Metamaterial Devices," in Proceedings of SPIE OPTO 2013, vol. 8622, 86220J-1-10.
Leuthold, J., et al., "Silicon-Organic Hybrid Electro-Optical Devices," IEEE J. Sel. Top. Quant. Electron. 2013, 19(6):114-126.
Weimann, C., et al., "Silicon-Organic Hybrid (SOH) Frequency Comb Sources for Terabit/s Data Transmission," Optics Express 2014, 22(3):3629-3647.
Palmer, R., et al., "High-Speed, Low Drive-Voltage Silicon-Organic Hybrid Modulator Based on a Binary-Chromophore Electro-Optic Material," Journal of Lightwave Technology 2014, 32(16):2726-2734.
Lauermann, M., et al., "Low-Power Silicon-Organic Hybrid (SOH) Modulators for Advanced Modulation Formats," Optics Express 2014, 22(24):29927-29936.
Meikyan, A., et al., "High-Speed Plasmonic Phase Modulators," Nature Photonics 2014, 8:229-233.
Alloatti, L., et al., "100 GHz Silicon-Organic Hybrid Modulator," Light: Science & Applications 2014, 3, e173, 4 pages.
Koeber, S., et al., "Femtojule Electro-Optic Modulation Using a Silicon-Organic Hybrid Device," Light: Science & Applications 2015, 4(2), e255, 8 pages.
Lauermann, M., et al., "40 GBd 16QAM Signaling at 160 Gbit/s in a Silicon-Organic Hybrid (SOH) Modulator," Journal of Lightwave Technology 2015, 33(6):1210-1216.
Meilkyan, A., et al., "Plasmonic-Organic Hybrid (POH) Modulators for OOK and BPSK Signaling at 40 Gbit/s," Optics Express 2015, 23(8):9938-9946.
Lauermann, M., et al., "High-Speed and Low Power Silicon-Organic Hybrid Modulators for Advanced Modulation Formats," in Proceedings of SPIE Optics + Optoelectronics 2015, vol. 9516, pp. 951607-1 to 951607-5.
Haffner, C., et al., "All-Plasmonic Mach-Zehnder Modulator Enabling Optical High-Speed Communications at the Microscale," Nature Photonics 2015, 9(8):526-528.
Leuthold, J., et al., "Plasmonic Communications, Light on a Wire," Optics and Photonics News 2013, pp. 30-35.
Heni, W., et al., "108 Gbit/s Plasmonic Mach-Zehnder Modulator with > 70-GHz Electrical Bandwidth," Journal of Lightwave Technology 2015, 34(2):393-400.
Heni, W., et al., "High Speed Plasmonic Modulator Array Enabling Dense Optical Interconnect Solutions," Optics Express 2015, 23(23):29746-29757.
Salamin, Y., et al., "Direct Conversion of Free Space Millimeter Waves to Optical Domain by Plasmonic Modulator Antenna," Nano Letters 2015, 15(12):8342-8346.
Koos, C., et al., "Silicon-Organic Hybrid (SOH) and Plasmonic-Organic Hybrid (POH) Integration," Journal of Lightwave Technology 2016, 34(2):256-268.
Haffner, C., et al., "Plasmonic Organic Hybrid Modulators—Scaling Highest Speed Photonics to the Microscale," in Proceedings of IEEE 2016, 104(12):2362-2379.
Lauermann, M., et al., "Integrated Optical Frequency Shifter in Silicon-Organic Hybrid (SOH) Technology," Optics Express 2016, 24(11):11694-11707.
Bonjour, R., et al., "Plasmonic Array Feeder Enabling Ultra-Fast Beam Steering at Millimeter Waves," Optics Express 2016, 24(22):25608-25618.
Heni, W., et al., "Nonlinearities of Organic Electro-Optic Materials in Nanoscale Slots and the Implications for the Optimum Modulator Design," Optics Express 2017, 25(3):2627-2653.

(56) References Cited

OTHER PUBLICATIONS

Hoessbacher, C., et al., "Plasmonic Modulator with >170 GHz Bandwidth Demonstrated at 100 Gbit/s NRZ," Optics Express 2017, 25(3):1762-1768.
Heni, W., et al., "Silicon-Organic and Plasmonic-Organic Hybrid Photonics," ACS Photonics 2017, 4(7):1578-1590.
Koos, C., et al., "Nanophotonic Modulators and Photodectors Using Silicon Photonic and Plasmonic Device Concepts," in Proceedings of OPTO-SPIE 2017, paper 10098-6.
Robinson, B. H., et al., "Relation of System Dimensionality and Order Parameters," The Journal of Physical Chemistry B 2015, 119(7):3205-3512.
Johnson, L. E., et al., "Dielectric and Phase Behavior of Dipolar Spheroids," The Journal of Physical Chemistry B 2015, 119(16):5240-5250.
Tillack, A. F., et al., "Systematic Generation of Anisotropic Coarse-Grained Lennard-Jones Potentials and Their Application to Ordered Soft Matter," Journal of Chemical Theory Compututation 2016, 12(9):4362-4374.
Tillack, A. F., and B. H. Robinson, "Toward Optimal EO Response form ONLO Chromophores: A Statistical Mechanics Study of Optimizing Shape," Journal of the Optical Society of America B 2016, 33(12):E121-E129.
Tillack, A. F., and B. H. Robinson, "Simple Model for the Benzene Hexafluorobenzene Interaction," The Journal of Physical Chemistry B 2017, 121(25):6184-6188.
Tillack, A. F., and B. H. Robinson, "Shape Matters: The Case for Ellipsoids and Ellipsoidal Water," Journal of Physics: Conference Series 2017, 921(1), 012015, 5 pages.
Halter, M., et al., "Molecular Self-Assembly of Mixed High-Beta Zwitterionic and Neutral Ground-State NLO Chromophores," Chemistry of Materials 2008, 20(5):1778-1787.
Liao, Y., et al., "Linear and Nonlinear Optical Properties of a Macrocyclic Trichromophore Bundle With Parallel-Aligned Dipole Moments," The Journal of Physical Chemistry B 2006, 110:5434-5438.
Liao, Y., et al., "Antiparallel-Aligned Neutral-Ground-State and Zwitterionic Chromophores as a Nonlinear Optical Material," Journal of the American Chemical Society 2006, 128(21):6847-6853.
Ma, H., et al., "Novel Perfluorocyclobutane-Containing Thermoset Polymers and Dendrimers in Electro-Optics," in Proceedings of ACS Polymeric Materials: Science and Engineering 2000, 83:165-166.
Zhang, C., et al., "Electric-Poling and Relaxation of Thermoset Polyurethane Second-Order Nonlinear Optical Materials: The Role of Cross-Linking and Monomer Rigidity," Macromolecules. 2001, 32(2):235-243.
Wang, C., et al., "Urethane-Urea Copolymers Containing Siloxane Linkages: Enhanced Temporal Stability and Low Optical Loss for Second-Order Nonlinear Optical Applications," Macromolecules. 2001, 34(7):2359-2363.
Dalton, L. R., "Nonlinear Optical Polymeric Materials: From Chromophore Design to Commercial Applications," Advances in Polymer Science 2002, 158:1-86.
Dalton, L. R., "Rational Design of Organic Electro-Optic Materials," Journal of Physics: Condensed Matter 2003, 15: R897-R934.
Zhang, C, et al., "What the Ultimate Polymeric Electro-Optic Materials Will Be: Guest-Host, Crosslinked, or Side Chain?"in Proceedings of SPIE 2003, Organic Photonic Materials and Devices V, 4991:537-551.
Dalton, L. R., "Organic Electro-Optic Materials," Pure and Applied Chemistry 2004, 76(7-8):1421-1433.
Haller, M., et al., "A Novel Lattice-Hardening Process to Achieve Highly Efficient and Thermally Stable Nonlinear Optical Polymers," Macromolecules 2004, 37(3):688-690.
Kim, T.-D., et al., "Ultralarge and Thermally Stable Electro-Optic Activities from Supramolecular Self-Assembled Molecular Glasses," Journal of the American Chemical Society 2007, 129(3):488-489.
Sullivan, P. A., "Tri-component Diels-Alder Polymerized Dendrimer Glass Exhibiting Large, Thermally Stable, Electro-Optic Activity," Journal of Materials Chemistry 2007, 17:2899-2903.
Shi, Z., et al., "Highly Efficient Diels-Alder Crosslinkable Electro-Optic Dendrimers for Electric-Field Sensors," Advanced Functional Materials 2007, 17:2557-2563.
Shi, Z., et al., "Controlled Diels-Alder Reactions Used to Incorporate Highly Efficient Polyenic Chromophores into Maleimide-Containing Side-Chain Polymers for Electro-Optics," Macromolecules 2009, 42(7):2438-2445.
Shi, Z., et al., "Tuning the Kinetics and Energetics of Diels-Alder Cycloaddition Reactions to Improve Poling Efficiency and Thermal Stability of High-Temperature Cross-Linked Electro-Optic Polymers," Chemistry of Materials 2010, 22(19):5601-5608.
Shi, Z., et al., "Dipolar Chromophore Facilitated Huisgen Cross-Linking Reactions for Highly Efficient and Thermally Stable Electrooptic Polymers," ACS Macro Letters 2012, 1(7):793-796.
Shi, Z., et al., "Achieving Excellent Electro-Optic Activity and Thermal Stability in Poled Polymers Through an Expeditious Crosslinking Process," Journal of Materials Chemistry 2012, 22(3):951-959.
Wu, J., et al., "Ultra-Efficient and Stable Electro-Optic Dendrimers Containing Supramolecular Homodimers of Semifluorinated Dipolar Aromatics," Materials Chemistry Frontiers 2018, 2(5):901-909.
Liu, J., et al., "Copper-Catalyzed Huisgen Cycloaddition Reactions Used to Incorporate NLO Chromophores into High Tg Side-Chain Polymers for Electro-Optics," Optical Materials 2015, 47:256-262.
Spring, A. M., et al., "Crosslinked Poly(norbornene-dicarboximide)s as Electro-Optic Chromophore Hosts," European Polymer Journal 2017, 97:263-271.
Miura, H., et al., "High Thermal Stability 40 GHz Electro-Optic Polymer Modulators," Optics Express 2017, 25 (23):28643-28649.
Kieninger, C., et al., "Demonstration of Long-Term Thermally Stable Silicon-Organic Hybrid Modulators at 85° C.," Optics Express 2018, 26(21):27955-27964.
Lu, G.-W., et al., "High-Temperature-Resistant Silicon-Polymer Hybrid Modulator Operating at up to 200 Gbit s-1 for Energy Efficient Datacentres and Harsh-Environment Applications," Nature Communications 2020, 11:4224, 9 pages.
Benight, S. J., et al., "Processing of Organic Electro-Optic Materials for Commercial Applications," in Proceedings of SPIE 2020, Nanoengineering: Fabrication, Properties, Optics, Thin Films, and Devices XVII, vol. 11467, 1144671H, 7 pages.
Dinu, R., et al., "Environmental Stress Testing of Electro-Optic Polymer Modulators," Journal of Lightwave Technology 2009, 27(11):1527-1532.
Cordovano, S., "Lightwave Logic's Advanced Organic Electro-OpticPolymers Surpass 4,000 Hours Of Photochemical Stability Testing," Lightwave Logic, Inc., 2016, <https://www.prnewswire.com/news-releases/lightwave-logics-advanced-organic-electro-optic-polymers-surpass-4000-hours-of-photochemical-stability-testing-300206181.html> [retrieved Sep. 28, 2023], 3 pages.
Zhang, C., and E. W. Taylor, "Radiation Resistance of a Gamma-Ray Irradiated Nonlinear Optic Chromophore," Journal of Nanophotonics 2009, vol. 3, 031860, 10 pages.
Ullah, F., et al., "Recent Progress in Electro-Optic Polymer for Ultra-Fast Communication," PhotoniX 2021, 2:13, 18 pages.
Katz, H. E.,et al., "Polar Orientation of Dyes in Robust Multilayers by Zirconium Phosphate-Phosphonate Interlayers," Science 1991, 254(5037):1485-1487.
Caster, K., "2021 Organic Materials Chemistry virtual Program Review (vPR)," <https://community.apan.org/wg/afosr/w/researchareas/30951/2021-organic-materials-chemistry-virtual-program-review-vpr/>, [retrieved Oct. 3, 2023], Presentation Jun. 14-16, 2021, 7 pages.
Elder, D. L., and L. R. Dalton, "Organic Electro-Optics and Optical Rectification: From Mesoscale to Nanoscale Hybrid Devices and Chip-Scale Integration of Electronics and Photonics," Industrial Engineering Chemical Research 2022, 61:1207-1231.
Baeuerle, B., et al, "Low-power data center transponders enabled by micrometer-scale plasmonic modulators," in Proceedings of Optical Fiber Conference (OFC), San Diego, California, Mar. 2020, W1D.1, 3 pages.

(56) References Cited

OTHER PUBLICATIONS

Burla, M., et al., "Plasmonic modulators for THz wireless signal processing", URSI GASS 2021, Rome, Italy, Aug. 29-Sep. 4, 2021, 1 page.

Kieninger, C., et al., "SOH Mach-Zehnder Modulators for 100 GBd PAM4 Signaling With Sub-1 dB Phase-Shifter Loss," in Proceedings of Optical Fiber Communication Conference (OFC) San Diego, California, Mar. 2020, Th3C.3, 3 pages.

Messner, A., et al., "100 Gbit/s NRZ Data Modulation in Plasmonic Racetrack Modulators on the Silicon Photonic Platform," 2020 European Conference on Optical Communications (ECOC), Brussels, Belgium, 2020, 3 pages.

Salamin, Y., et al., "Integrated Plasmonic Terahertz Field Detector," Frontiers in Optics, Laser Science, FM1E.1, Optica Publishing Group, 2020, 2 pages.

Benea-Chelmus, I.C., et al., "Terahertz quantum optics in the time-domain: from field correlation measurements on vacuum field fluctuations in free space towards cavity electro-optics," CLEO: Science and Innovations, 2020, SM1F.7, 1 page.

Messner, A., et al., "High-speed plasmonic modulator for simultaneous C- and O-band modulation with simplified fabrication," in Proceedings of Optical Fiber Communication Conference (OFC) San Diego, California, 2020, M1D.3, 3 pages.

Hammond, S., et al., "Long-term stability of commercial organic electro-optic materials," American Chemical Society Spring Meeting, 2021, online, <https://www.morressier.com/o/event/6022c0c2e8bb0500118660c6/article/609136cc6e987178c2dc9166> [retrieved Nov. 13, 2023], abstract.

Johnson, L., et al., "Modeling surface effects on hybrid organic nanophotonic performance," in Proceedings of American Chemical Society Spring Meeting, 2021, online, <https://www.morressier.com/o/event/6022c0c2e8bb0500118660c6/article/609136cd6e987178c2dc9184> [retrieved Oct. 4, 2023, 3 pages.

Horst, Y., et al., "Transparent Optical-THz-Optical Link Transmission over 5/115 m at 240/190 Gbit/s enabled by Plasmonics," in Proceedings of Optical Fiber Communication Conference (OFC), Washington, DC, 2021. F3C.1, 3 pages.

Benea-Chelmus, I.-C., et al., "Nano-Engineered Spatial-Light Modulators From Electro-Optic Nano-Molecules," Conference on Lasers and Electro Optics, Science and Innovations (CLEO:S&I), San Jose, California, 2021, OSA Technical Digest, JTh3A.24, 2 pages.

Benea-Chelmus, I.-C., et al., "Electro-optic spatial light modulator from an engineered organic layer," Nature Communications 2021, 12:5928, pp. 1-10.

Dalton, L. R., et al., "Transformative Electronic/Photonic Chipscale Technology for Air Force Platforms: Progress Related to Theory-Guided Development of 2nd Order NLO Materials for an Information Technolology," (powerpoint presentation) University of Washington, Jun. 14, 2021, 20 pages.

Haffner, C., et al., "Harnessing nonlinearities near material absorption resonances for reducing losses in plasmonic modulators," Optical Materials Express 2017, 7(7):2168-2181.

Pereverzev, Y. V., et al., "Mean-field theory of acentric order of chromophores with displaced dipoles," Chemical Physics Letters 2001, 340(3-4):328-335.

Johnson, L. E., et al, "New paradigms in materials and devices for hybrid electro-optics and optical rectification," Proceedings of SPIE Organic Photonics + Electronics 2021, Molecular and Nano Machines IV, vol. 11812, 1181202-1 to 1181202-9.

Hoessbacher, C., et al., "Optical Interconnect Solution With Plasmonic Modulator and Ge Photodetector Array," IEEE Photonics Technology Letters 2017, 29(21):1760-1763.

Ayata, M., et al., "High-Speed Plasmonic Modulator in a Single Metal Layer," Science 2017, 358(6363):630-632.

Kieninger, C., et al., "Ultra-High Electro-Optic Activity Demonstrated in a Silicon-Organic Hybrid Modulator," Optica 2018, 5(6):739-748.

Haffner, C., et al., "Low Loss Plasmon-Assisted Electro-Optic Modulator," Nature 2018, 556(7702):483-486.

Robinson, B. H., et al., "Optimization of Plasmonic-Organic Hybrid Electro-Optics," Journal of Lightwave Technology 2018, 36(21):5036-5047.

Salamin, C., et al., "Microwave Plasmonic Mixer in a Transparent Fibre-Wireless Link," Nature Photonics 2018, 12(12):749-753.

Burla, M., et al., "500 GHz Plasmonic Mach-Zehnder Modulator Enabling Sub-THz Microwave Photonics," APL Photonics 2019, 4(5), pp. 056106-1 to 056106-11.

Heni, W., et al., "Plasmonic IQ modulators with attojoule per bit electrical energy consumption," Nature Communications 2019, 10(1):1694-1702.

Koch, U., et al., "Ultra-Compact Terabit Plasmonic Modulator Array," Journal of Lightwave Technology 2019, 37(5):1484-1491.

Ayata, M., et al., "All-Plasmonic IQ Modulator with a 36 µm Fiber-to-Fiber Pitch," Journal of Lightwave Technology 2019, 37(5):1492-1497.

Baeuerle, B., et al., "Reduced Equalization Needs of 100 GHz Bandwidth Plasmonic Modulators," Journal of Lightwave Technology 2019, 37(9):2050-2057.

Burla, M., et al.; "Integrated Photonic and Plasmonic Technologies for Microwave Signal Processing Enabling mm-Wave and Sub-THz Wireless Communication Systems," in Proceedings of SPIE OPTO 2019, vol. 10945, pp. 1094505-1 to 1094505-6.

Baeuerle, B., et al., "120 GBd Plasmonic Mach-Zehnder Modulator with a Novel Differential Electrode Design Operated at a Peak-to-Peak Drive Voltage of 178 mV," Optics Express 2019, 27(12):16823-16832.

Salamin, Y., et al, "Compact and Ultra-Efficient Broadband Plasmonic Terahertz Field Detector," Nature Communications 2019, 10(1):5550, 8 pages.

Koch, U., et al., "A Monolithic Bipolar CMOS Electronic-Plasmonic High-Speed Trnasmitter," Nature Electronics 2020, 3:338-345.

Benea-Chelmus, I.-C., et al., "Electro-optic interface for ultrasensitive intracavity electric field measurements at microwave and terahertz frequencies," Optica 2020, 7(5):498-505.

Baeuerle, B., et al., "100 GBd IM/DD Transmission over 14 km SMF in the C-Band Enabled by a Plasmonic SSB MZM," Optics Express 2020, 28(6):8601-8608.

Kieninger, C., et al., "Silicon-Organic Hybrid (SOH) Mach-Zehnder Modulators for 100 GBd PAM4 Signaling with Sub-1 dB Phas-Shifter Loss," Optics Express 2020, 28(17):24693-24707.

Heni, W., et al., "Ultra-High-Speed 2:1 Digital Selector and Plasmonic Modulator IM/DD Transmitter Operating at 222 GBaud for Intra-Datacenter Applications," Journal of Lightwave Technology 2020, 38(9):2734-2739.

Ummethala, S., et al., "Hybrid Electro-Optic Modulator Combining Silicon Photonic Slot Waveguides with High-k Radio-Frequency Slotlines," Optica 2021, 8(4):511-519.

Ma, P., et al., "Plasmonic Modulators and Photodetectors for Communications," in Broadband Access Communication Technologies XV, Proceedings of SPIE OPTO 2021, vol. 11711, 1171105.

Messner, A., et al., "Broadband Metallic Fiber-to-Chip Couplers and a Low-Complexity Integrated Plasmonic Platform," Nano Letters 2021, 21(11), 4539-4545.

Benea-Chelmus, I.-C., et al., "Electrically Tunable Metasurfaces by a Single Electro-Optic Layer," in Proceedings Spie Opto 2021, vol. 11682, 11682-1-11, abstract.

Benea-Chelmus, I.-C., et al., "Mie-Driven Free-Space Electro-Optic Transducers," in Proceedings of SPIE 2021, vol. 111796, Active Photonic Platforms XIII, 117969V, abstract.

Koch, U., et al., Plasmonics—High-Speed Photonics for Co-Integration with Electronics. Japanese Journal of Applied Physics 2021, 60, SB0806, 6 pages.

Burla, M., et al., "Novel Applications of Plasmonics and Photonics Devices to Sub-THz Wireless," in Proceedings of SPIE 2020, vol. 11307, 1130701, 7 pages.

Haffner, C., Non-Resonant and Resonant Surface Plasmon Polariton Modulators for Optical Communications 2018, Ph.D. Dissertation No. ETH 25089, ETH Zurich Series in Electromagnetic Fields, vol. 6., pp. 1-215.

Ummethala, S., "Plasmonic-Organic and Silicon-Organic Hybrid Modulators for High-Speed Signal Processing," Dr. Ing. Disserta-

(56) References Cited

OTHER PUBLICATIONS tion. 2021, KIT-Fakultat fur Electrotechnik und Informationstecknik des Karlsruher Instituts fur Technologie (KIT), pp. 1-164.

Johnson, L. E., et al., New Paradigms in Materials and Devices for Hybrid Electro-Optics and Optical Rectification, in Proceedings of SPIE 2021, vol. 11812, 1181292, 9 pages.

Johnson, L. E., et al., Birefringence, Dimensionality, and Surface Influences on Organic Hybrid Electro-Optic Performance, in Proceedings of SPIE 2021, vol. 11799, 1179917, 13 pages.

Baehr-Jones, T., et al., Theoretical Study of Optical Rectification at Radio Frequencies. IEEE Journal of Quantum Electronics 2010, 46(11):1634-1641.

Xu, H., et al., Electro-Optic Activity in Excess of 1000 pm V-1 Achieved via Theory-Guided Organic Chromophore Design, Advanced Materials, 2021, 33, 2104174, 9 pages.

Xu, H., et al., "Design and Synthesis of Chromophores With Enhanced Electro-Optic Activities in Both Bulk and Plasmonic-Organic Hybrid Devices," Materials Horizons 2022, 9(1):261-270.

Facchetti, A., et al., "Layer-by-Layer Self-Assembled Pyrrole-Based Donor-Acceptor Chromophores as Electro-Optic Materials," Chemistry of Materials 2003, 15(5), 1064-1072.

Facchetti, A., et al., Azinium-(p-Bridge)-Pyrrole NLO-Phores: Influence of Heterocycle Acceptors on Chromophoric and Self-Assembly Thin-Film Properties. Chemistry of Materials 2002, 14, 4996-5005.

Zhao, Y.-G., et al., Traveling Wave Electro-Optic Phase Modulators Based on Intrinsically Polar Self-Assembled Chromophoric Superlattices. Applied Physics Letters 2001, 79(5), 587-589.

Lin, W., et al, "Supramolecular Approaches to Second-Order Nonlinear Optical Materials. Self-Assembly and Microstructural Characterization of Intrinsically Acentric [(Aminophenyl)azo]pyridinium Superlattices," Journal of the American Chemical Society 1996, 118(34):8034-8042.

Roscoe, S. B., et al., "Self-Assembled Chromophore NLO-Active Structures. Second-Harmonic Generation and X-ray Photoelectron Spectroscopic Studies of Nucleophilic Substitution and Ion Exchange Processes on Benzyl Halide-Functionalized Surfaces," Langmuir 1996, 12(22), 5338-5349.

Ackerman, E. I., "Broad-band Linearization of a Mach-Zehnder Electrooptic Modulator," IEEE Transactions on Microwave Theory and Techniques 1999, 47(12):2271-2279.

Gill, D. M., et al., "Optical Modulation Techniques for Analog Signal Processing and CMOS Compatible Electro-Optic Modulation," in Proceedings of SPIE 2008, Integrated Optoelectronic Devices, 6898, 689803, 11 pages.

Zhu, X., et al., "Linearization of Two Cascaded Intensity-Modulator-Based Analog Photonic Link," in Proceedsings of SPIE 2018, Opt. Eng. 57(8), 080501, 4 pages.

Amin, R., et al., "Sub-Wavelength GHz-Fast Broadband ITO Mach-Zehnder Modulator on Silicon Photonics," Optica 2020, 7(4):333-335.

Marpaung, D., et al., "Integrated Microwave Photonics," Laser & Photonics Reviews 2013, 7(4):506-538.

Verghese, S., "Self-Driving Cars and Lidar," Conference on Lasers and Electro-Optics (CLEO), OSA Technical Digest (online) 2017, paper AM3A.1, abstract.

Hudnut, K. W., et al., "Airborne Lidar and Electro-Optical Imagery Along Surface Ruptures of the 2019 Ridgecrest Earthquake Sequence, Southern California," Seismological Research Letters 2020, 91(4):2096-2107.

Electro Optics on-line journal, search results for "enviromental monitoring," <https://www.electrooptics.com/search/node?keys=environmental%20monitoring> [retrieved Sep. 27, 2023], 5 pages.

Pan, S., and Y. Zhang, "Microwave Photonic Radars," Journal of Lightwave Technology 2020, 38(19), 5450-5484.

Morris, T. A., et al., Advances in Optical Gyroscopes, in Proceedings SPIE 2019, vol. 11199, 11199OT, Seventh European Workshop on Optical Fibre Sensors, 6 pages.

Olbricht, B. C., et al., "Laser-Assisted Poling of Binary Chromophore Materials," The Journal of Physical Chemistry C 2008, 112:7983-7988.

Olbricht, B. C., et al., "Measuring Order in Contact-Poled Organic Electrooptic Materials with Variable Angle Polarization-Referenced Absorption Spectroscopy (VAPRAS)," The Journal of Physical Chemistry B 2011, 115:231-241.

Marder, S. R., et al., "A Unified Description of Linear and Nonlinear Polarization in Organic Polymethine Dyes," Science 1994, 265(5172), 632-635.

Meyers, F., et al., "Electric Field Modulated Nonlinear Optical Properties of Donor-Acceptor Polyenes: Sum-Over-States Investigation of the Relationship Between Molecular Polarizabilities (Alpha, Beta, and Gamma) and Bond-Length Alternation," Journal of the American Chemical Society 1994, 116:10703-10714.

Bourhill, G., et al., "Experimental Demonstration of the Dependence of the First Hyperpolarizability of Donor-Acceptor-Substituted Polyenes on the Ground-State Polarization and Bond Length Alternation," Journal of the American Chemical Society 1994, 116:2619-2620.

Isborn, C. M., et al., "Comparison of Static First Hyperpolarizabilities Calculated with Various Quantum Mechanical Methods," The Journal of Physical Chemistry A 2007, 111(7):1319-1327.

Dalton, L. R., et al., "Systematic Nanoengineering of Soft Matter Organic Electro-optic Materials," Chemistry of Materials 2011, 23:430-445.

Suponitsky, K. Y., et al., "Electronic Hyperpolarizabilities for Donor-Acceptor Molecules with Long Conjugated Bridges: Calculations versus Experiment," The Journal of Physical Chemistry A 2009, 113:10994-11001.

Johnson, L. E., et al., "Optimizing Calculations of Electronic Excitations and Relative Hyperpolarizabilities of Electrooptic Chromophores," Accounts of Chemical Research 2014, 47(11):3258-3265.

Körzdörfer, T., and J. L. Bredas, "Organic Electronic Materials: Recent Advances in the DFT Description of the Ground and Excited States Using Tuned Range-Separated Hybrid Functionals," Accounts of Chemical Research 2014, 47(11):3284-3291.

Garrett, K., et al., "Optimum Exchange for Calculation of Excitation Energies and Hyperpolarizabilities of Organic Electro-optic Chromophores," Journal of Chemical Theory and Computation 2014, 10:38121-3831.

Sullivan, P. A., and L. R. Dalton, "The Material Genome for Organic Electro-optics and Silicon/Plasmonic-Organic Hybrid Technology," New Horizons in Nanoscience and Engineering, D. L. Andrews and J. G. Grote (eds.) 2015, Chap. 6, 233-265.

Takimoto, Y., et al., "Frequency and Solvent Dependence of Nonlinear Optical Properties of Molecules," The Journal of Physical Chemistry C 2008, 112:8016-8021.

Liang, W., et al., "Solvents Level Dipole Moments," The Journal of Physical Chemistry B 2011, 115(43):12566-12570.

Bale, D. H., et al., "Dielectric Dependence of the First Molecular Hyperpolarizability for Electro-Optic Chromophores," The Journal of Physical Chemistry B 2011, 115(13), 3505-3513.

Davidson, E. R., et al., "Hyperpolarizability: Calibration of Theoretical Methods for Chloroform, Water, Acetonitrile, and p-Nitroaniline," Optical Materials 2006, 29(4), 360-364.

Kocherzhenko, A. A., et al., "Absorption Spectra for Disordered Aggregates of Chromophores Using the Exciton Model," Journal of Chemical Theory and Computation 2017, 13(8):3787-3801.

Kocherzhenko, A. A., et al., "Unraveling Excitonic Effects for the First Hyperpolarizabilities of Chromophore Aggregates," The Journal of Physical Chemistry C 2019, 123(22):13818-13836.

Davies, J. A., et al., "Rational Enhancement of Second-Order Nonlinearity: Bis-(4-methoxyphenyl)hetero-aryl-amino Donor-Based Chromphores: Design, Synthesis, and Electrooptic Activity," Journal of the American Chemical Society 2008, 130:10655-10575.

Jin, W., et al., "Structure-Function Relationship Exploration for Enhanced Thermal Stability and Electro-Optic Activity in Monolithic Organic NLO Chromophores," Journal of Materials Chemistry C 2016, 4:3119-3124.

(56) References Cited

OTHER PUBLICATIONS

Elder, D. L., "Effect of Rigid Bridge-Protection Units, Quadrupolar Interactions and Blending in Organic Electro-Optic Chromophores," Chemistry of Materials 2017, 29:6457-6371.

Elder, D. L., et al., "Multi-Scale Theory-Assisted Nano-Engineering of Plasmonic-Organic Hybrid Electro-Optic Device Performance," in Proceedings of SPIE 2018, vol. 10529, 105290K, 13 pages.

Johnson, L. E., et al., "Poling-Induced Birefringence in OEO Materials Under Nanoscale Confinement," in Proceedings of SPIE Organic Photonics + Electronics, 2018, Organic and Hybrid Sensors and Bioelectronics XI, vol. 10738, 107381A, 11 pages.

Johnson, L. E., et al., "Next Generation Materials for Hybrid Electro-Optic Systems," in Proceedings of SPIE 2019, vol. 11089, Nanoengineering: Fabrication, Properties, Optics, Thin Films, and Devices XVI, 110890K, 2 pages.

Xu, H., et al., "Ultrahigh Electro-Optic Coefficients, High Index of Refraction, and Long-Term Stability from Diels-Alder Cross-Linkable Binary Molecular Glasses," Chemistry of Materials 2020, 32:1408-1421.

Johnson, L. E., et al., "Advances in High-Performance Hybrid Electro-Optics," in Proceedings of SPIE 2020, vol. 11471, Quantum Nanophotonic Materials, Devices, and Systems 114710B, 3 pages.

Xu, H., et al., "Bis (4-dialkylaminopheny) Heteroaryamino Donor Chromophores Exhibiting Exceptional Hyperpolarizabilities.," Journal of Materials Chemistry C 2021, 9(8):2721-2728.

Dalton, L. R., et al., "Electric Field Poled Organic Electro-optic Materials: State of the Art and Future Prospects," Chemical Reviews 2010, 110:25-55.

Sullivan, P. A., and L. R. Dalton, "Theory-Inspired Development of Organic Electro-optic Materials," Accounts of Chemical Research 2010, 43(1):10-18.

Kang, H., et al., Ultralarge Hyperpolarizability Twisted TT-Electron System Electro-Optic Chromophores: Synthesis, Solid-State and Solution-Phase Characteristics, Electronic Structures, Linear and Nonlinear Optical Properties, and Computational Studies. Journal of the American Chemical Society 2007, 129:3267-3286.

Brown E. C., et al., "Nonlinear Response Properties of Ultralarge Hyperpolarizability Twisted IT-System Donor-Acceptor Chromophores Dramatic Environmental Effects on Response," The Journal of Physical Chemistry B 2008, 112:44-50.

Wang, Y., et al., "Twisted TT-Electron System Electrooptic Chromophores. Structural and Electronic Consequences of Relaxing Twist-Inducing Nonbonded Repulsions," The Journal of Physical Chemistry C 2008, 112:8005-8015.

Isborn, C. S., et al., "Ab Initio Diradical/Zwiterionic Polarizabilities and Hyperpolarizabilities in Twisted Diradicals," The Journal of Physical Chemistry A 2006, 110:7189-7196.

Kim, W. K., and L. M. Hyden, "Fully Atomistic Modeling of a Electric Field Poled Guest-Host Nonlinear Optical Polymer," The Journal of Chemical Physics 1999, 111:5212-5222.

Leahy-Hoppa, M. R., et al., "Atomistic Molecular Modeling of the Effect of Chromophore Concentration on the Electro-optic Coefficient in Nonlinear Optical Polymers," The Journal of Physical Chemistry 2006, 110:5792-5797.

Makowska-Janusik, M., et al., "Molecular Dynamics Simulations of Electric Field Poled Nonlinear Optical Chromophores Incorporated in a Polymer Matrix," The Journal of Physical Chemistry B 2004, 108:588-596.

Dalton, L. R., et al., "The Role of London Forces in Defining Noncentrosymmetric Orderin High Dipole Moment-High Hyperpolarizability Chromophores in Electrically Poled Polymeric Thin Films," Proc. Natl. Acad. Sci. USA 1997, 94(10):4842-4547.

Robinson, B. H, et al., "Monte Carlo Statistical Mechanical Simulations of the Competition of Intermolecular Electrostatic and Poling-Field Interactions in Defining Macroscopic Electro-Optic Activity for Organic Chromophore/Polymer Materials," The Journal of Physical Chemistry A 2000, 104(20):4785-4795.

Pereverzev, Y. V., and O.V. Prezhdo, "Mean-Field Theory of Acentric Order of Dipolar Chromophores in Polymeric Electro-Optic Materials," 2000 Physical Review E 62(6):8324-8334.

Pereverzev, Y. V., et al., "Sample Shape Influence on the Antiferroelectric Phase Transitions in Dipolar Systems Subject to an External Field," Physical Review B: 2002, vol. 65, 052101, 4 pages.

Pereverzev, Y. V., et al., "A Model of Phase Transitions in the System of Electro-Optical Dipolar Chromophores Subject to an Electric Field," Journal of Chemical Physics 2002, 117:3334-3360.

Dalton, L. R., et al., "Organic Electro-Optics: From Molecules to Devices," in Proceedings of SPIE 2002, Linear and Nonlinear Optics of Organic Materials II, 4798:1-10.

Dalton, L. R., et al., "Systematic Development of High Bandwidth, Low Drive Voltage Organic Electro-Optic Devices and Their Applications," Optical Materials 2002, 21:19-28.

Pereverzev, Y. V., et al., Structural Origin of the Enhanced Electro-Optic Response of Dendrimeric Systems. Chemical Physical Letters 2003, 373:207-212.

Pereverzev, Y. V., et al., "Macroscopic Order and Electro-Optic Response of Dipolar Chromophore-Polymer Materials," ChemPhysChem 2004, 5:1821-1830.

Nielsen, R. D., et al., "Simulation of the Loading Parameter in Organic Nonlinear Optical Materials," The Journal of Physical Chemistry B 2004, 108(25):8659-8667.

Rommel, H. L., and B. H Robinson, "Orientation of Electro-optic Chromophores under Poling Conditions: A Spheroidal Model," The Journal of Physical Chemistry C 2007, 111(50), 18765-18777.

Sullivan, P. A., et al., "Modeling the Optical Behavior of Complex Organic Media: From Molecules to Materials," The Journal of Physical Chemistry B 2009, 113(47):15581-15588.

Benight, S. J., et al., "Reduced Dimensionality in Organic Electro-Optic Materials: Theory and Defined Order," The Journal of Physical Chemistry B 2010, 114(37):11949-11956.

Benight, S. J., et al., "Nano-Engineering Lattice Dimensionality for a Soft Matter Organic Functional Material," Advanced Materials 2012, 24:3263-3268.

Tillack, A. F., et al., "Modeling Chromophore Order: A Guide for Improving EO Performance," Materials Research Society Online Proceedings Library 2014, vol. 1698, 6 pages.

Elder, D. L., et al., "Matrix-Assisted Poling of Monolithic Bridge-Disubstituted Organic NLO Chromophores," Chemistry of Materials 2014, 26(2):872-874.

\* cited by examiner

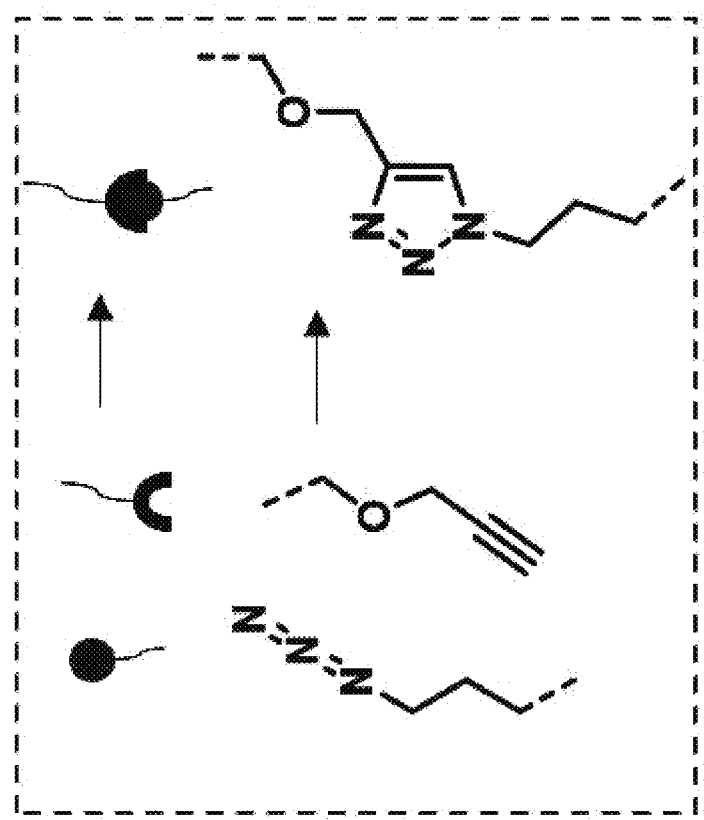
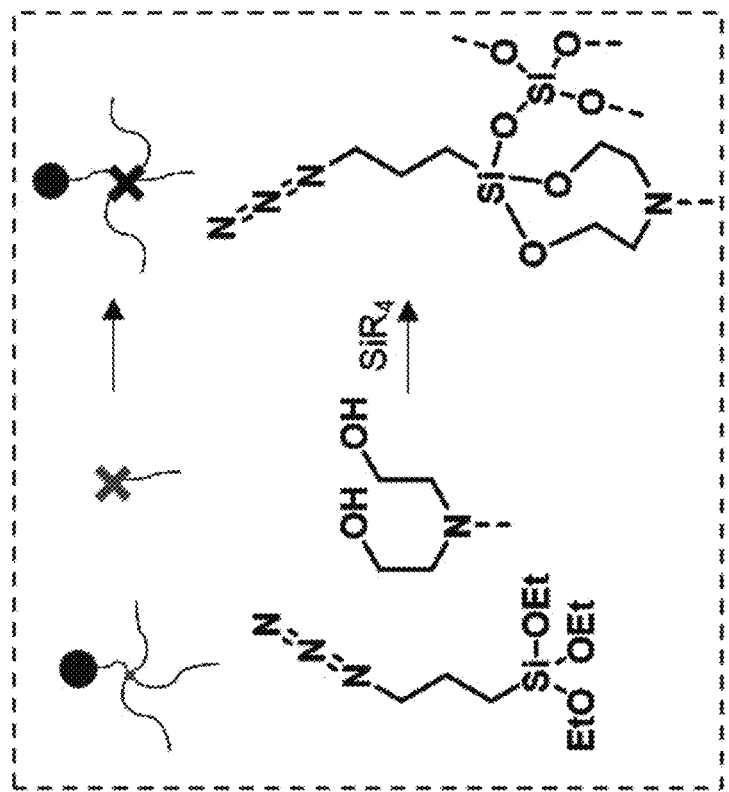
FIG. 13A
FIG. 13B

Mode distribution

EO coefficient distribution

Predicted vs experimental $V_\pi L$

Effective $r_{33}$ in slot

SEQUENTIAL SYNTHESIS TECHNIQUE FOR DEPOSITION OF ALIGNED ORGANIC ELECTRO-OPTIC MATERIALS

CROSS-REFERENCE TO RELATED APPLICATION

This application claims the benefit of U.S. Patent Application No. 63/351,772, filed Jun. 13, 2022; the contents of which is hereby incorporated by reference in its entirety for all purposes.

STATEMENT OF GOVERNMENT LICENSE RIGHTS

This invention was made with government support under Grant No. FA9550-21-1-0193, awarded by the Air Force Office of Scientific Research and Grant No. IIP-2036514, awarded by the National Science Foundation. The government has certain rights in the invention.

BACKGROUND

Organic electrooptic (OEO) materials are hyperpolarizable molecules where one property of the OEO is a refractive index change in the presence of an electric field. Hyperpolarizability, $\beta$, is the molecular level nonlinear optical property that is responsible for and proportional to the macroscopic electrooptic (EO) coefficient, $r33$. OEO molecules are also known as chromophores and consist of electron donor, $\pi$-bridge, electron acceptor structural units. $\beta$ may be increased by altering the molecular structure to increase the electron donor strength, $\pi$-bridge length, or electron acceptor strength.

OEO materials have recently seen a renaissance due to the development of hybrid inorganic/organic device architectures, where the organic material is confined on the nanoscale between either semiconductors or plasmonic metals, tightly confining the optical (usually telecom near-IR wavelengths) and electrical (RF or mmWave) modes within the OEO material, efficiently utilizing the high EO sensitivity ($r33$) of the OEO material. Such hybrid architectures have enabled extraordinary EO modulator performance in silicon-organic hybrid (SOH) and plasmonic-organic hybrid (POH) devices. Highlights include a POH Mach-Zehnder modulator (MZM) with >500 GHz bandwidth, a POH IQ modulator with as low as 70 aJ/bit energy efficiency, monolithic integration of a POH modulator with BiCMOS electronics demonstrating stable operation under demanding thermal conditions, and compact, low-loss, high-performance SOH modulators implemented on silicon photonics platforms. These results have attracted considerable commercial interest due to the need for high-bandwidth, compact, power-efficient modulators for photonic integrated circuits (PICs), with potential applications ranging from optical interconnects for datacom to microwave photonics, mmWave telecom, satellite communications, quantum computing and networking, ultra-high-performance metrology, and a wide variety of defense-related technologies. Also demonstrated has been spatial light modulators that enable high-speed active beam steering for LIDAR, free-space optical communications, and other applications.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

NGS Chromophore

In one aspect a neutral ground state (NGS) electrooptic chromophore of structure is disclosed comprising:
  ahead;
  a donor;
  a bridge;
  an acceptor;
  a tail;
  wherein the head is a reactive group that is covalently bonded to the donor and is configured to react with the underlying surface or a capping agent that supplies a functional group;
  wherein the donor is a group that has excess electron density and allows for connection to the head;
  wherein the bridge electronically communicates between the donor and acceptor,
  wherein the acceptor is deficient in electron density and allows for connection to the tail;
  wherein the tail is a reactive group that is covalently bonded to the acceptor and is configured to react with the underlying surface or a capping agent that supplies a functional group; and
  wherein the head and tail are configured to allow for sequential polymerization of the NGS electrooptic chromophore in non-centrosymmetric alignment.

In some embodiments the head has an alkene, alkyne, hydroxyl trifluorovinylether, diene, propadiene, or azide group.

ZGS Chromophore

In another aspect a zwitterionic ground state (ZGS) chromophore is disclosed comprising:
  a head;
  a donor;
  a bridge;
  an acceptor;
  a tail;
  wherein the head is a reactive group that is covalently bonded to the donor and is configured to react with the underlying surface or a capping agent that supplies a functional group;
  wherein the donor is a group that has excess electron density and allows for connection to the head;
  wherein the bridge electronically communicates between the donor and acceptor,
  wherein the acceptor is deficient in electron density and allows for connection to the tail;
  wherein the tail is a reactive group that is covalently bonded to the acceptor and is configured to react with the underlying surface or a capping agent that supplies a functional group;
  wherein the head and tail allow for sequential polymerization of the electrooptic chromophore; and
  wherein one side of the chromophore perpetually carries a positive charge, one side of the chromophore perpetually carries a negative charge and the positive charge and negative charge are separated by the bridge.

Sequential Synthesis Method

In another aspect a sequential synthesis method for the non-centrosymmetric alignment of electrooptic chromophores is disclosed comprising:
  an electrooptic chromophore;
  wherein the electrooptic chromophore has a tail and a head;

a capping agent;
an electrode;
wherein the tail of the electrooptic chromophore chemically in one solution reacts with the surface of the electrode to form a chemical bond between the tail of the electrooptic chromophore and the electrode;
wherein upon repeated reaction of the tail of the electrooptic chromophore with the electrode surface a monolayer film of the chromophore is emplaced upon the surface of the electrode, such that the chromophores in the monolayer are inherently non-centrosymmetric;
wherein the solvent is removed from the monolayer;
wherein the head of the electrooptic chromophore chemically reacts with the capping agent in a different solution to form a chemical bond with the head of the electrooptic chromophore and the capping agent;
wherein the capping agent forms a solgel with surface functional groups, locking the non-centrosymmetric monolayer in place;
wherein the solvent is removed from the monolayer capped with solgel with surface functional groups;
wherein the tail of the electrooptic chromophore in a different solution chemically reacts with the surface functional groups on the solgel to form a chemical bond between the tail of the electrooptic chromophore and the solgel capping agent;
wherein upon reaction of the tail of the electrooptic chromophore with the capping layer on the monolayer of the electrooptic chromophore on the electrode surface sequentially yields a second non-centrosymmetric layer of the electrooptic chromophore chemically bonded to the monolayer of the electrooptic chromophore chemically bonded to the surface of the electrode;
wherein the solvent is removed from the second layer;
wherein repeated steps of contact with the capping agent and the tail of the chromophore sequentially adds layers of the electrooptic chromophore; and
wherein the chromophores and the layers of chromophores added sequentially are arranged in a non-centrosymmetric manner.

Electrooptic Film

In another embodiment a film comprising a plurality of electrooptic chromophores, a first layer of the electrooptic chromophores bonded to a substrate in a first layer, such that the substrate imparts non-centrosymmetric order onto the electrooptic chromophores, the plurality of electrooptic chromophores including a plurality of least one neutral ground state (NGS) chromophore and a plurality of at least one zwitterionic ground state (ZGS) chromophore is disclosed;
  wherein the NGS chromophore comprises:
    ahead;
    a donor;
    a bridge;
    an acceptor;
    a tail;
    wherein the head is a reactive group that is covalently bonded to the donor and is configured to react with the underlying surface or a capping agent that supplies a functional group;
    wherein the donor is a group that has excess electron density and allows for connection to the head;
    wherein the bridge electronically communicates between the donor and acceptor;
    wherein the acceptor is deficient in electron density and allows for connection to the tail;
    wherein the tail is a reactive group that is covalently bonded to the acceptor and is configured to react with the underlying surface or a capping agent that supplies a functional group; and
    wherein the head and tail are configured to allow for sequential polymerization of the NGS electrooptic chromophore in non-centrosymmetric alignment; and
  wherein the ZGS chromophore comprises:
    ahead;
    a donor;
    a bridge;
    an acceptor;
    a tail;
    wherein the head is a reactive group that is covalently bonded to the donor and is configured to react with the underlying surface or a capping agent that supplies a functional group;
    wherein the donor is a group that has excess electron density and allows for connection to the head;
    wherein the bridge electronically communicates between the donor and acceptor;
    wherein the acceptor is deficient in electron density and allows for connection to the tail;
    wherein the tail is a reactive group that is covalently bonded to the acceptor and is configured to react with the underlying surface or a capping agent that supplies a functional group;
    wherein the head and tail allow for sequential polymerization of the electrooptic chromophore; and
    wherein one side of the chromophore perpetually carries a positive charge, one side of the chromophore perpetually carries a negative charge and the positive charge and negative charge are separated by the bridge.

Electrooptic Devices

In another aspect an electrooptic device comprising a plurality of electrooptic chromophores, a first layer of the electrooptic chromophores bonded to an electrode in a first layer, the plurality of electrooptic chromophores including a plurality of least one neutral ground state (NGS) chromophore and a plurality of at least one zwitterionic ground state (ZGS) chromophore is disclosed;
  wherein the NGS chromophore comprises:
    ahead;
    a donor;
    a bridge;
    an acceptor;
    a tail;
    wherein the head is a reactive group that is covalently bonded to the donor and is configured to react with the underlying surface or a capping agent that supplies a functional group;
    wherein the donor is a group that has excess electron density and allows for connection to the head;
    wherein the bridge electronically communicates between the donor and acceptor;
    wherein the acceptor is deficient in electron density and allows for connection to the tail;
    wherein the tail is a reactive group that is covalently bonded to the acceptor and is configured to react with the underlying surface or a capping agent that supplies a functional group; and
    wherein the head and tail are configured to allow for sequential polymerization of the NGS electrooptic chromophore in non-centrosymmetric alignment; and wherein the ZGS chromophore comprises:
ahead;
a donor;
a bridge;
an acceptor;
a tail;
wherein the head is a reactive group that is covalently bonded to the donor and is configured to react with a capping agent that supplies a functional group;
wherein the donor is a group that has excess electron density and allows for connection to the head;
wherein the bridge electronically communicates between the donor and acceptor;
wherein the acceptor is deficient in electron density and allows for connection to the tail;
wherein the tail is a reactive group that is covalently bonded to the acceptor and is configured to react with the underlying surface or a capping agent that supplies a functional group;
wherein the head and tail allow for sequential polymerization of the electrooptic chromophore; and
wherein one side of the chromophore perpetually carries a positive charge, one side of the chromophore perpetually carries a negative charge and the positive charge and negative charge are separated by the bridge.

DESCRIPTION OF THE DRAWINGS

The patent or application file contains at least one drawing executed in color. Copies of this patent or patent application publication with color drawing(s) will be provided by the Office upon request and payment of the necessary fee.

The foregoing aspects and many of the attendant advantages of this disclosure will become more readily appreciated as the same become better understood by reference to the following detailed description, when taken in conjunction with the accompanying drawings, wherein:

FIG. 13A. The capping reaction between the chromophore and silanes is shown. The capping reaction yields the eventual solgel glass that has azide surface functionality.

FIG. 13B. The 3+2 azide-alkyne cycloaddition reaction propagates the sequential synthesis. A triazole ring is the structural unit resulting from the cycloaddition reaction and links chromophores together.

DETAILED DESCRIPTION

Figure 1:
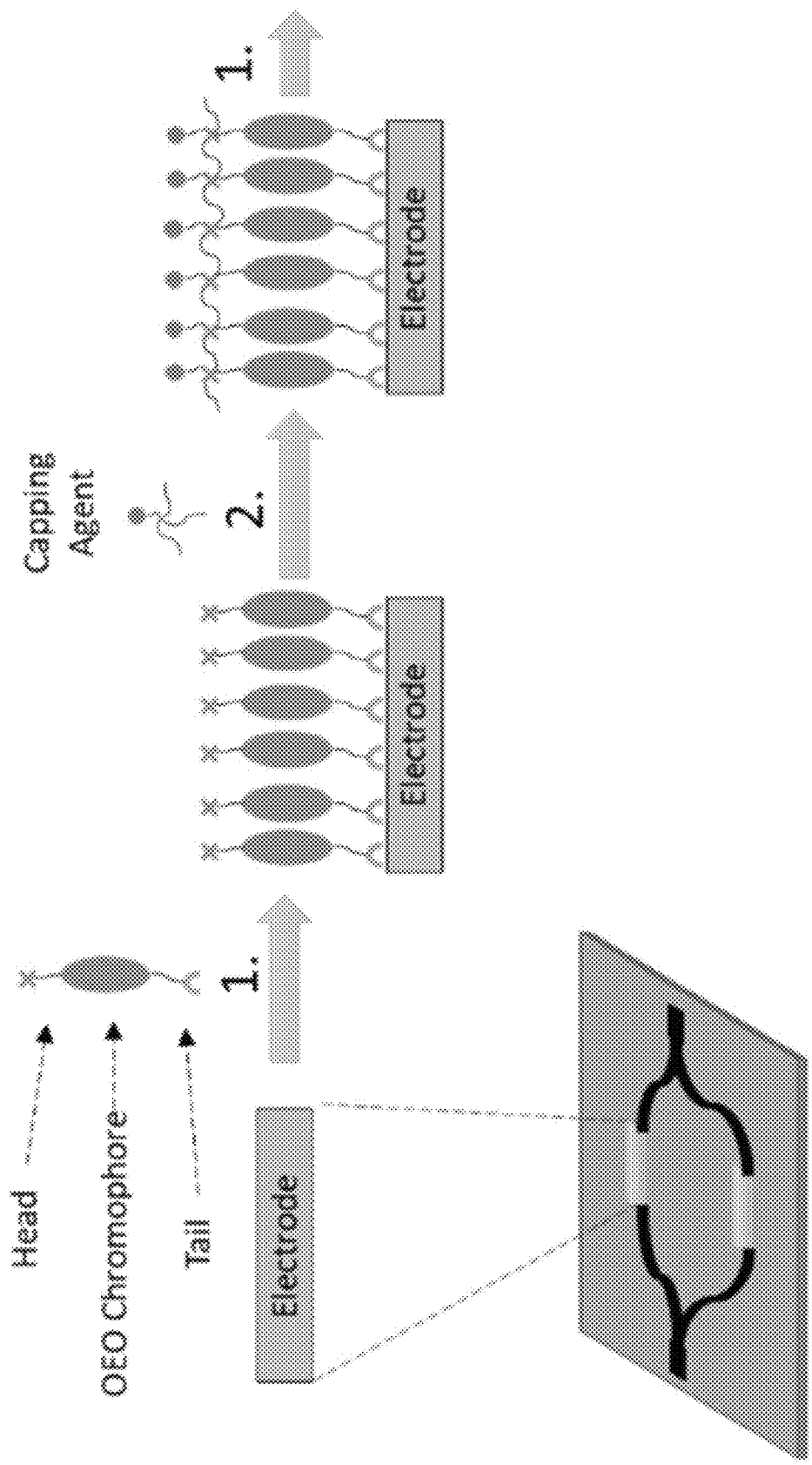
FIG. 1. Overview of sequential synthesis procedure for aligned chromophore deposition. In the first step a chromophore with selective head and tail coupling units is deposited on the electrode surface through a selective coupling reaction of the tail with the electrode surface. In the second step, a capping agent reacts selectively with the surface-exposed head units. These two steps are repeated sequentially to grow the OEO material to a desired thickness.
Figure 1:
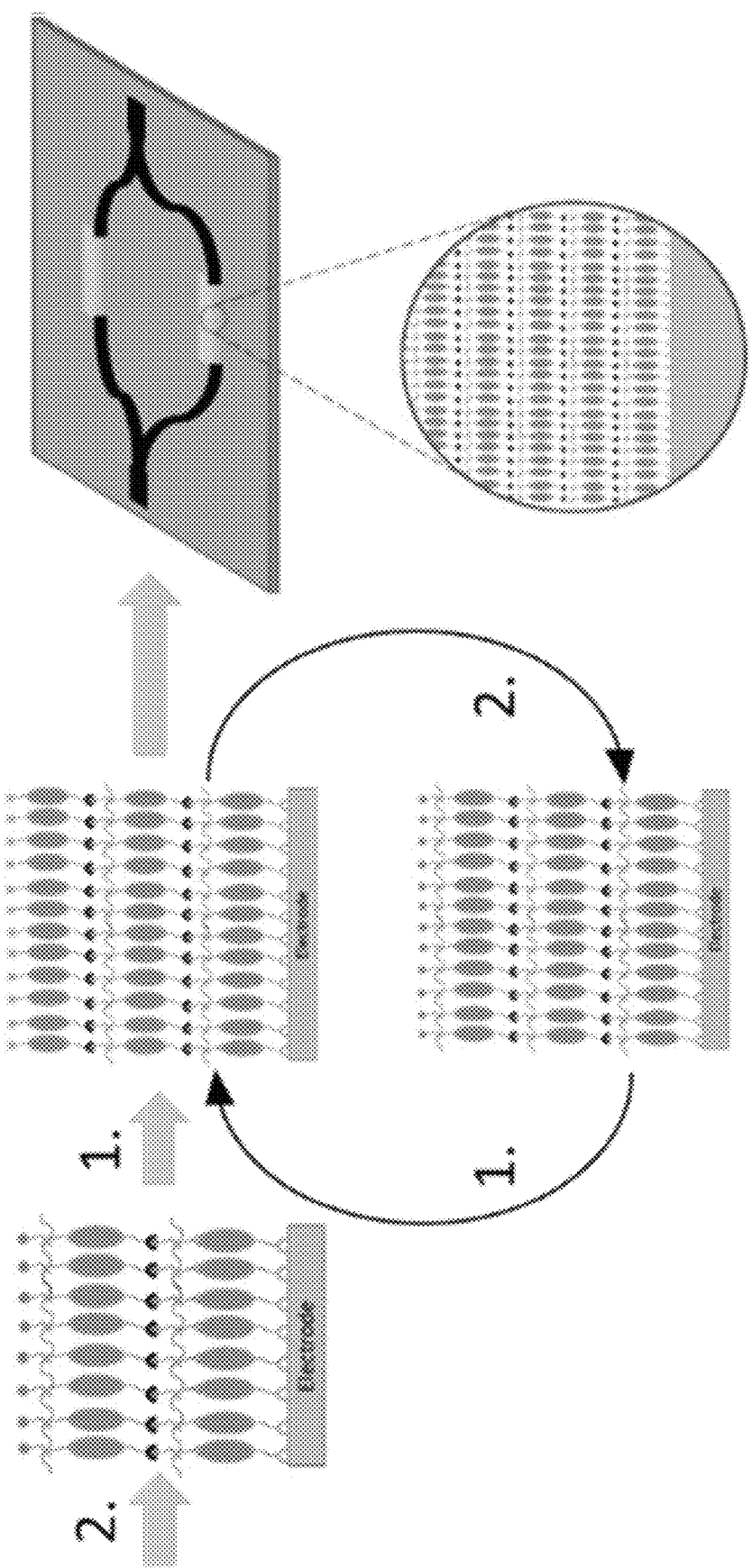

Disclosed are organic electro-optic (OEO) materials. The disclosed OEO materials in hybrid devices demonstrated exceptional metrics with bandwidth >500 GHz, energy efficiency <100 aJ/bit, and device footprints <20 $\mu m^2$. While integration of OEO devices with on-chip electronics is feasible, a high density of modulators per chip or wafer will require a different approach that obviates the need for electric field poling which the disclosed materials and techniques provide. Sequential synthesis is a technique to integrate aligned OEO material into hybrid devices without poling. The disclosed chromophores, device architectures, and methodologies optimized for sequential synthesis enabled the use of highest performance OEO chromophore cores, achieved even better acentric order than by poling, and enabled devices with extraordinarily tight optical mode confinement and small electrode spacing, which in turn enabled ultralow V$\pi$L.

The OEO materials disclosed have potential applications ranging from optical interconnects for datacom to microwave photonics, mmWave telecom, satellite communications, quantum computing and networking, ultra-high-performance metrology, and a wide variety of defense-related technologies.

OEO materials disclosed are required to withstand a variety of conditions during operation and withstand many hours of continuous operation. The OEO materials need to have a high glass transition temperature, sustain operation at 85° C., the EO activity needs to retain >99% of its initial value, and has a projected 10+ year t80 lifespan. The disclosed OEO materials address each of these requirements.

One of the biggest advantages of the disclosed OEO materials over inorganic EO materials like lithium niobate (LN) is that the disclosed OEO materials are infinitely tunable. Altering the chemical structure of the disclosed OEO molecules (chromophores) influences and improves molecular hyperpolarizability, dipole moment, HOMO and LUMO levels, and molecular shape, which can in turn influence material index of refraction, number density, optical transparency, poling-induced acentric order, amorphous character, film-forming ability, solubility, processability, chemical and thermal stability. The technology disclosed advances include: 1) Demonstration of the first OEO material that simultaneously exhibits high r33 (>300 pm/V), high index of refraction (n>1.8), and high thermal stability (glass transition temperature, Tg >150° C.). The OEO materials disclosed are both a singular chromophore and a binary chromophore system, both without a polymer host, which allows the system to maintain a high chromophore number density and high index of refraction, that has engineered side chains to ensure efficient poling. The OEO materials disclosed increases the glass transition temperature by over 100° C., allowing the EO activity to retain >99% of its initial value—without burn in—after 2000 hr of shelf storage at 85° C. under nitrogen, and has a projected 10+ year t80 lifespan after burn-in at 120° C. In order to utilize the exceptional microscopic nonlinearity of these recently developed chromophores, develop charge barrier layers (CBLs) were developed to mitigate the significant conductivity of the disclosed organic semiconductors. The reduced bandgaps of the disclosed higher performance chromophores tend to cause significant leakage current during poling, limiting the poling field that can be sustained across the devices. Incorporating thin, high dielectric constant CBLs in the disclosed materials suppress the leakage current, while ensuring most of the field is dropped across the OEO material, enabling excellent poling efficiency and record OEO performance.

OEO materials of the type disclosed have crossed the 1000 pm/V threshold, which has long been seen as the benchmark for commercial competitiveness. A novel disclosed binary chromophore cross-linking system allows the disclosed materials to couple impressive EO thermal stability over 2000 hours at temperatures up to 120° C. with high EO coefficient, high index of refraction, and processability.

Devices utilizing the disclosed OEO materials are essential for high information technology application areas of high national importance. High information technology application areas that the disclosed OEO materials have shown usefulness are optical telecom and datacom, cryo and quantum computing, sensor technology including optical and electric field metrology and LIDAR, ultra-broadband signal processing at THz bandwidths, dynamic RF beam steering and spatial light modulators, plasmonic metasurface displays and sensors, and optical rectification (transparent photodetection). These technologies, where the disclosed OEO materials are useful, are needed to support artificial intelligence/machine learning, autonomous vehicles and robotics for military and civilian use, the internet-of-things, point-of-care medical diagnostics, the exponential growth in internet data traffic, cloud-based services and datacenters, efficient cloud-edge communication, and video media streaming for education and entertainment, including virtual and augmented reality technologies. To implement these technologies, there is an urgent need for chip-scale co-integration of high-speed photonic elements with electronic elements that the disclosed OEO materials provide. The key photonic elements needed for data transmission and signal processing are electro-optic (EO) modulators with large bandwidths, excellent power-efficiency, and micrometer-scale footprints that enable dense chip-scale integration with current electronics. However, lithium niobate (LN), with a low EO coefficient (r33) of 30 pm/V, has a high V$\pi$L of 20 V mm, even utilizing the latest thin-film LN (TFLN) technology which makes LN materials unsuitable for many advanced applications. The disclosed OEO materials are capable of significantly better performance, including EO coefficients >300 pm/V, and in some cases >1000 pm/V, which have enabled device performance with V$\pi$L <0.05 V mm.

To keep pace with demand for optical and wireless communications, chip-scale integration of photonic and electronic devices is critically needed. The performance of EO devices based on organic NLO materials has been increased by orders of magnitude through theory-guided improvement in the EO activity and other relevant properties of organic materials and by field compression of radio frequency (RF) and optical fields associated with the transition from microscale/mesoscale devices to SOH and POH devices with nanoscopic dimensions. The paradigm shift in organic EO R&D towards hybrid devices has led to many performance improvements, including record performance of V$\pi$L <0.05 V mm, energy consumption of as low as 70 attojoules/bit, bandwidths of greater than 500 GHz, and device footprints of less than 20 µm². Despite these advances, a potential bottleneck has been identified in the transition from chip-level/small numbers of devices to wafer level dense integration scale. Present OEO materials require electric field poling to align the chromophores inside the material in order to activate the EO effect. While poling of a single device is straightforward, simultaneously poling tens of devices per chip or hundreds to thousands of devices per wafer will not be general or cost-effective and limit the applications of the technology. Moreover, the increasing importance of interfacial effects activity that can attenuate poling-induced order as device dimensions become smaller argues for new processing protocols to address this issue. An optimal processing technique would be wafer-scale, quasi-deterministic, and provide maximal order in ultra-small devices with the tightest optical and RF mode confinement.

The disclosed solution to this problem is a method to deposit high-performance OEO materials in an aligned configuration on large area wafer-scale substrates without electric field poling. The technique, called Sequential Synthesis, deposits aligned OEO molecules one layer at a time, in a controlled fashion, building up to aligned chromophore multilayers (FIG. 1). This is attractive for nanophotonic devices because only a small number of sequential depositions are required. The disclosed OEO materials offer layer-by-layer deposition, Click chemistry, and automated protein synthesis to fabrication processes such as atomic/molecular layer deposition, in which repeated applications of precursors enables high-quality conformal coating. The Sequential Synthesis process is compatible with hybrid EO device design and fabrication. In addition to providing a wafer-scale process for depositing OEO materials, there are several other key benefits that this technique will provide that will improve device performance and reliability beyond that of poled materials. First, higher acentric order is achievable with sequentially synthesized OEO layers than with poling. This will especially be true in the narrowest slot width (highest performance) hybrid devices as acentric order drops off with decreasing slot width at the electrode/organic interface in poled devices, but the acentric order is highest at the electrode/organic interface in Sequential Synthesis devices. Second, since the chromophore multilayers are attached to one another, as well as to the electrode, through chemical bonds, the disclosed OEO materials have excellent thermal stability matching or exceeding what is achievable with crosslinked poled materials. Third, some of the highest $\beta$ chromophores can only be poled in a polymer host, which, however, dilutes the EO effect. Those highest $\beta$ materials can be used with Sequential Synthesis boosting EO performance beyond what's been achieved in the best EO devices thus far. Combining these effects, provides a wafer-scale process of OEO device fabrication, with V$\pi$L <0.01 V mm, and >2000 hr thermal stability at >85° C.

The goal in Sequential Synthesis deposition is to form chromophore films extending in controlled, acentric, fashion either parallel to, or perpendicular to, a substrate, so as to allow electrodes to activate the electro-optic properties of the chromophores. While depicted layers of chromophores may be perfectly perpendicular or parallel to the substrate, it is appreciated that actual molecular ordering is more-likely "approximately" (i.e., +/−20 degrees) perpendicular or parallel.

Figure 2A:
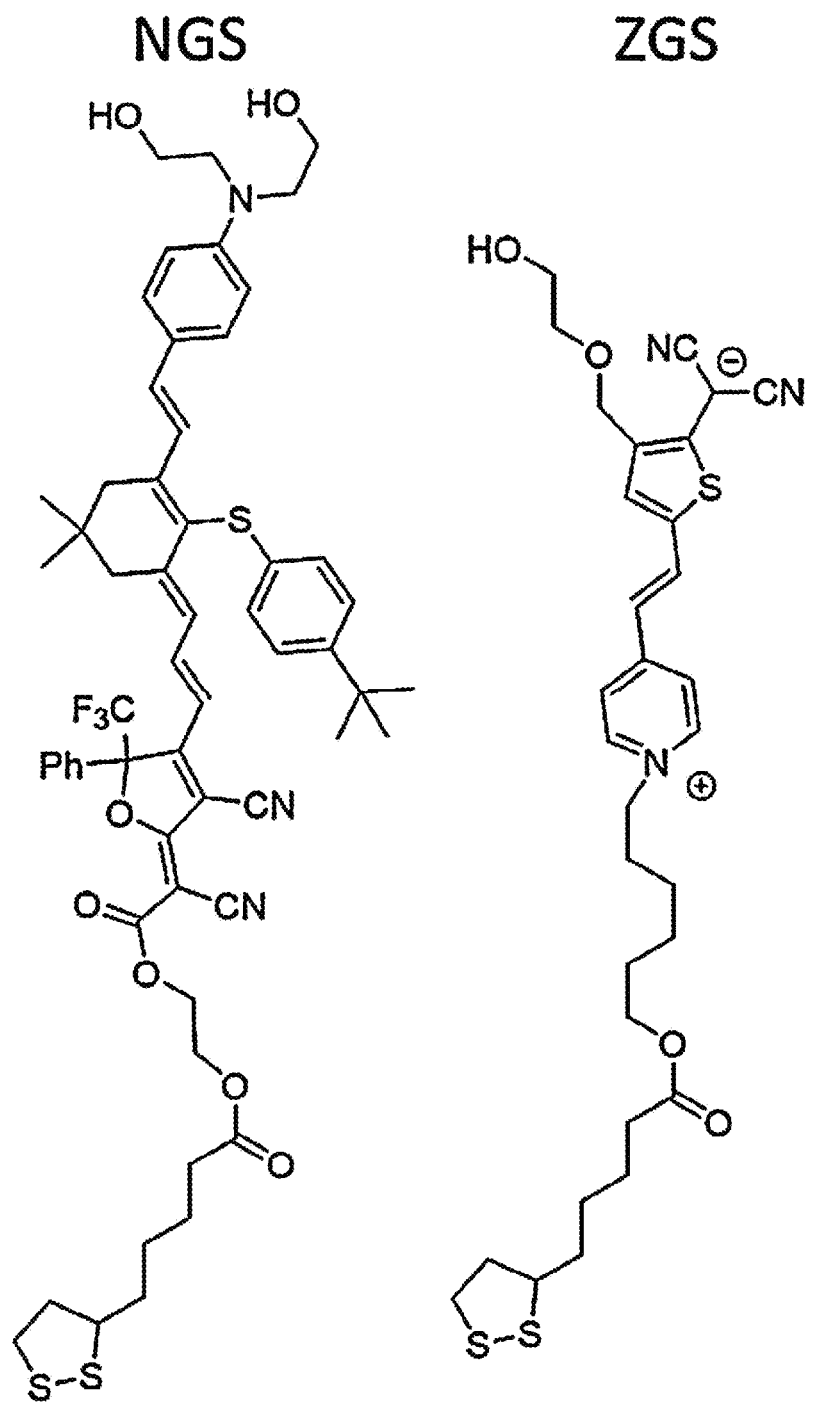
FIG. 2A. Example NGS/ZGS blend molecules.
Figure 2B:
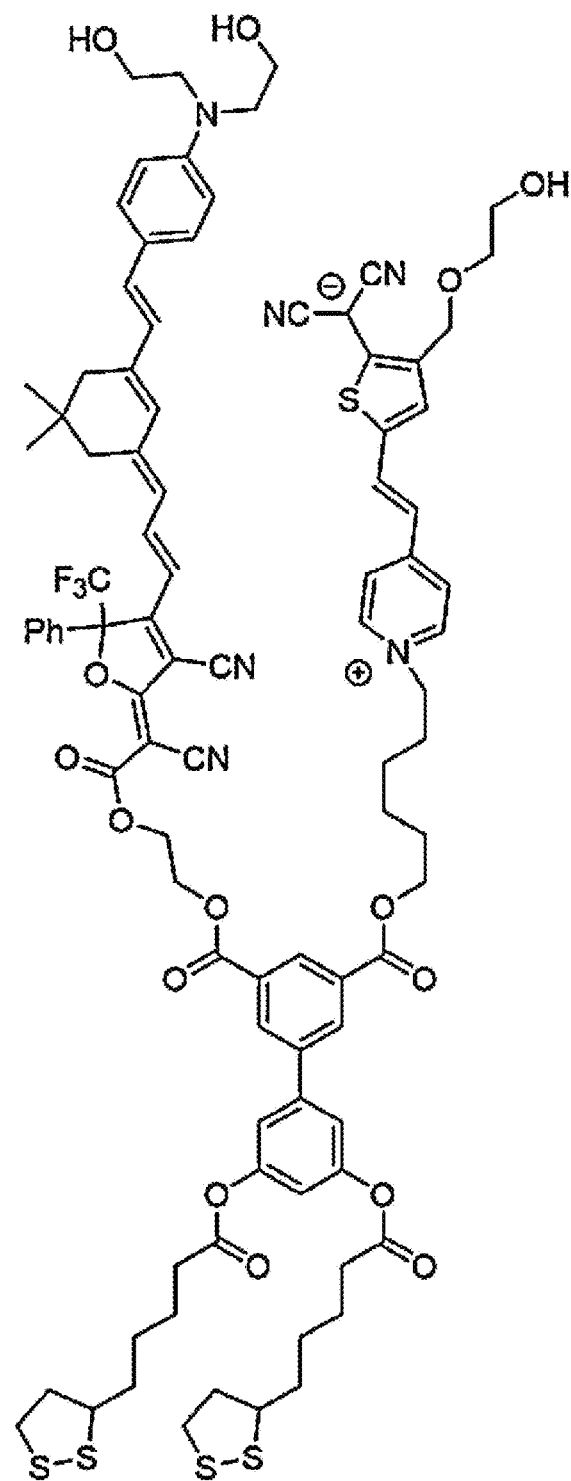
FIG. 2B. Example NGS/ZGS dimer molecule.

A "substrate linker" is a moiety specially suited to bind chromophores to a substrate. Exemplary substrates include silicon, silicon oxide, silicon nitride, and metals (such as gold). Representative linkers include thiols and disulfides (e.g., lipoidic acid, as illustrated in FIGS. 2A and 2B) for gold; and silanes and siloxanes for binding to silicon/oxide surfaces. The "head" portion of the chromophore can be either the electron donor end or the electron acceptor end—with the "tail" portion being the opposite end. These configurations may be tailed to suit specific device structures or layering chemistries.

NGS Chromophores

In one aspect a neutral ground state (NGS) electrooptic chromophore of structure is disclosed comprising:

ahead,
a donor;
a bridge;
an acceptor;
a tail;
wherein the head is a reactive group that is covalently bonded to the donor and is configured to react with the underlying surface or a capping agent that supplies a functional group;
wherein the donor is a group that has excess electron density and allows for connection to the head;
wherein the bridge electronically communicates between the donor and acceptor,
wherein the acceptor is deficient in electron density and allows for connection to the tail;
wherein the tail is a reactive group that is covalently bonded to the acceptor and is configured to react with the underlying surface or a capping agent that supplies a functional group; and
wherein the head and tail are configured to allow for sequential polymerization of the NGS electrooptic chromophore in non-centrosymmetric alignment.

In some embodiments the head has an alkene, alkyne, hydroxyl, trifluorovinylether, diene, propadiene, or azide group.

In some embodiments the head is of an aniline or vinylic amine structure;
wherein the nitrogen is substituted with two R groups attached to N, where R,R is a (C1-C10 alkyl-OH)$_2$, or (C1-C10 alkyl) C1-C10 alkyl-OH), or (C1-C10 alkyl-OR')$_2$, or (C1-C10 alkyl)(C1-C10 alkyl-OR'), where R' is a ester, ether, or silane protecting group that caps the hydroxy groups in a cyclic or non-cyclic manner.

In some embodiments the bridge has a structure:

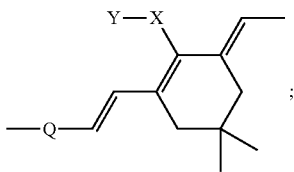

wherein Q is selected from aryl, fused aryl, heteroaryl, fused heteroaryl, X is selected from H, O, S, Se, Te, NH, PH, AsH, and Y is selected from absent, H, C 1-10 alkyl, phenyl, benzyl, C 1-10 alkyl substituted phenyl, C1-10 substituted benzyl, O-tert-butyldiphenylsilyl (OTBDPS).

In some embodiments Q is phenyl, X is S and Y is 4-tertbutylphenyl.

In some embodiments the acceptor has a structure:

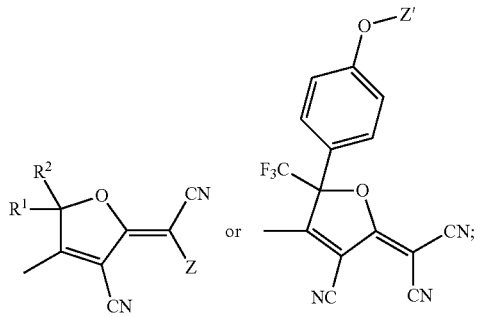

wherein $R^1$ and $R^2$ are independently selected from methyl, trifluoromethyl, ethyl, pentafluoroethyl, phenyl, pentafluorophenyl, perfluoroalkyl and Z or Z' is a structural unit which allows for forming a covalent bond with the tail.

In some embodiments Z is selected from carboxylic acid, sulfone, sulfoxide, sulfur dioxide, ester, amide, urethane, or urea.

In some embodiments the tail has an alkene, alkyne, hydroxyl, trifluorovinylether, diene, propadiene, or azide group.

In some embodiments the tail has the structure E—C≡C or

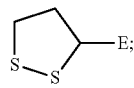

wherein E allows for connection to the acceptor through Z and is selected from alkyl, alkyl ether, alkyl ester, alkyl thioether, alkyl sulfone, alkyl sulfoxide, aryl, aryl ether, aryl sulfone, aryl sulfoxide and any combinations thereof.

In some embodiments the chromophore has the structure (I)

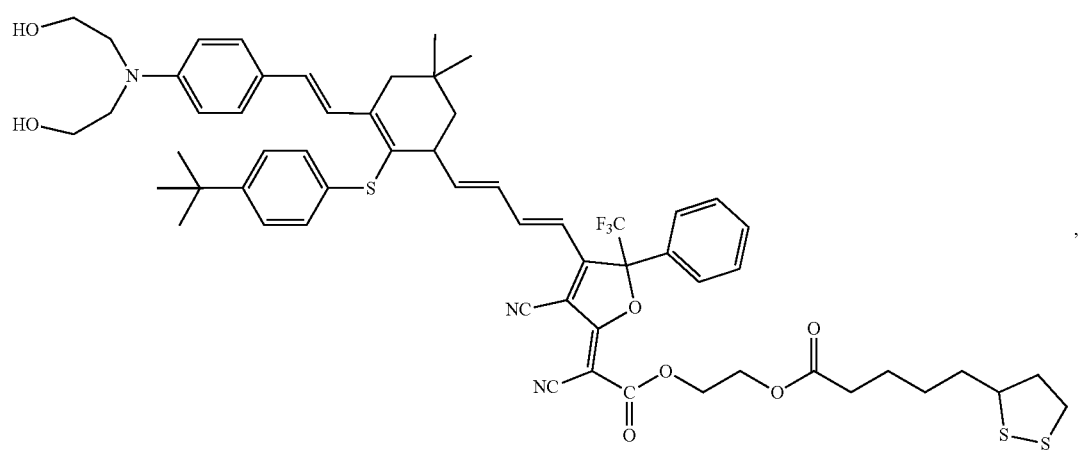

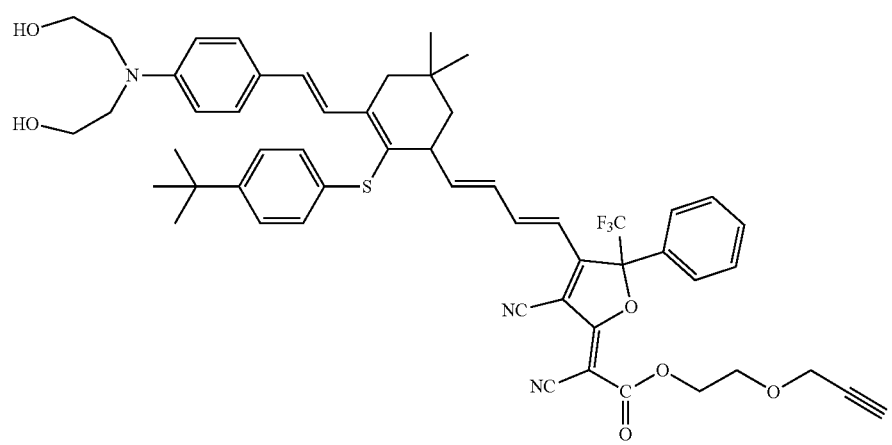
(II)
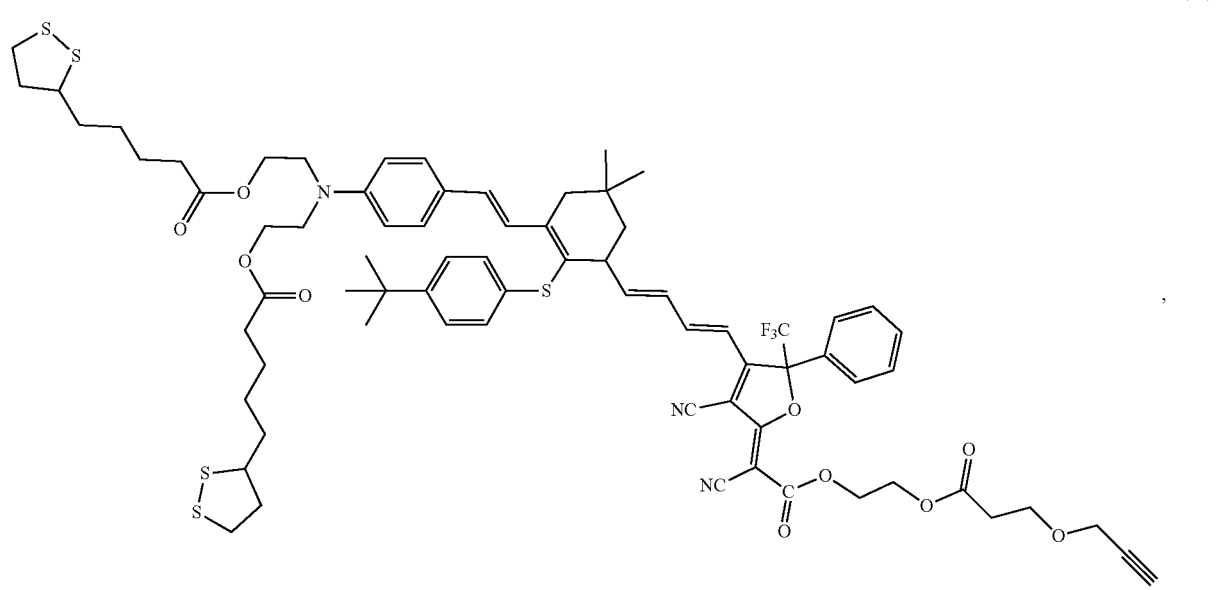
(III)
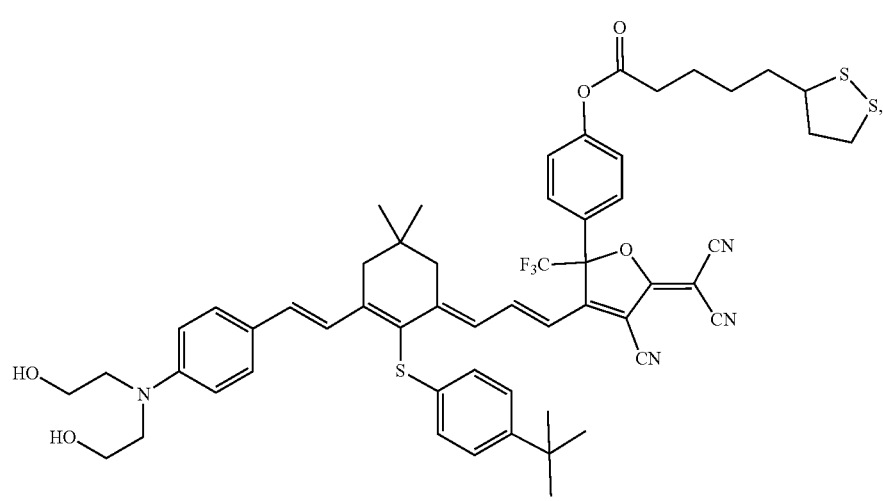
(IV)

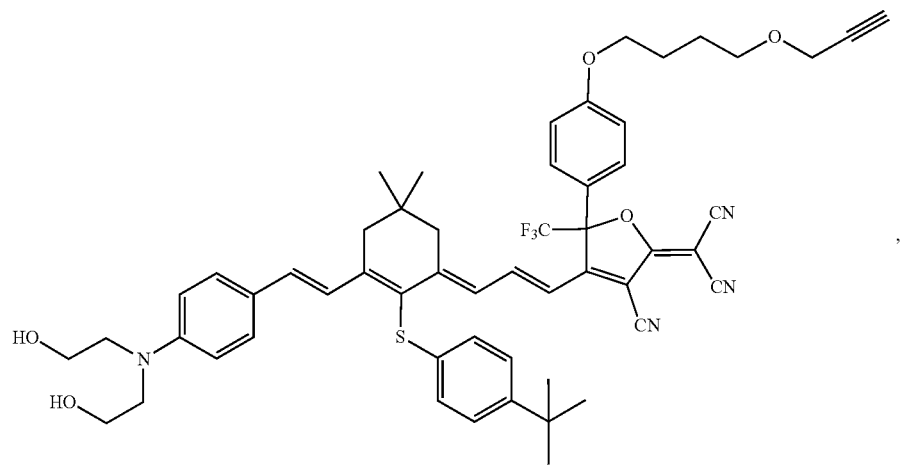
(V)
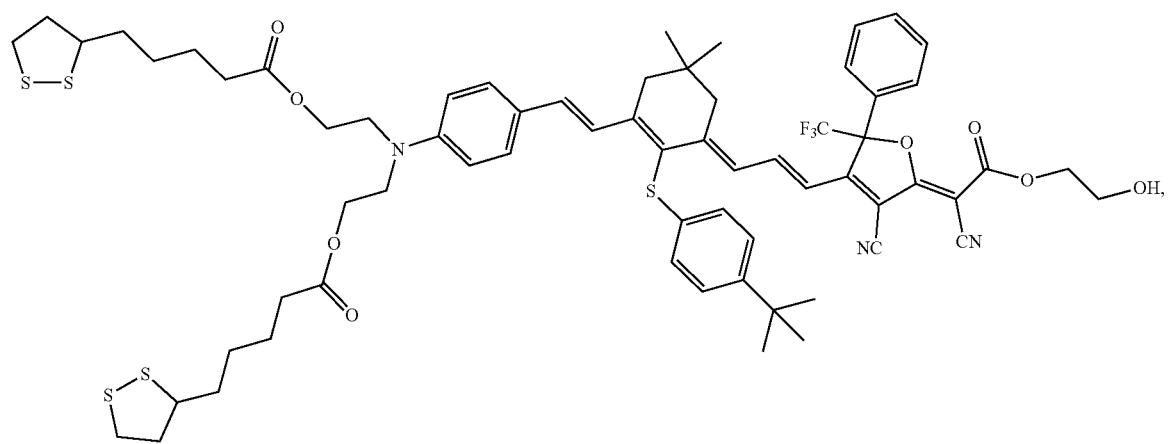
(VI)
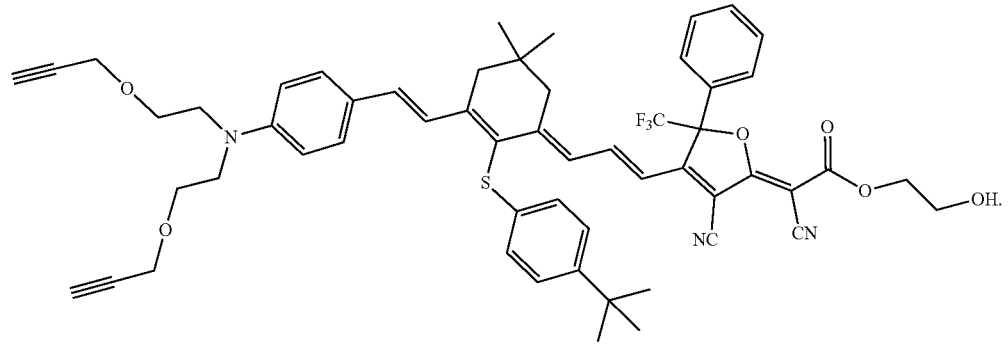
(VII)

In some embodiments the sol-gel capped chromophore has the structure
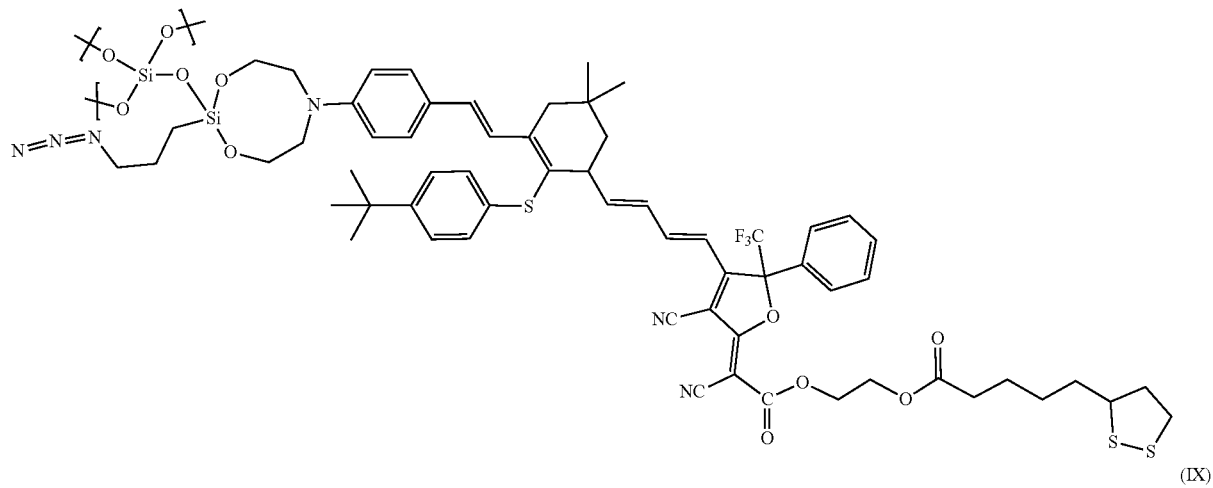
(VIII)
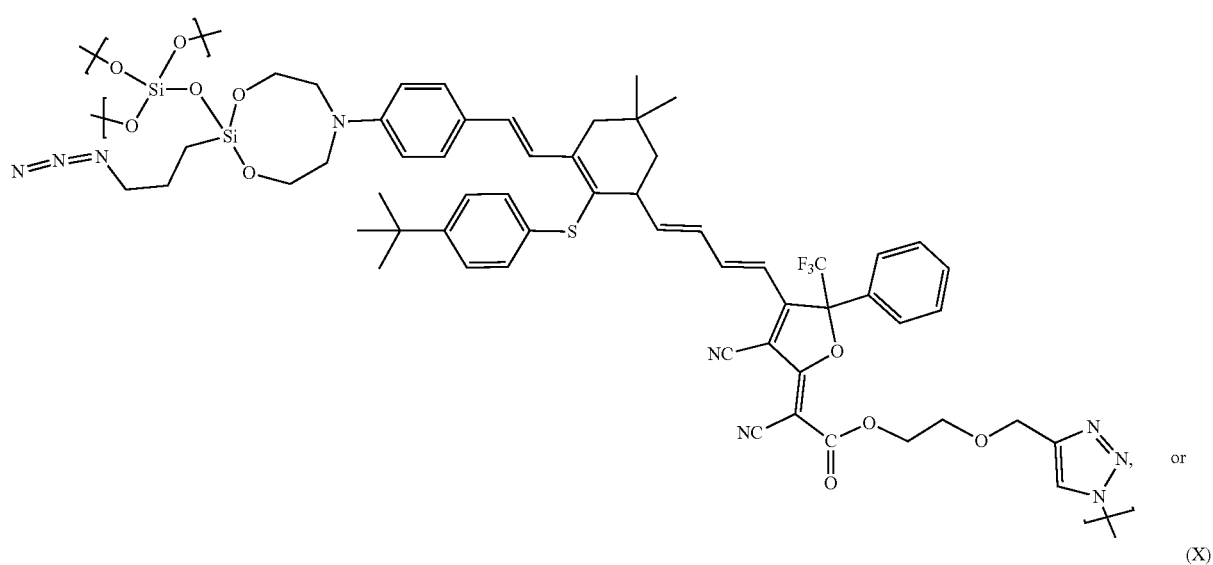
(IX)
or
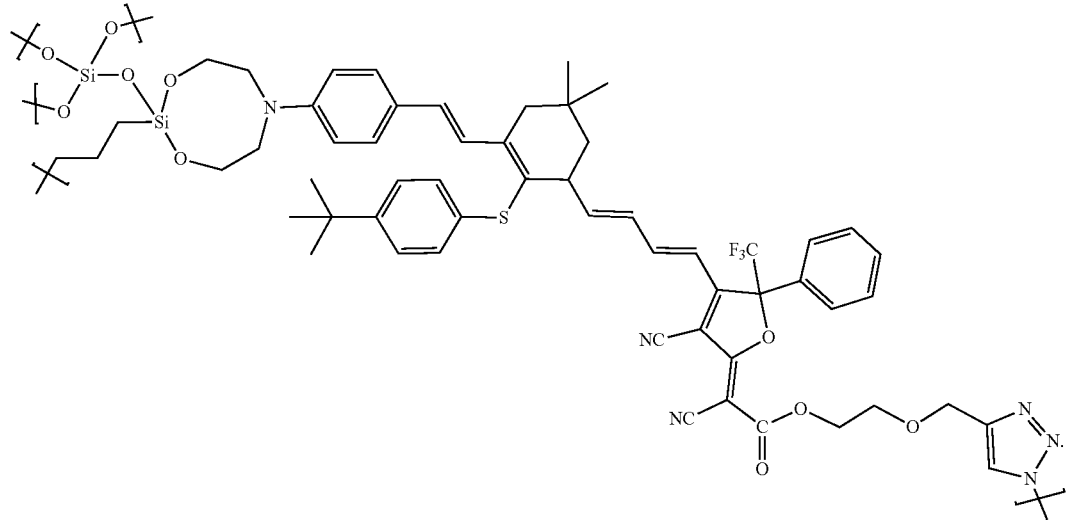
(X)

ZGS Chromophores

In another aspect a zwitterionic ground state (ZGS) chromophore is disclosed comprising:
- a head;
- a donor;
- a bridge;
- an acceptor;
- a tail;
- wherein the head is a reactive group that is covalently bonded to the donor and is configured to react with the underlying surface or a capping agent that supplies a functional group;
- wherein the donor is a group that has excess electron density and allows for connection to the head;
- wherein the bridge electronically communicates between the donor and acceptor;
- wherein the acceptor is deficient in electron density and allows for connection to the tail;
- wherein the tail is a reactive group that is covalently bonded to the acceptor and is configured to react with the underlying surface or a capping agent that supplies a functional group;
- wherein the head and tail allow for sequential polymerization of the electrooptic chromophore; and
- wherein one side of the chromophore perpetually carries a positive charge, one side of the chromophore perpetually carries a negative charge and the positive charge and negative charge are separated by the bridge.

In some embodiments the zwitterionic chromophore anion is carbanion.

In some embodiments the ZGS chromophore carbanion is of the structure

wherein X is —CN, —SO$_2$CH$_3$, —SO$_2$CF$_3$, —SO$_2$R, —C(=O)OR, —C(=O)NH$_2$, —C(=O)NHR, —C(=O)NR$_2$, where R is a C 1-10 alkyl, C 1-10 perfluoroalkyl, aryl, fluoroaryl or combinations thereof.

In some embodiments the ZGS chromophore cation is carbocation, ammonium, pyridinium, phosphonium, phosphininium or borinine.

In some embodiments the ZGS chromophore cation is a substituted alkyl pyridinium.

In some embodiments the ZGS chromophore cation is a substituted alkyl pyridinium where the substitution is a C 1-10 alkyl, C 1-10 perfluoroalkyl, aryl, fluoroaryl or combinations thereof.

In some embodiments the ZGS chromophore cation is of structure

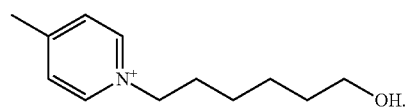

In some embodiments the ZGS chromophore bridge is of the structure

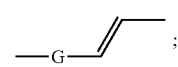

wherein G is an aryl, substituted aryl, heteroaryl, or substituted heteroaryl.

In some embodiments wherein the substitution ZGS chromophore bridge is C 1-10 alkyl, C 1-10 alkyl ether, C 1-10 alkyl thioether, C 1-10 alkyl ester, C 1-10 alkyl amide and the substitution is terminated with an H, OH, SH, the, the, NH$_2$, NHR, PH$_2$, PHR where R is a C 1-10 alkyl, C 1-10 perfluoroalkyl, aryl, fluoroaryl or combinations thereof.

In some embodiments the ZGS chromophore bridge is of the structure

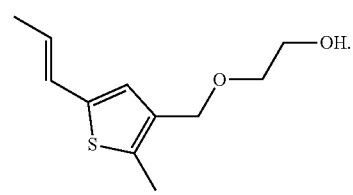

In some embodiments the ZGS chromophore is of structure

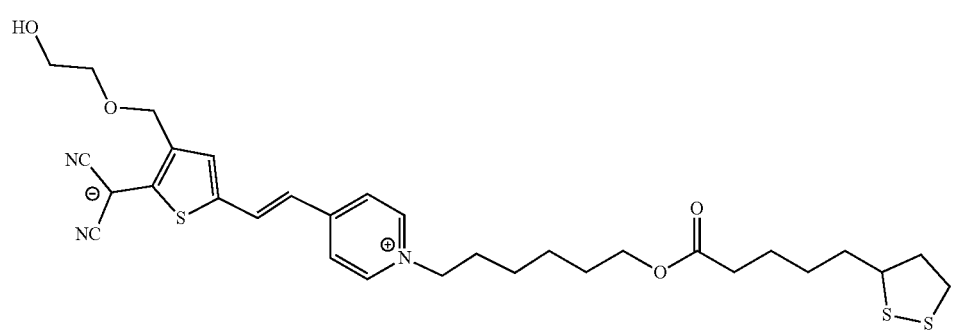

(XI)

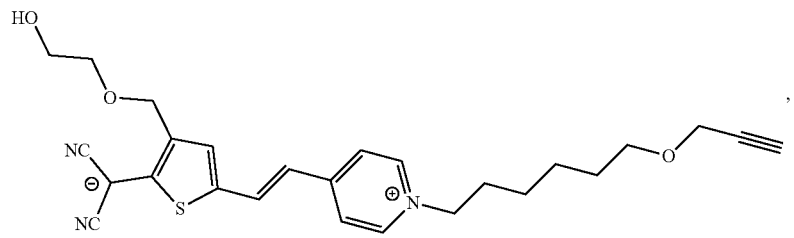
(XII)
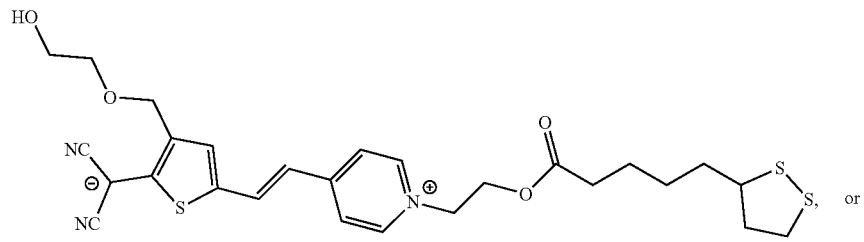
(XIII)
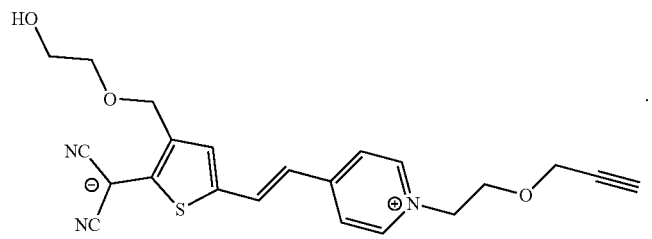
(XIV)
In some embodiments the solgel capped zwitterionic chromophore has the structure
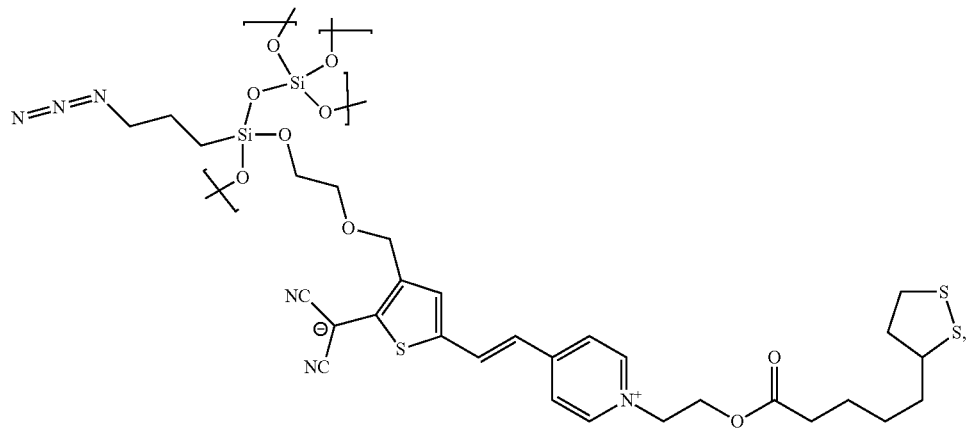
(XV)
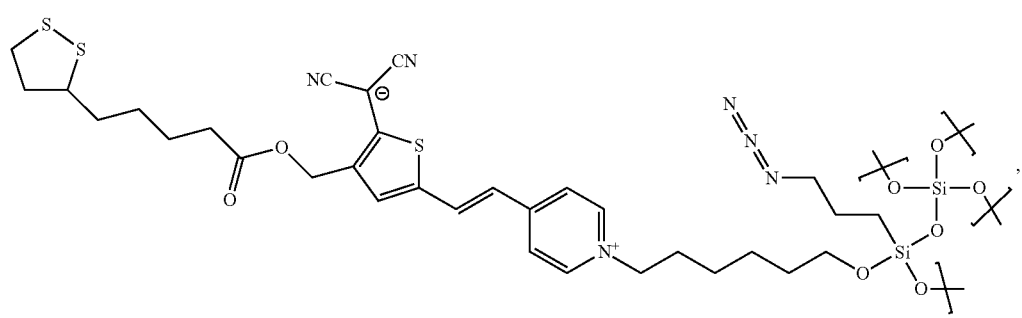
(XVI)

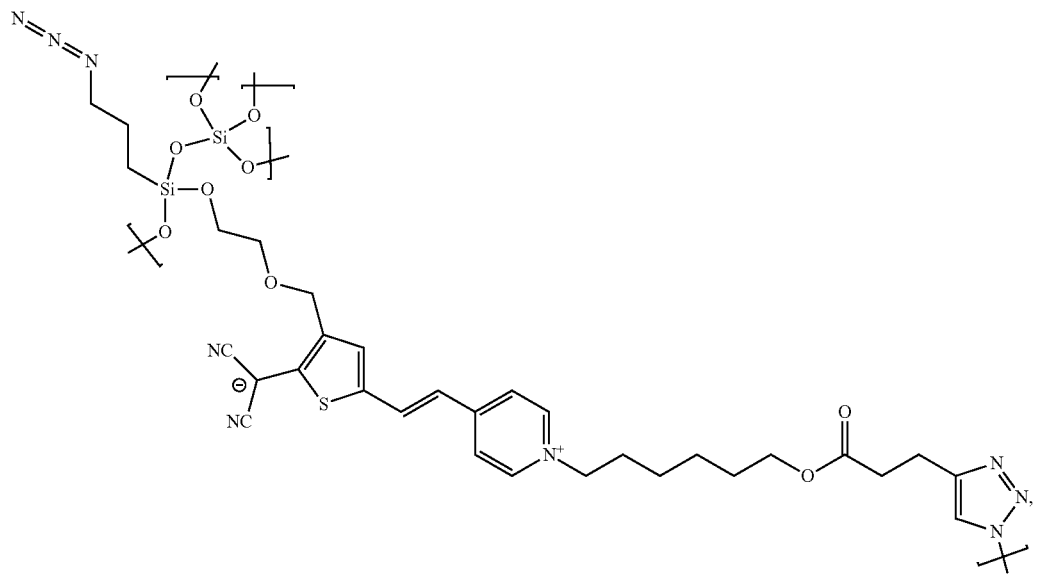
(XVII)
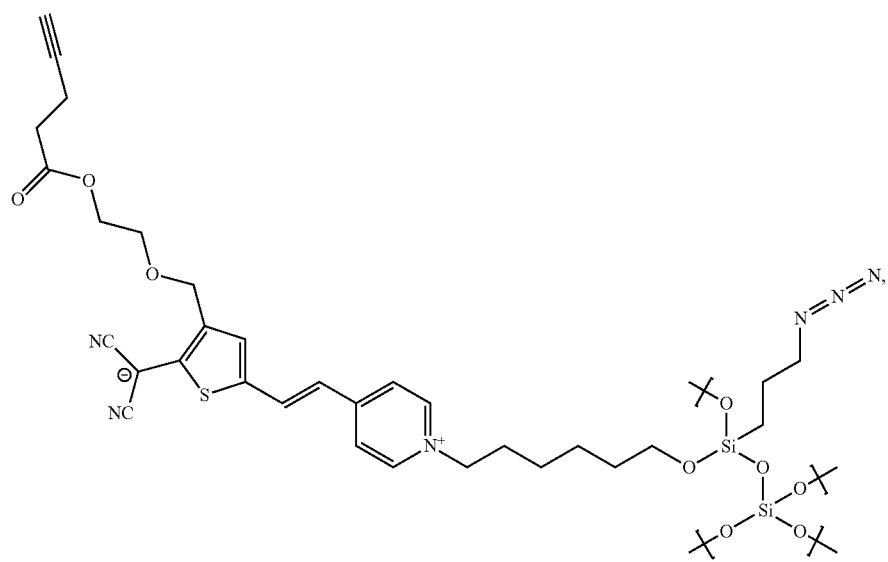
(XVIII)

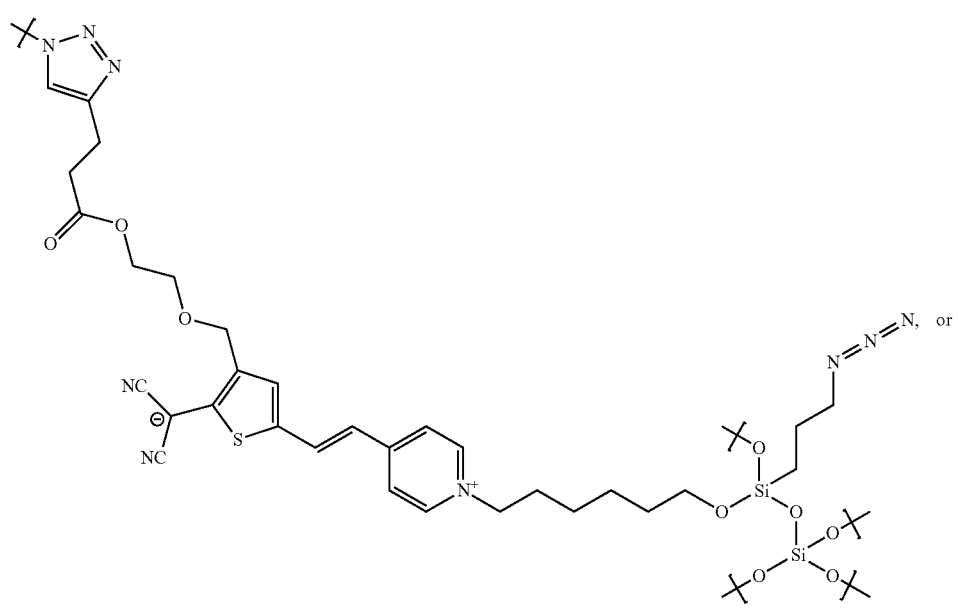

(XIX)

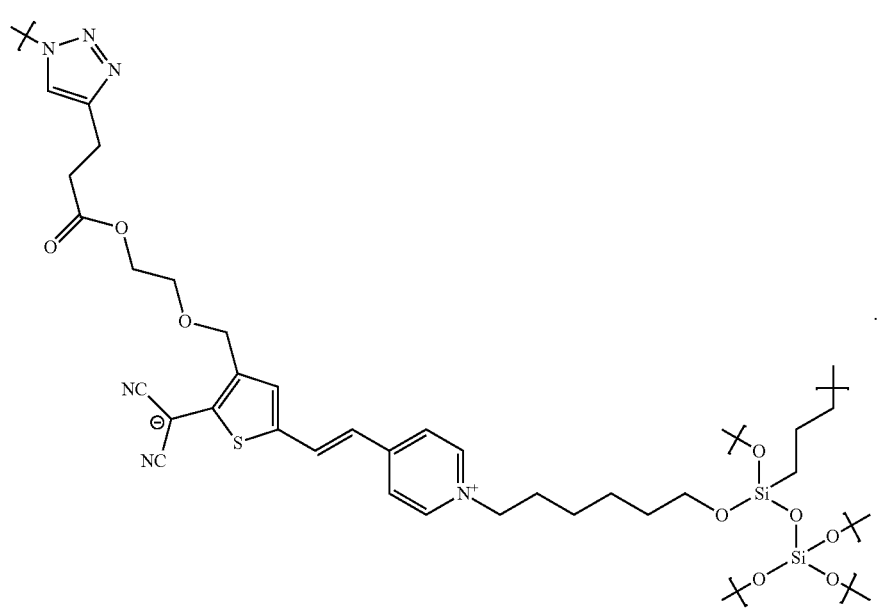

(XX)

Dimer Chromophores

In some embodiments the NGS electrooptic chromophore is paired with a ZGS ground state chromophore through a common structural unit to form a dimer chromophore.

In some embodiments of the dimer chromophore the zwitterionic chromophore anion is carbanion.

In some embodiments of the dimer chromophore the zwitterionic chromophore carbanion is of the structure

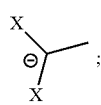

wherein X is —CN, —SO$_2$CH$_3$, —SO$_2$CF$_3$, —SO$_2$R, —C(=O)OR, —C(=O)NH$_2$, —C(=O)NHR, —C(=O)NR$_2$, where R is a C 1-10 alkyl, C 1-10 perfluoroalkyl, aryl, fluoroaryl or combinations thereof.

In some embodiments of the dimer chromophore the zwitterionic chromophore cation is carbocation, ammonium, pyridinium, phosphonium, phosphininium or borinine.

In some embodiments of the dimer chromophore the zwitterionic chromophore cation is a substituted alkyl pyridinium.

In some embodiments of the dimer chromophore the zwitterionic chromophore cation is a substituted alkyl pyridinium where the substitution is OH, SH, the, the, NH$_2$, NHR, PH$_2$, PHR where R is a C 1-10 alkyl, C 1-10 perfluoroalkyl, aryl, fluoroaryl or combinations thereof.

In some embodiments of the dimer chromophore the zwitterionic chromophore cation is of structure

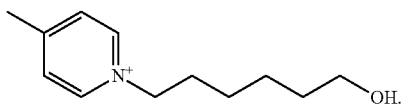

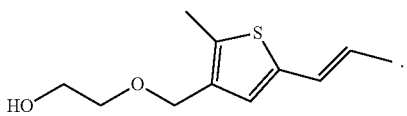

In some embodiments of the dimer chromophore the zwitterionic chromophore bridge is of the structure

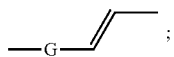

wherein G is an aryl, substituted aryl, heteroaryl, or substituted heteroaryl.

In some embodiments of the dimer chromophore the zwitterionic chromophore bridge is of the structure In some embodiments of the dimer chromophore wherein the common structural unit binding the chromophore and zwitterionic chromophore is aryl, bisaryl, trisaryl, teraryl, pentaryl, hexaryl, fused aryl, heteroaryl, bisheteroaryl, trisheteroaryl, terheteroaryl, pentheteroaryl, hexheteroaryl, fused heteroaryl with at least 4 substituents.

In some embodiments of the dimer chromophore wherein the common structural unit binding the chromophore and zwitterionic chromophore substituents are selected from OH, SH, the, the, —NCO, —C(=O)OH, $NH_2$, $PH_2$, $AsH_2$, B, NHC(=O)OH, and any combinations thereof.

In some embodiments of the dimer chromophore wherein the common structural unit binding NGS chromophore and ZGS chromophore is 3',5'-dihydroxy-[1,1'-biphenyl]-3,5-dicarboxylic acid.

In some embodiments of the dimer chromophore the structure of the dimer chromophore is:

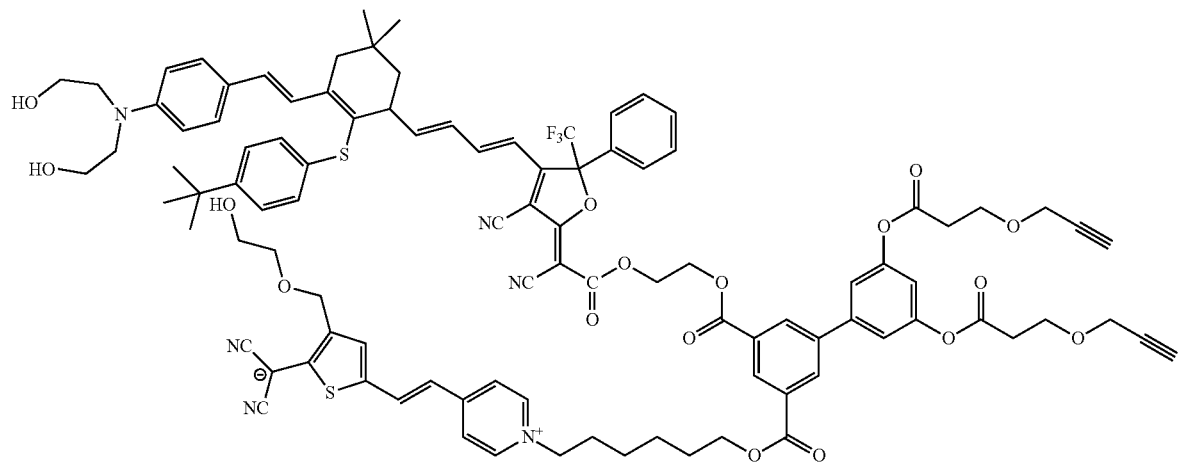

(XXI)

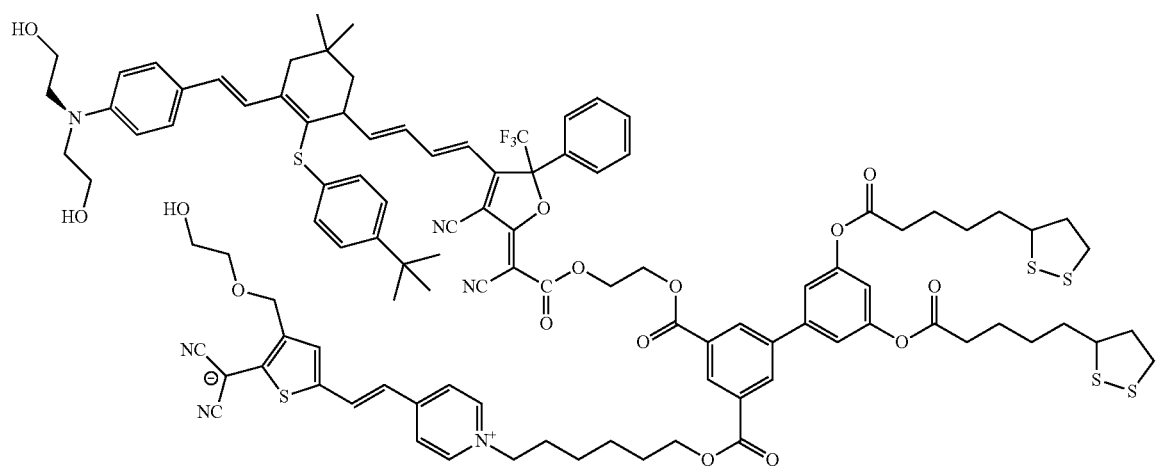

(XXII)

-continued
(XXIII)
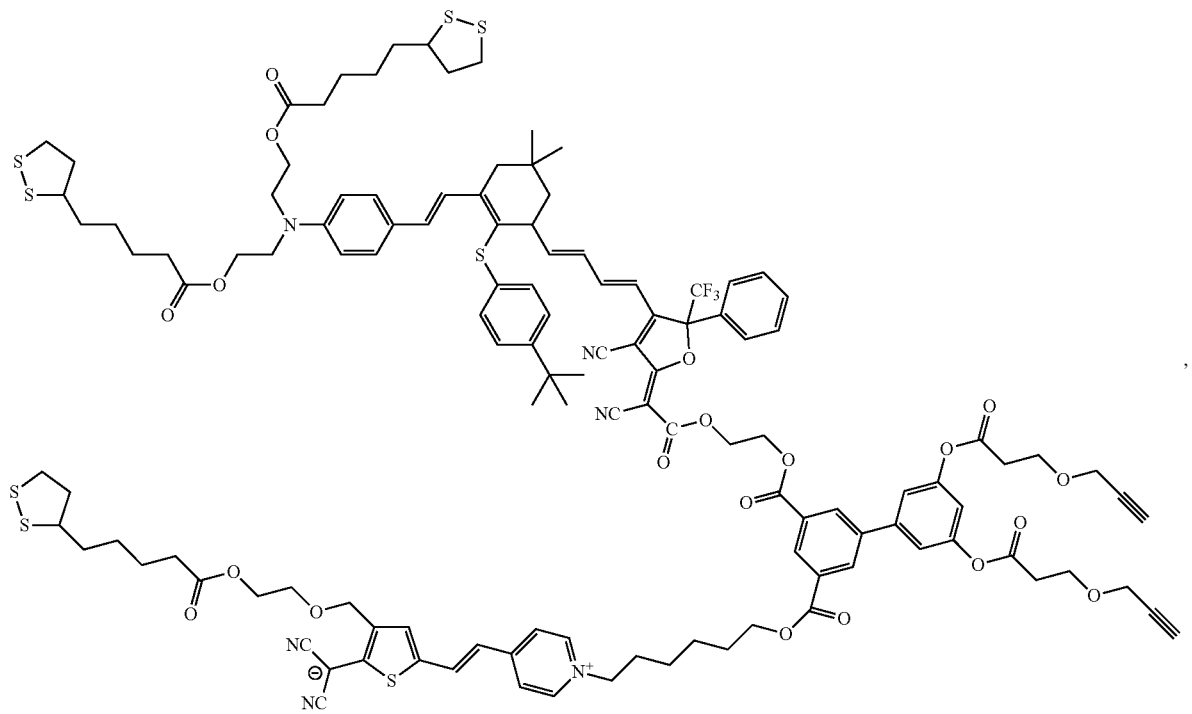
,
(XXIV)
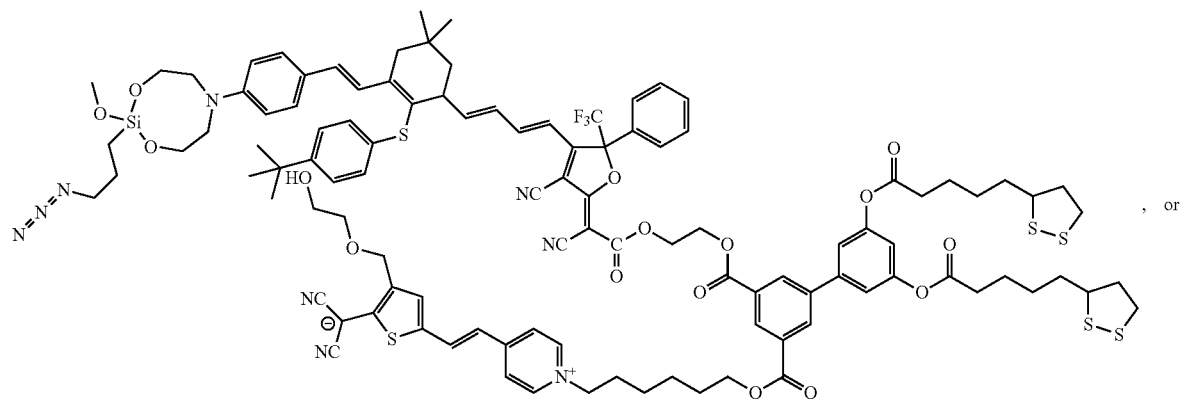
, or (XXV)
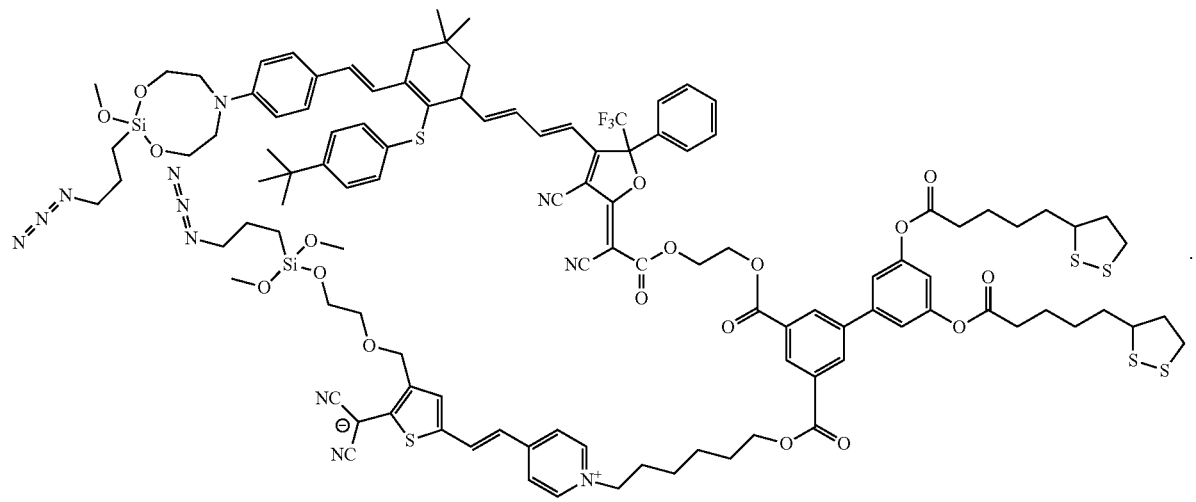
In some embodiments of the dimer chromophore the sol-gel capped dimer chromophore has the structure
(XXVI)
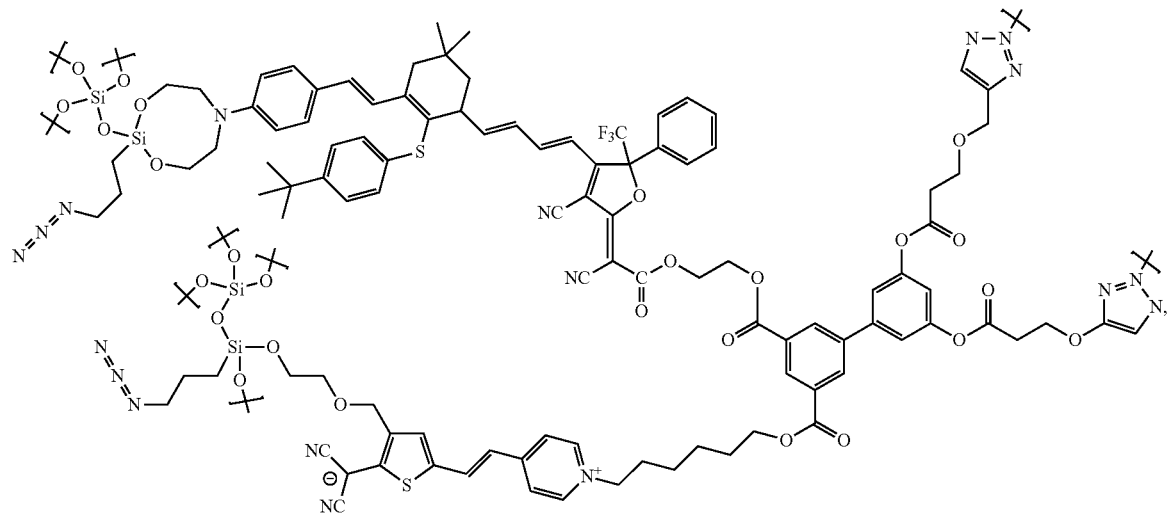

(XXVII)
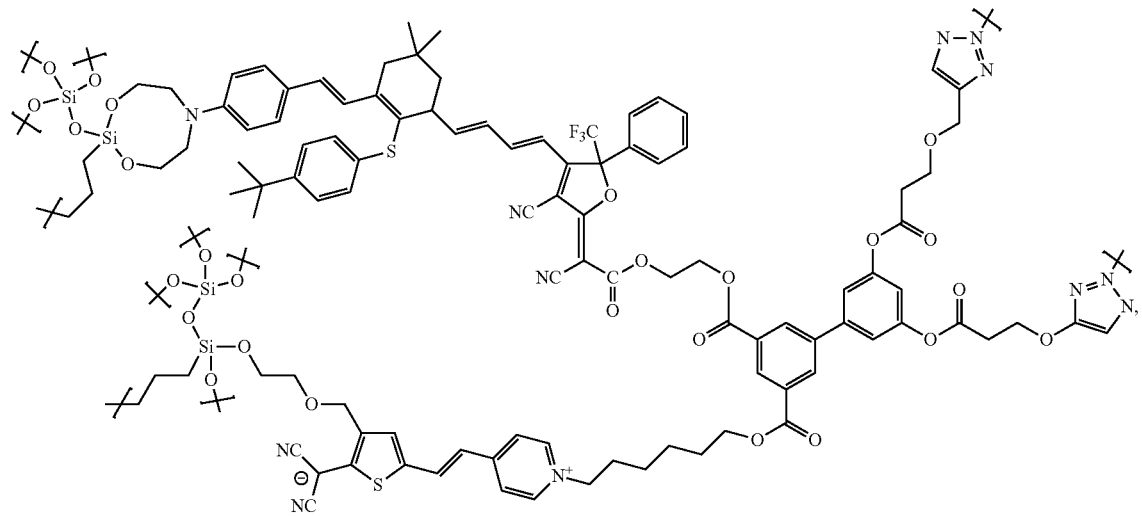
(XXVIII)
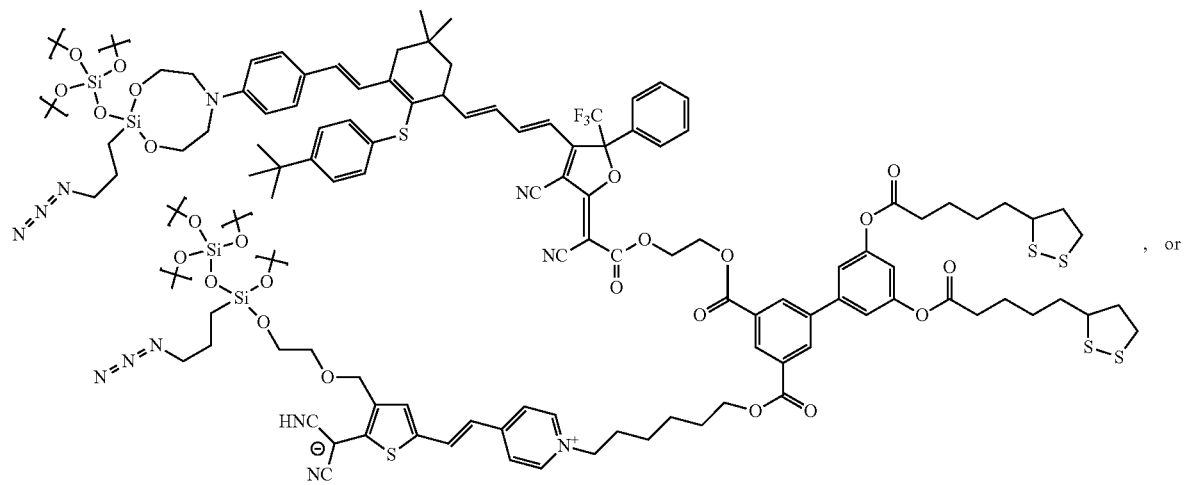
, or
(XXIX)
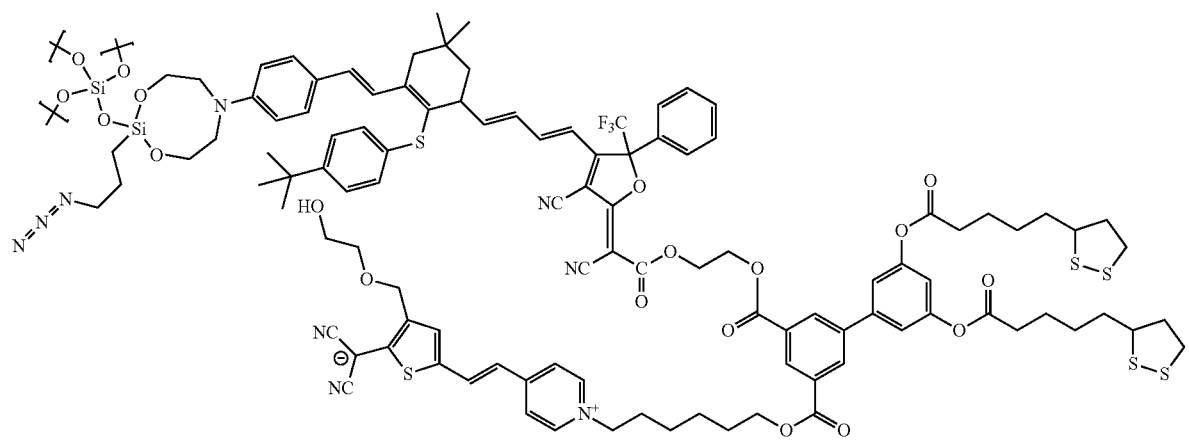
.

Sequential Synthesis Method

In another aspect a sequential synthesis method for the non-centrosymmetric alignment of electrooptic chromophores is disclosed comprising:

- an electrooptic chromophore;
- wherein the electrooptic chromophore has a tail and a head;
- a capping agent;
- an electrode;
- wherein the tail of the electrooptic chromophore chemically in one solution reacts with the surface of the electrode to form a chemical bond between the tail of the electrooptic chromophore and the electrode;
- wherein upon repeated reaction of the tail of the electrooptic chromophore with the electrode surface a monolayer film of the chromophore is emplaced upon the surface of the electrode, such that the chromophores in the monolayer are inherently non-centrosymmetric;
- wherein the solvent is removed from the monolayer;
- wherein the head of the electrooptic chromophore chemically reacts with the capping agent in a different solution to form a chemical bond with the head of the electrooptic chromophore and the capping agent;
- wherein the capping agent forms a solgel with surface functional groups, locking the non-centrosymmetric monolayer in place;
- wherein the solvent is removed from the monolayer capped with solgel with surface functional groups;
- wherein the tail of the electrooptic chromophore in a different solution chemically reacts with the surface functional groups on the solgel to form a chemical bond between the tail of the electrooptic chromophore and the solgel capping agent;
- wherein upon reaction of the tail of the electrooptic chromophore with the capping layer on the monolayer of the electrooptic chromophore on the electrode surface sequentially yields a second non-centrosymmetric layer of the electrooptic chromophore chemically bonded to the monolayer of the electrooptic chromophore chemically bonded to the surface of the electrode;
- wherein the solvent is removed from the second layer;
- wherein repeated steps of contact with the capping agent and the tail of the chromophore sequentially adds layers of the electrooptic chromophore; and
- wherein the chromophores and the layers of chromophores added sequentially are arranged in a non-centrosymmetric manner.

In some embodiments of the sequential synthesis method the electrode is gold, silver, copper, platinum, palladium, nickel, iridium, rhodium, cobalt, osmium, ruthenium, iron, rhenium, manganese, tungsten, molybdenum, chromium, zinc, indium tin oxide, zinc oxide, zinc indium tin oxide, graphene, graphite, aluminum zinc oxide, titanium nitride, gallium nitride, nickel oxide indium tin oxide, silicon, silicon nitride, doped silicone and any combination thereof.

In some embodiments of the sequential synthesis method the tail of the chromophore is bonded to the surface of the electrode by sulfur, selenium, tellurium, phosphorus, arsenic, antimony, bismuth, boron, silicon, silane, silicon oxide, siloxane and any combinations thereof.

In some embodiments of the sequential synthesis method the chromophore bonded to the surface of the electrode is (XXX)

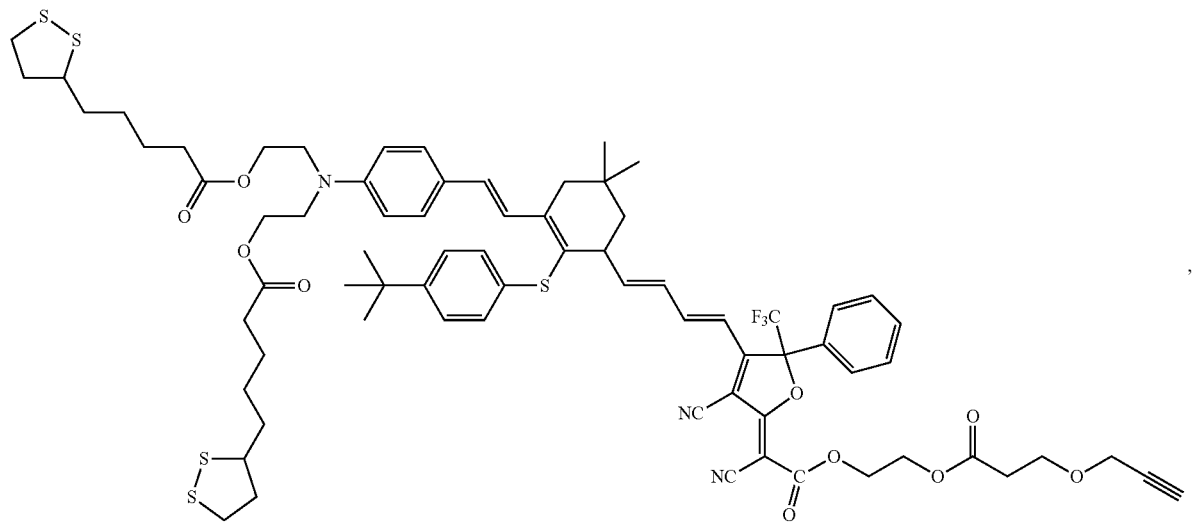
(XXXI)
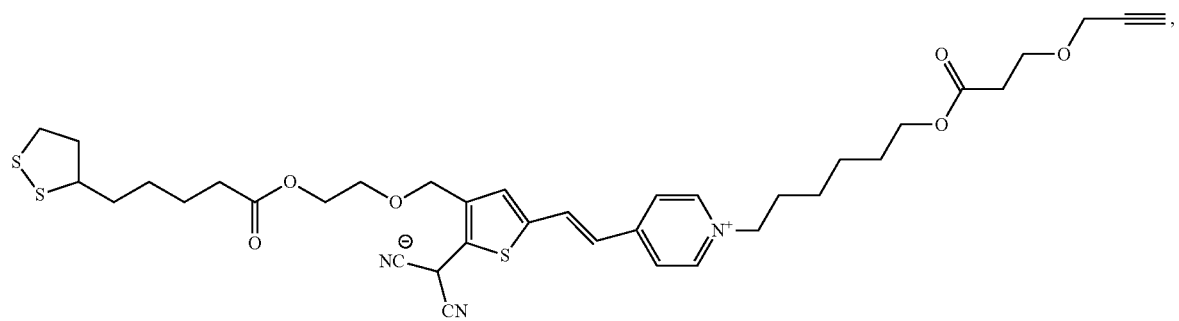
(XXXII)
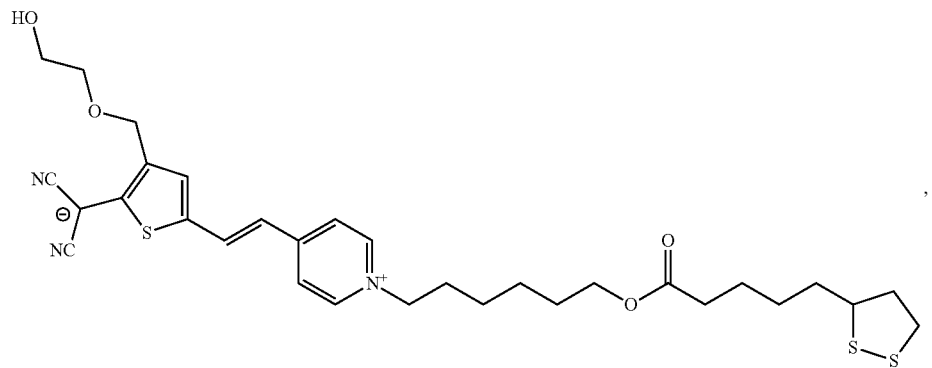
(XXXIII)

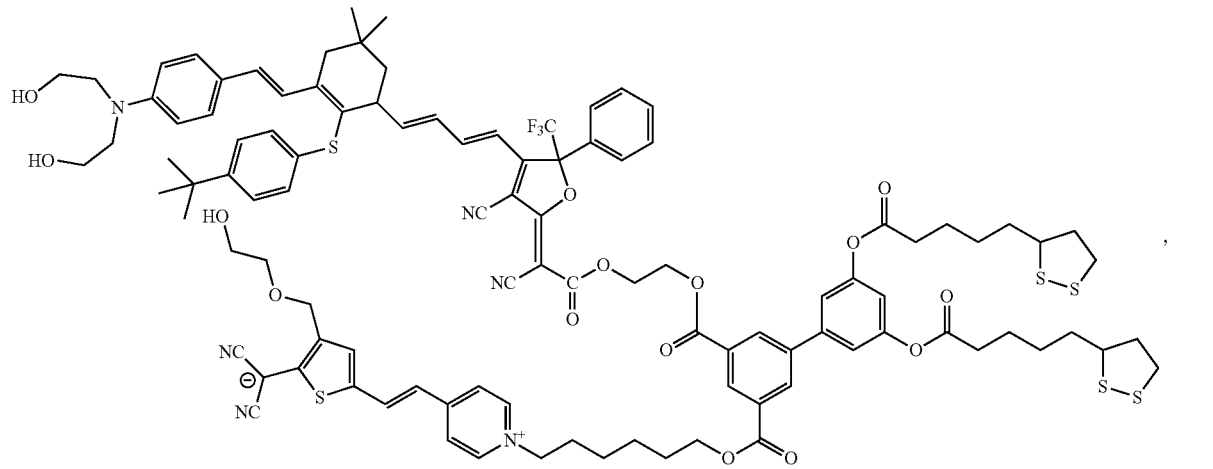

(XXXIV)

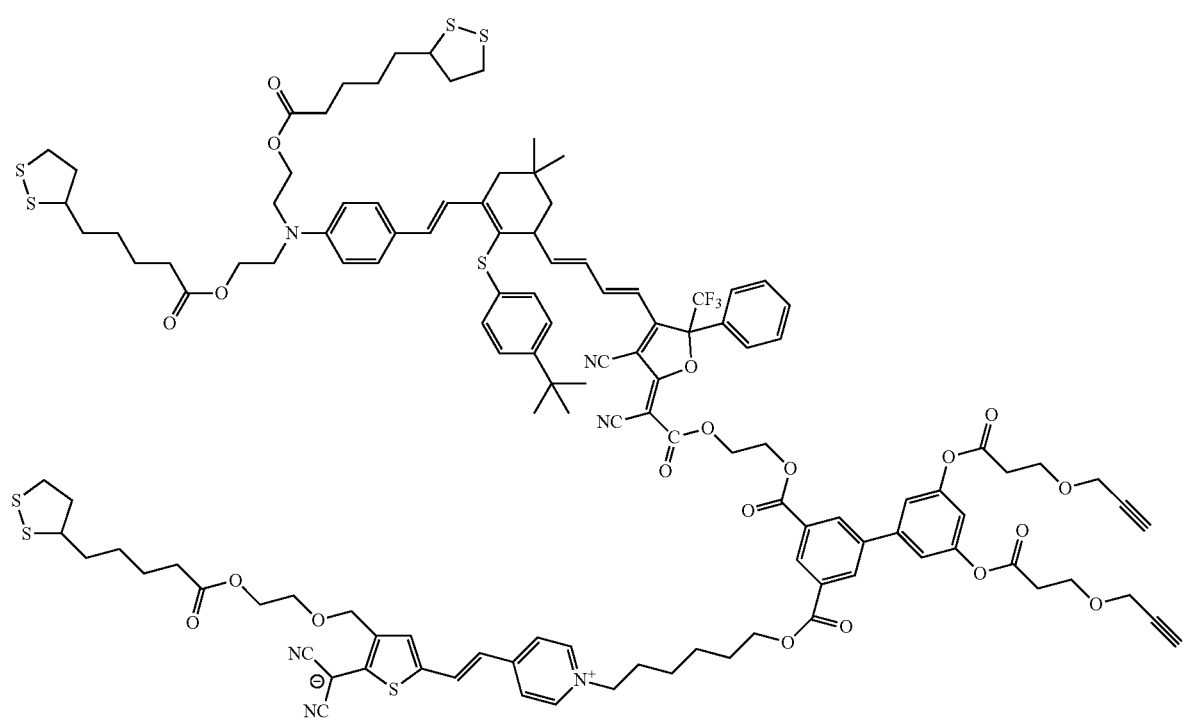

(XXXV)

or combinations thereof.

In some embodiments of the sequential synthesis method the tail of the chromophore is an alkyne.

In some embodiments of the sequential synthesis method the tail of the chromophore is of structure

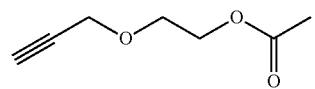

In some embodiments of the sequential synthesis method the chromophores are in paired dipoles, in paired zwitterions or in paired dipoles and zwitterions with the pairs in either like or opposite charges.

In some embodiments of the sequential synthesis method the substitution is OH, SH, the, the, $NH_2$, $PH_2$, $AsH_2$, $SbH_2$, $BH_2$, $B(OH)_2$, and any combinations thereof.

In some embodiments of the sequential synthesis method the head of the chromophore is of structure

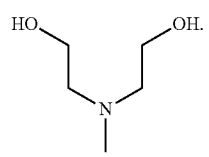

In some embodiments of the sequential synthesis method the capping agent is an azide silane.

In some embodiments of the sequential synthesis method the capping agent is catena-octachlorotrisiloxane and 3-azopmopyltrimethoxysilane.

In some embodiments of the sequential synthesis method the capping agent is contacted with the head of the chromophore.

In some embodiments of the sequential synthesis method the capping agent is contacted with the head of the chromophore to give structure

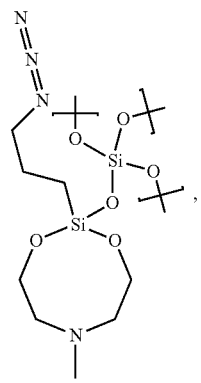

,

-continued

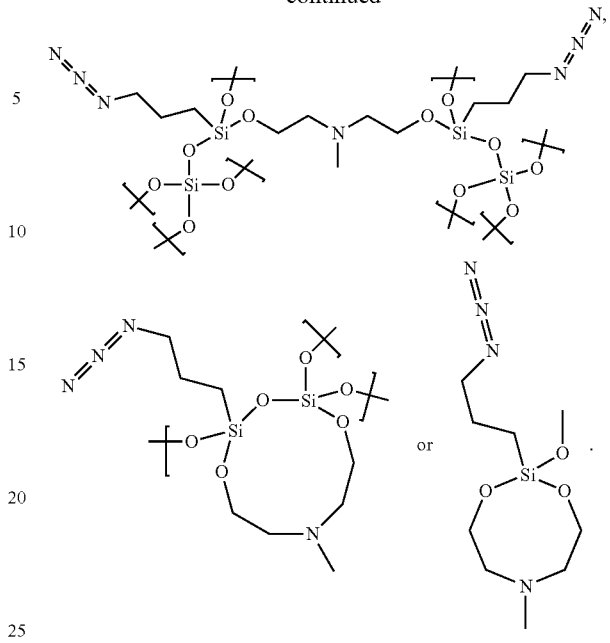

In some embodiments of the sequential synthesis method the chromophore is of structure

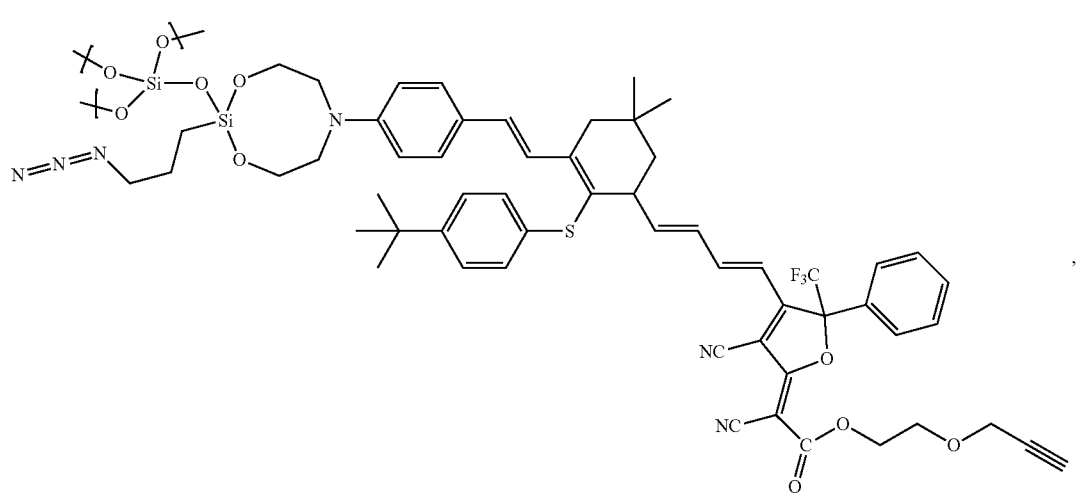

(XXXVI)

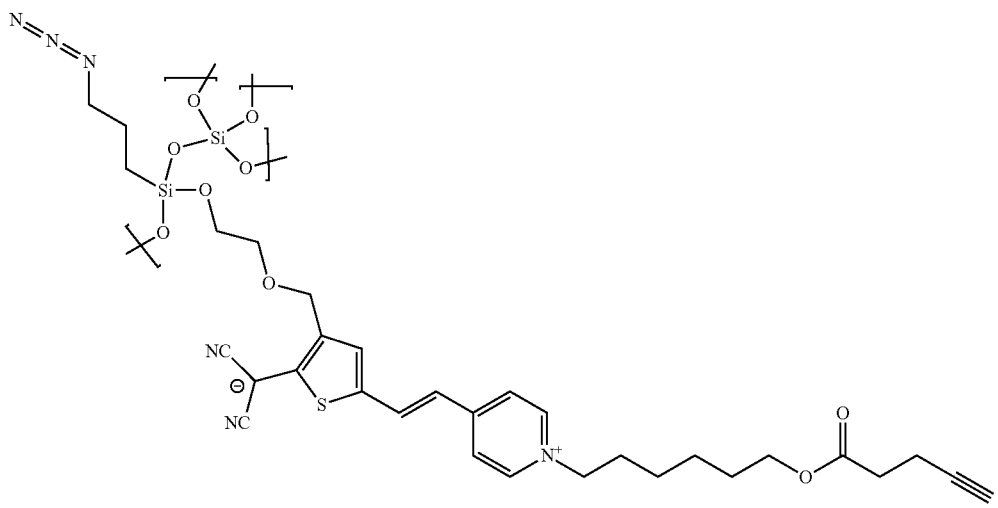

(XXXVII)

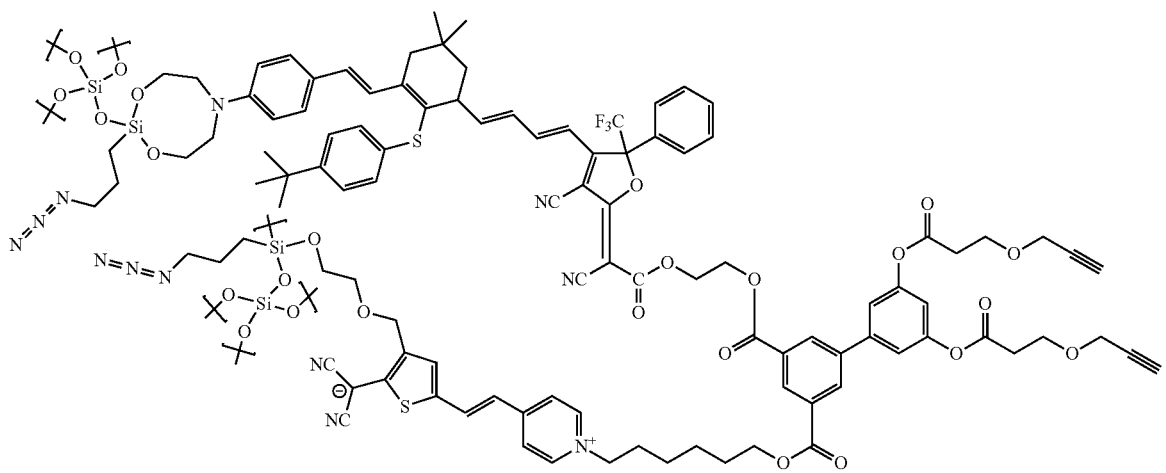

(XXXVIII)

or combinations thereof is contacted with the chromophore monolayer deposited on the electrode.

In some embodiments of the sequential synthesis method a Diels Alder, 2+2 cycloaddition, 4+2 cycloaddition, 3+2 cycloaddition, Azide-alkyne Huisgen cycloaddition, esterification, ring opening, amidization, or dehydration reaction occurs between the chromophore monolayer on the electrode surface and the deposited chromophore.

In some embodiments the sequential synthesis method the reaction between chromophore layers is catalyzed.

In some embodiments of the sequential synthesis method the catalyst contains copper, cobalt, silver, platinum, tin, bronze, rhodium, nickel, zirconium, zinc, manganese, calcium, iron, and combinations thereof.

In some embodiments of the sequential synthesis method the structure is an electrode;
a chain bonded to the electrode;
the chain bonded to one end of a chromophore;
solgel glass bonded to the other end of the chromophore;
wherein the surface of the solgel is functionalized with an entity that undergoes a Diels Alder, 2+2 cycloaddition, 4+2 cycloaddition, 3+2 cycloaddition, Azide-alkyne Huisgen cycloaddition, esterification, ring opening, amidization, or dehydration reaction occurs between the chromophore monolayer on the electrode surface and the deposited chromophore.

In some embodiments of the sequential synthesis method the structure is;
a gold electrode;
a sulfur moiety bonded to the gold electrode;
the sulfur moiety bonded to bonded to one end of a neutral chromophore through a hydrocarbon chain, a hydrocarbon ether chain, a hydrocarbon ester chain, an aromatic, an ether aromatic, an ester aromatic;
solgel bonded to the other end of the neutral chromophore;
wherein the surface of the solgel is functionalized with an azide moiety; and
wherein the structure is contacted with an alkyne.

In some embodiments the structure is
a gold electrode;
a sulfur moiety bonded to the gold electrode;
the sulfur moiety bonded to bonded to one end of a zwitterionic chromophore through a hydrocarbon chain, a hydrocarbon ether chain, a hydrocarbon ester chain, an aromatic, an ether aromatic, an ester aromatic;
solgel glass bonded to the other end of the zwitterionic chromophore;
wherein the surface of the solgel is functionalized with an azide moiety; and
wherein the structure is contacted with an alkyne.

In some embodiments the structure is
a gold electrode;
a sulfur moiety bonded to the gold electrode;
the sulfur moiety bonded to bonded to one end of a zwitterionic chromophore-neutral chromophore dimer through a hydrocarbon chain, a hydrocarbon ether chain, a hydrocarbon ester chain, an aromatic, an ether aromatic, an ester aromatic;
solgel glass bonded to the other end of the zwitterionic chromophore-neutral chromophore dimer,
wherein the surface of the solgel is functionalized with an azide moiety; and
wherein the structure is contacted with an alkyne.

In some embodiments of the sequential synthesis method the structure is
a sulfur moiety bonded to the gold electrode;
the sulfur moiety bonded to bonded to one end of a neutral chromophore, zwitterionic chromophore or zwitterionic chromophore-neutral chromophore dimer through a hydrocarbon chain, a hydrocarbon ether chain, a hydrocarbon ester chain, an aromatic, an ether aromatic, an ester aromatic;
solgel glass bonded to the other end of the neutral chromophore, zwitterionic chromophore or zwitterionic chromophore-neutral chromophore dimer;
wherein the surface of the solgel is functionalized with an azide moiety;
wherein the structure is contacted with a neutral chromophore, zwitterionic chromophore or zwitterionic chromophore-neutral chromophore dimer alkyne;
wherein the alkyne undergoes a 3+2 cycloaddition with the azide to emplace a second chromophore layer in non-centrosymmetric order; and
wherein the second layer is contacted with 3-azopropyltrimethoxysilane and catena-octachlorotrisioxane to cap the second chromophore layer with solgel glass surface functionalized with azide moieties.

In some embodiments of the sequential synthesis method the structure is
a sulfur moiety bonded to the gold electrode;
the sulfur moiety bonded to bonded to one end of a neutral chromophore, zwitterionic chromophore or zwitterionic chromophore-neutral chromophore dimer through a hydrocarbon chain, a hydrocarbon ether chain, a hydrocarbon ester chain, an aromatic, an ether aromatic, an ester aromatic;
solgel glass bonded to the other end of the neutral chromophore, zwitterionic chromophore or zwitterionic chromophore-neutral chromophore dimer;
wherein the surface of the solgel is functionalized with an azide moiety;
wherein the structure is contacted with a neutral chromophore, zwitterionic chromophore or zwitterionic chromophore-neutral chromophore dimer alkyne;
wherein the alkyne undergoes a 3+2 cycloaddition with the azide to emplace a second chromophore layer in non-centrosymmetric order;
wherein the second layer is contacted with 3-azopropyltrimethoxysilane and catena-octachlorotrisioxane to cap the second chromophore layer with solgel glass surface functionalized with azide moieties
wherein the chromophore is sequentially polymerized to give 1-2000 layers of chromophore in non-centrosymmetric order; and
wherein the final 3+2 cycloaddition between the alkyne and the azide results in a sulfur functionalized surface.

In some embodiments 1-2000 layers of chromophore.
In some embodiments 1-1000 layers of chromophore.
In some embodiments 1-500 layers of chromophore.
In some embodiments 1-250 layers of chromophore.
In some embodiments 1-100 layers of chromophore.
In some embodiments 1-50 layers of chromophore.
In some embodiments 5-95 layers of chromophore.
In some embodiments 10-90 layers of chromophore.
In some embodiments 10-50 layers of chromophore.
In some embodiments 100-2000 layers of chromophore.
In some embodiments 200-2000 layers of chromophore.
In some embodiments 300-2000 layers of chromophore.
In some embodiments 400-2000 layers of chromophore.
In some embodiments 500-2000 layers of chromophore.
In some embodiments 100-1000 layers of chromophore.
In some embodiments 200-1000 layers of chromophore.
In some embodiments 300-1000 layers of chromophore.
In some embodiments 400-1000 layers of chromophore.
In some embodiments 500-1000 layers of chromophore.

In some embodiments of the sequential synthesis method the structure is
a sulfur moiety bonded to the gold electrode;
the sulfur moiety bonded to bonded to one end of a neutral chromophore, zwitterionic chromophore or zwitterionic chromophore-neutral chromophore dimer through a hydrocarbon chain, a hydrocarbon ether chain, a hydrocarbon ester chain, an aromatic, an ether aromatic, an ester aromatic;
solgel glass bonded to the other end of the neutral chromophore, zwitterionic chromophore or zwitterionic chromophore-neutral chromophore dimer;
wherein the surface of the solgel is functionalized with an azide moiety;
wherein the structure is contacted with a neutral chromophore, zwitterionic chromophore or zwitterionic chromophore-neutral chromophore dimer alkyne;
wherein the alkyne undergoes a 3+2 cycloaddition with the azide to emplace a second chromophore layer in non-centrosymmetric order;
wherein the second layer is contacted with 3-azopropyltrimethoxysilane and catena-octachlorotrisioxane to cap the second chromophore layer with solgel glass surface functionalized with azide moieties
wherein the chromophore is polymerized to give 1-2000 layers of chromophore in non-centrosymmetric order;
wherein the final 3+2 cycloaddition between the alkyne and the azide results in a sulfur functionalized surface; and
wherein the sulfur functionalized surface is vapor deposited with gold and the gold bonds with the sulfur.

Electrooptic Films

In another embodiment a film comprising a plurality of electrooptic chromophores, a first layer of the electrooptic chromophores bonded to a substrate in a first layer, such that the substrate imparts non-centrosymmetric order onto the electrooptic chromophores, the plurality of electrooptic chromophores including a plurality of least one neutral ground state (NGS) chromophore and a plurality of at least one zwitterionic ground state (ZGS) chromophore is disclosed;
wherein the NGS chromophore comprises:
ahead;
a donor;
a bridge;
an acceptor;
a tail;
wherein the head is a reactive group that is covalently bonded to the donor and is configured to react with the underlying surface or a capping agent that supplies a functional group;
wherein the donor is a group that has excess electron density and allows for connection to the head;
wherein the bridge electronically communicates between the donor and acceptor;
wherein the acceptor is deficient in electron density and allows for connection to the tail;
wherein the tail is a reactive group that is covalently bonded to the acceptor and is configured to react with the underlying surface or a capping agent that supplies a functional group; and wherein the head and tail are configured to allow for sequential polymerization of the NGS electrooptic chromophore in non-centrosymmetric alignment; and wherein the ZGS chromophore comprises:
ahead;
a donor;
a bridge;
an acceptor;
a tail;

wherein the head is a reactive group that is covalently bonded to the donor and is configured to react with a capping agent that supplies a functional group;

wherein the donor is a group that has excess electron density and allows for connection to the head;

wherein the bridge electronically communicates between the donor and acceptor;

wherein the acceptor is deficient in electron density and allows for connection to the tail;

wherein the tail is a reactive group that is covalently bonded to the acceptor and is configured to react with the underlying surface or a capping agent that supplies a functional group;

wherein the head and tail allow for sequential polymerization of the electrooptic chromophore; and wherein one side of the chromophore perpetually carries a positive charge, one side of the chromophore perpetually carries a negative charge and the positive charge and negative charge are separated by the bridge.

In some embodiments the film of the NGS electrooptic chromophore head has an alkene, alkyne, hydroxyl, trifluorovinylether, diene, propadiene, or azide group.

In some embodiments the film of the NGS electrooptic chromophore bridge has a structure:

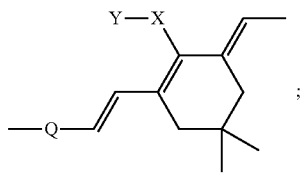

wherein Q is selected from vinyl, aryl, fused aryl, heteroaryl, fused heteroaryl, X is selected from H, O, S, Se, Te, NH, PH, AsH, and Y is selected from absent, H, C 1-10 alkyl, phenyl, benzyl, C 1-10 alkyl substituted phenyl, C1-10 substituted benzyl, O-tert-butyldiphenylsilyl (OTBDPS).

In some embodiments the film has the acceptor as a structure:

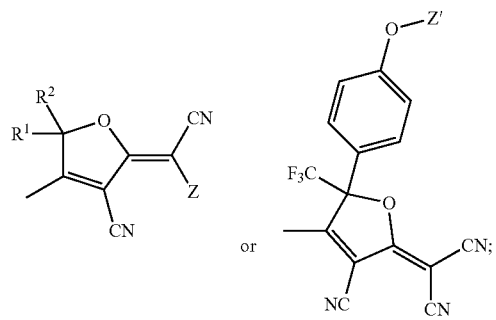

wherein $R^1$ and $R^2$ are independently selected from methyl, trifluoromethyl, ethyl, pentafluoroethyl, phenyl, pentafluorophenyl, perfluoroalkyl and Z or Z' is a structural unit which allows for forming a covalent bond with the tail.

In some embodiments the film of the NGS electrooptic chromophore tail has an alkene, alkyne, hydroxyl, trifluorovinylether, diene, propadiene, or azide group.

In some embodiments the film is sol-gel capped and the NGS electrooptic chromophore has a structure:

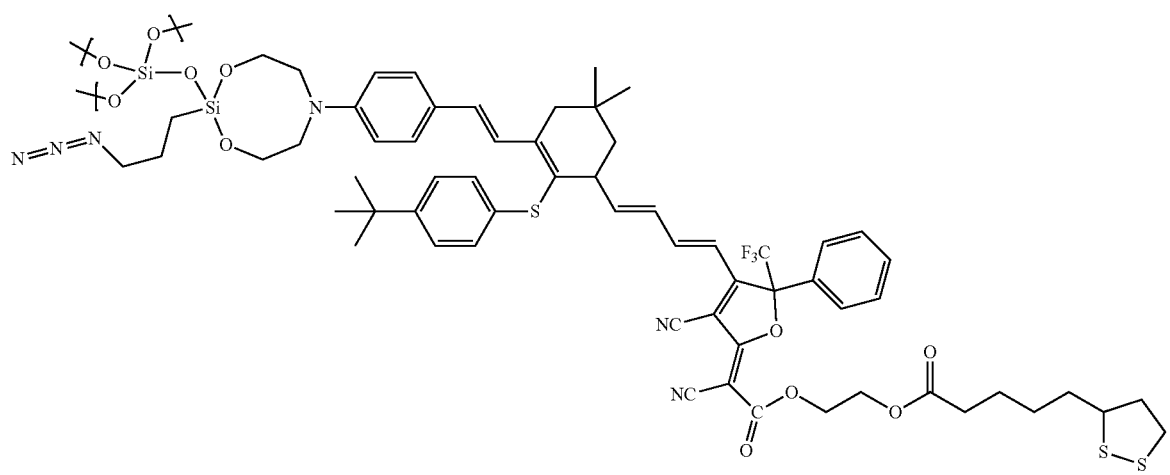

(VIII)

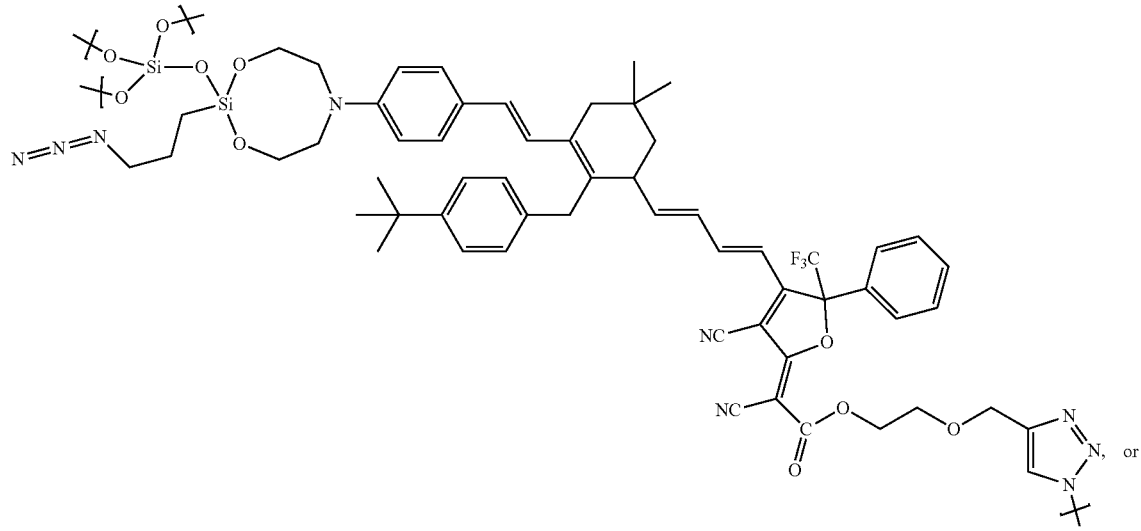

(IX)

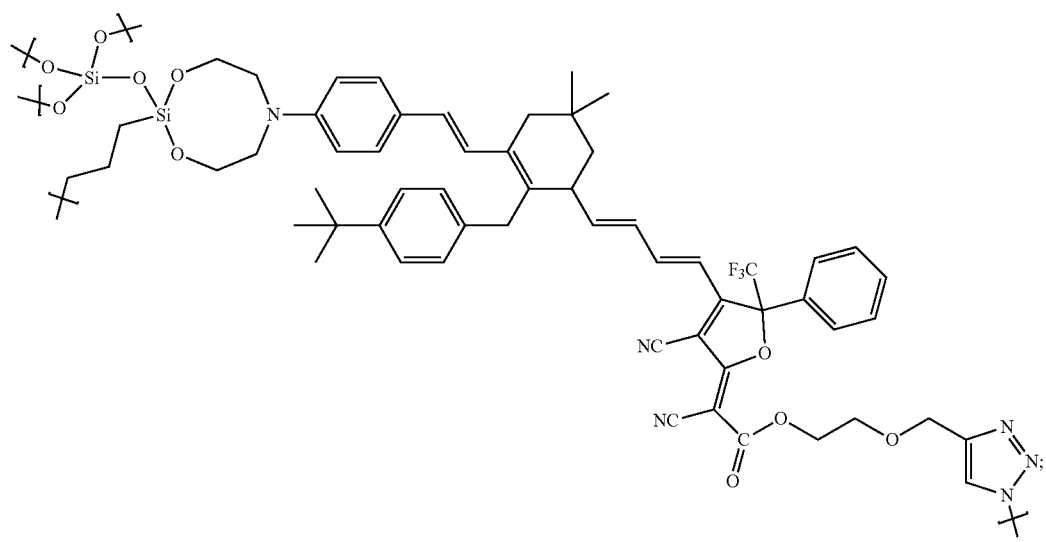

(X)

wherein the sulfur can be bonded to a substrate.

In some embodiments the film has ZGS chromophore where the anion is carbanion.

In some embodiments the film has ZGS chromophore where cation is carbocation, ammonium, pyridinium, phosphonium, phosphininium or borinine.

In some embodiments the film of the ZGS chromophore the bridge is of the structure

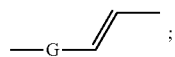

wherein G is an aryl, substituted aryl, heteroaryl, or substituted heteroaryl.

In some embodiments the film of the ZGS chromophore is sol-gel capped and has the

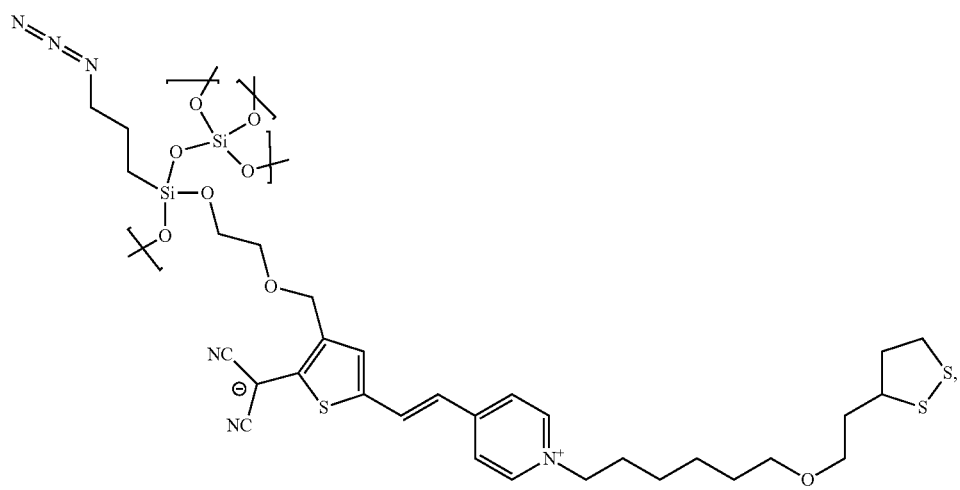
(XV)
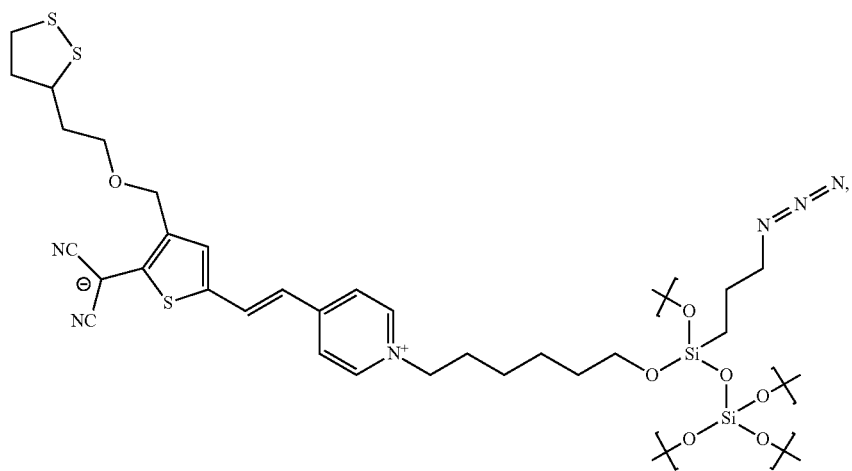
(XVI)
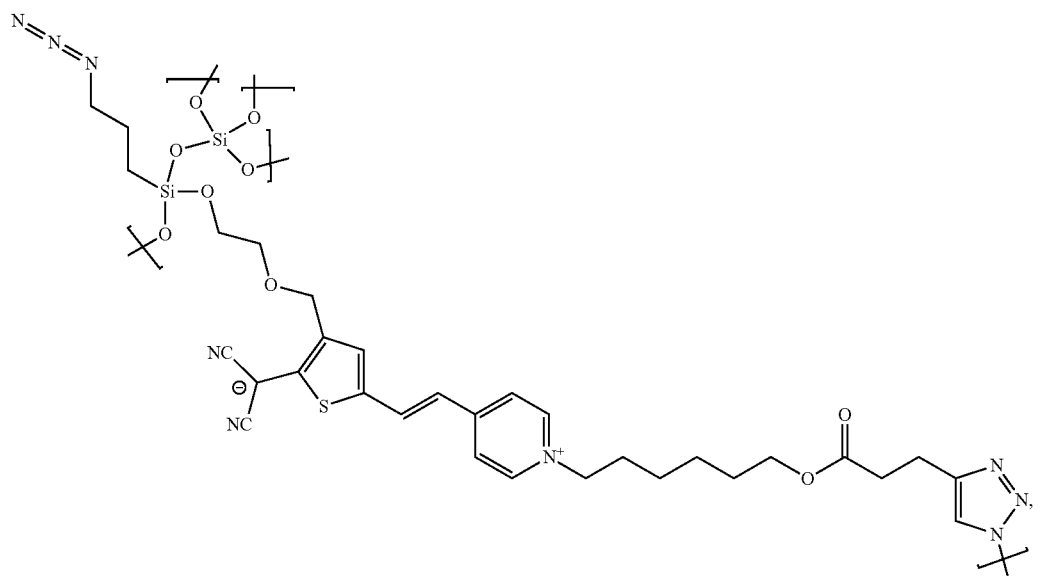
(XVII)

-continued

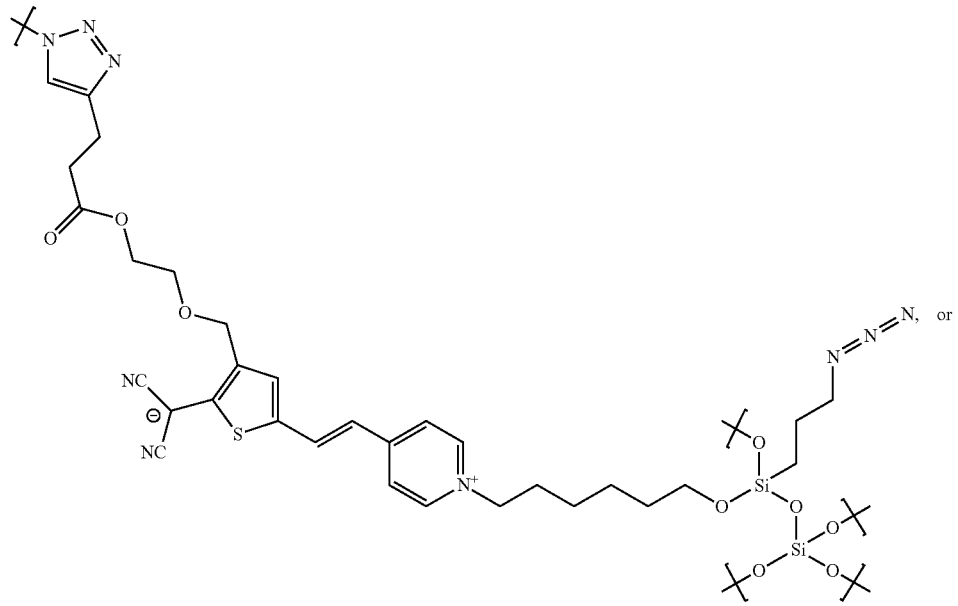
(XIX)

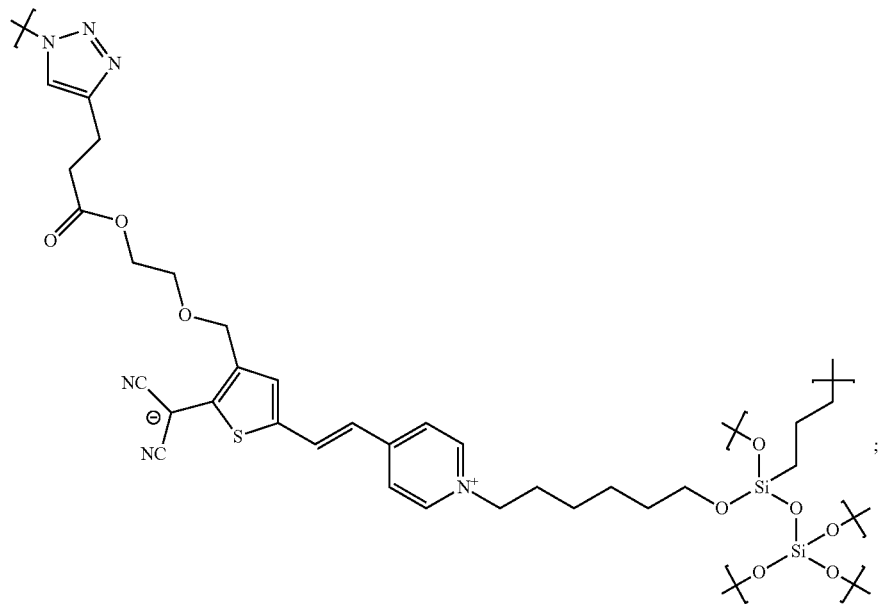
(XX)

where in the sulfur can be bonded to a substrate.

In some embodiments the film has NGS chromophores and at least some of the ZGS chromophores are present in the form of chromophore dimers that include both an NGS chromophore portion and a ZGS chromophore portion bound together through at least one common structural unit.

In some embodiments the film of the dimer chromophore common structural unit is aryl, bisaryl, trisaryl, teraryl, pentaryl, hexaryl, fused aryl, heteroaryl, bisheteroaryl, trisheteroaryl, terheteroaryl, pentheteroaryl, hexheteroaryl, or fused heteroaryl with at least 4 substituents.

In some embodiments the film of the dimer chromophore is sol-gel capped and has a structure:

(XXVI)
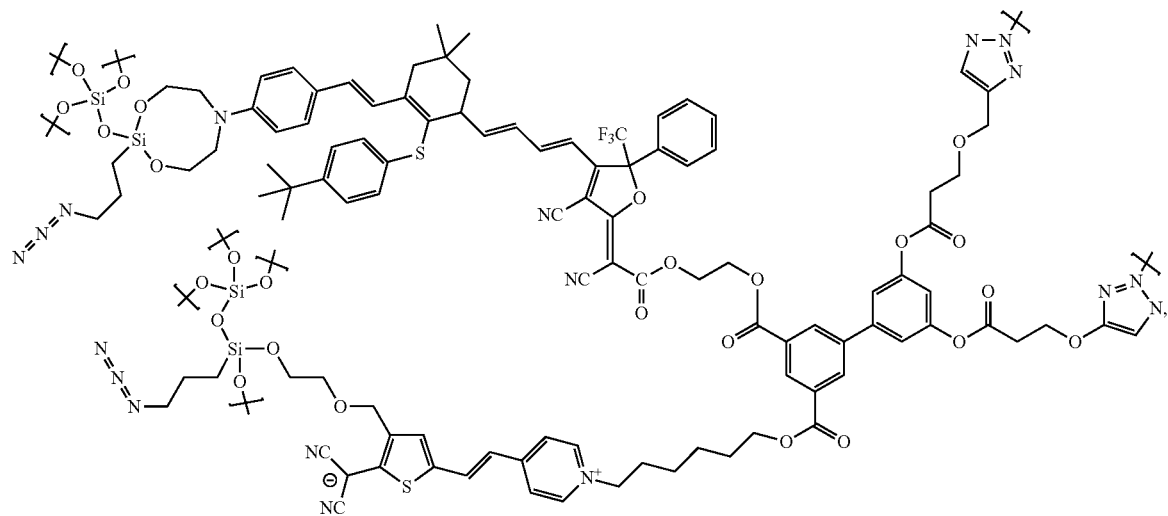
(XXVII)
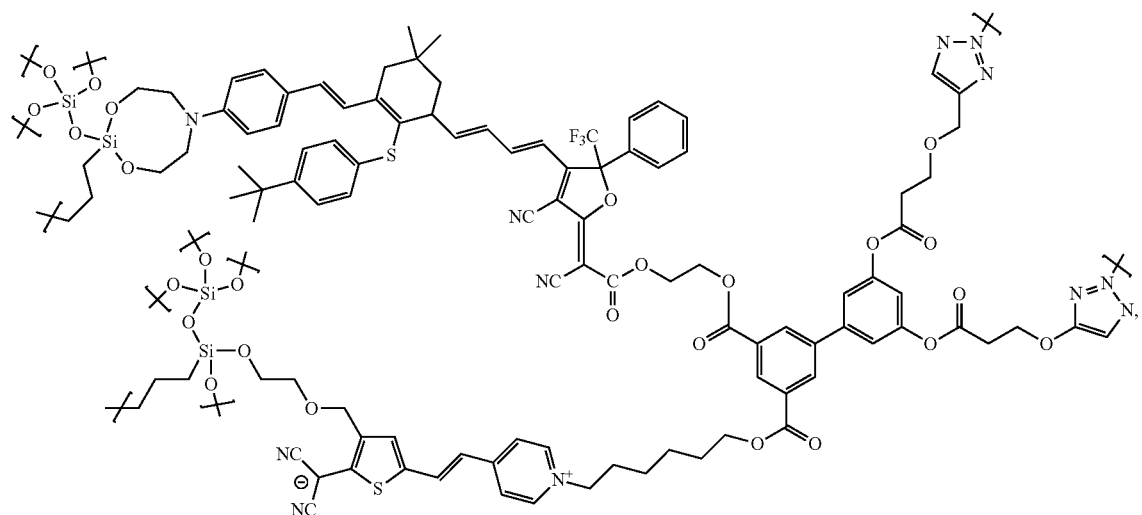
(XXVIII)
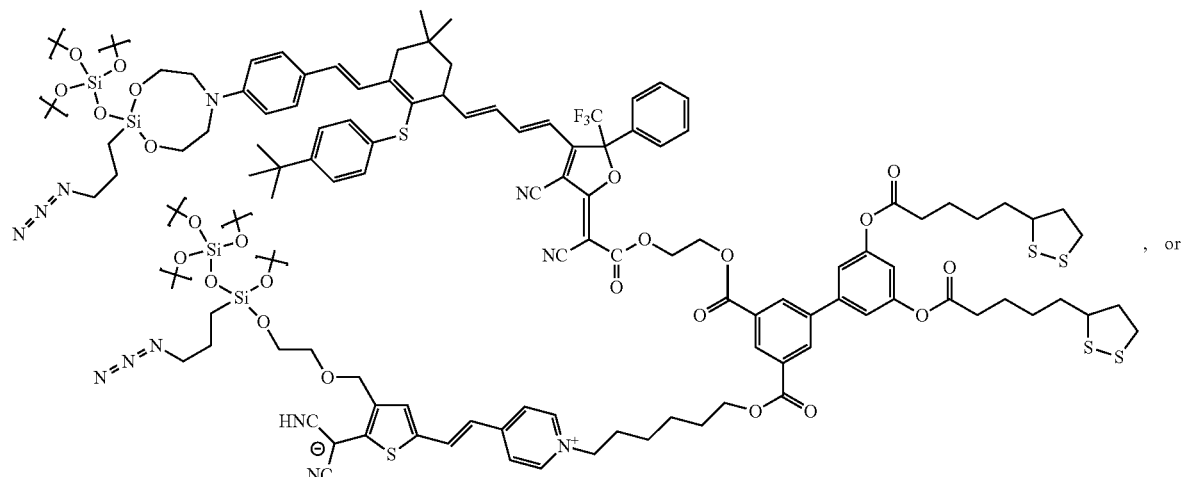
, or (XXIX)

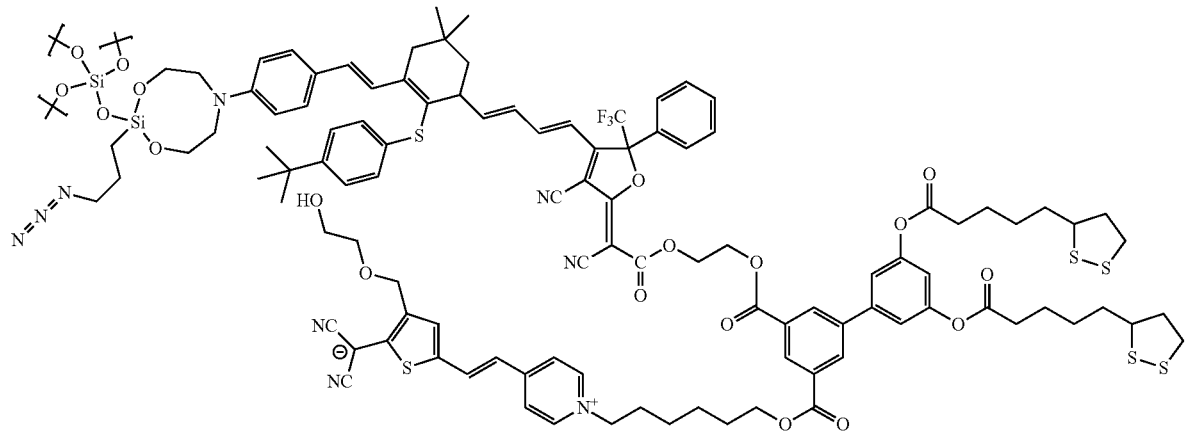

In some embodiments the film comprises a second layer, that includes a plurality of least one NGS chromophore and a plurality of at least one ZGS chromophore, covalently bonded to the first layer, such that the non-centrosymmetric order is maintained in the second layer of chromophores.

In some embodiments the film is formed by a cycloaddition reaction between (a) in the layer a first polarizable chromophore comprising at least two first reactive groups crosslinkable by solgel followed by cycloaddition and (b) in the second layer a second polarizable chromophore comprising one or more compounds comprising at least two counterpart reactive groups.

In some embodiments the film first layer is capped with a solgel glass that the second layer is bonded to.

In some embodiments the film solgel glass comprises of 3-azopropyltrimethoxysilane and catena-octachlorotrisiloxane.

In some embodiments the film has a crosslinked structure between NGS chromophores and ZGS chromophores.

In some embodiments the film has crosslinks between layers.

In some embodiments the film has crosslinks intralayer.

In some embodiments the film comprises of 1-2000 layers of chromophores.

In some embodiments the film substrate comprises a metal, silicon, or a silicon oxide that the first layer of chromophore is bonded to.

In some embodiments the film has an electrooptic coefficient r33 value of about 100 pm/N or greater.

In some embodiments the film has a glass-transition temperature ($T_g$) of about 105° C. or greater.

In some embodiments the film is used in a device comprising a substrate which includes a first electrode that the first layer of electrooptic chromophores is bonded to, wherein the device is selected from an electro-optic modulator, antenna, Mach-Zehnder modulator, phase modulator, silicon-organic hybrid modulator, plasmonic-organic hybrid modulator, electrical-to-optical convertor, terahertz detector, frequency shifter, spatial light modulator, and frequency comb source.

Electrooptic Devices

In another aspect an electrooptic device comprising a plurality of electrooptic chromophores, a first layer of the electrooptic chromophores bonded to an electrode in a first layer, the plurality of electrooptic chromophores including a plurality of least one neutral ground state (NGS) chromophore and a plurality of at least one zwitterionic ground state (ZGS) chromophore is disclosed;

wherein the NGS chromophore comprises:
 a head;
 a donor;
 a bridge;
 an acceptor;
 a tail;
 wherein the head is a reactive group that is covalently bonded to the donor and is configured to react with the underlying surface or a capping agent that supplies a functional group;
 wherein the donor is a group that has excess electron density and allows for connection to the head;
 wherein the bridge electronically communicates between the donor and acceptor;
 wherein the acceptor is deficient in electron density and allows for connection to the tail;
 wherein the tail is a reactive group that is covalently bonded to the acceptor and is configured to react with the underlying surface or a capping agent that supplies a functional group; and
 wherein the head and tail are configured to allow for sequential polymerization of the NGS electrooptic chromophore in non-centrosymmetric alignment; and wherein the ZGS chromophore comprises:
 a head;
 a donor;
 a bridge;
 an acceptor;
 a tail;
 wherein the head is a reactive group that is covalently bonded to the donor and is configured to react with the underlying surface or a capping agent that supplies a functional group;
 wherein the donor is a group that has excess electron density and allows for connection to the head;
 wherein the bridge electronically communicates between the donor and acceptor;
 wherein the acceptor is deficient in electron density and allows for connection to the tail;
 wherein the tail is a reactive group that is covalently bonded to the acceptor and is configured to react with the underlying surface or a capping agent that supplies a functional group;
 wherein the head and tail allow for polymerization of the electrooptic chromophore; and
 wherein one side of the chromophore perpetually carries a positive charge, one side of the chromophore perpetually carries a negative charge and the positive charge and negative charge are separated by the bridge.

In some embodiments the device further comprises a second electrode in contact with, or in close proximity to, the composition.

In some embodiments the device further comprises a electrode and a composition according to any of the preceding claims, wherein the electrode is gold, silver, copper, platinum, palladium, nickel, iridium, rhodium, cobalt, osmium, ruthenium, iron, rhenium, manganese, tungsten, molybdenum, chromium, zinc, indium tin oxide, zinc oxide, zinc indium tin oxide, graphene, graphite, aluminum zinc oxide, titanium nitride, gallium nitride, nickel oxide indium tin oxide, silicon, silicon nitride and any combination thereof.

In some embodiments the device further comprises an electrode and a composition according to any of the preceding claims, wherein the chromophore composition is directly bonded to the electrode surface.

In some embodiments the device further comprises any NGS chromophore, ZGS chromophore, or dimer chromophore.

In some embodiments the device further comprises a substrate and wherein the composition is layered such that the organic chromophores are oriented approximately perpendicular to the substrate.

In some embodiments the device further comprises a substrate and wherein the composition is layered such that the organic chromophores are oriented approximately parallel to the substrate and extending between the first electrode and the second electrode.

In some embodiments the device has the chromophore composition is neat.

In some embodiments the device has the chromophore composition is neat and a monolayer on the electrode surface.

In some embodiments the device has the chromophore composition is neat and a monolayer sandwiched between two electrodes.

In some embodiments the device has the chromophore composition is neat and a bilayer on the electrode surface.

In some embodiments the device further has the chromophore composition is neat and a bilayer sandwiched between two electrodes.

In some embodiments the device has the chromophore composition is neat and 1-2000 layers on the electrode surface.

In some embodiments the device has the chromophore composition is neat and 1-2000 layers sandwiched between two electrodes.

In some embodiments the device modulates light at telecommunications wavelengths upon application of voltage on the two electrodes.

In some embodiments the device modulates light at 860 nm, the O-band (1260-1360 nm), C-band (1530-3565 nm) and any combinations thereof upon application of voltage on the two electrodes.

In some embodiments the device has electrooptic coefficient $r_{33}$ of 300 pm/V to 10,000 pm/V at 1550 nm.

In some embodiments the device is an electro-optic modulator, antenna, Mach-Zehnder modulator, phase modulator, silicon-organic hybrid modulator, plasmonic-organic hybrid modulator, electrical-to-optical convertor, terahertz detector, frequency shifter, or frequency comb source.

In some embodiments an electric field is placed between the electrodes.

In some embodiments a voltage is placed on the electrodes.

In some embodiments the voltage applied to the device is 0.01 to 5 volts.

In some embodiments wherein light is introduced into the device.

In some embodiments light is introduced into the device is 860 nm, the O-band (1260-1360 nm), C-band (1530-3565 nm) or any combinations thereof.

In some embodiments light is introduced into the device is of telecommunications wavelength.

In some embodiments light is introduced into the device is split into two paths;
wherein one path of light is subjected to an electric field;
wherein one path of light is not subjected to an electric field;
wherein the two paths rejoin at the other side of the device
wherein the two paths of light constructively rejoin in the absence of an electric field; and
wherein the two paths of light destructively rejoin in the presence of an electric field.

In some embodiments light is introduced into the device is split into a first light path high and a second light path low;
wherein there is three electrodes with one electrode common to both the first light path high and the second light path low, one electrode for the light path high and one electrode for light path low;
wherein a voltage is applied to the common electrode;
wherein a voltage greater than the common electrode is applied to light path high electrode;
wherein a voltage lower than the common electrode is applied to the light path low electrode; and
wherein there is an opposite bias between the light path high and light path low.

In some embodiments the device modulates telecommunication signals.

In some embodiments the device modulates computer processing signals for light-based central processing units.

EXAMPLES

Development of the disclosed materials and methods include three main phases: 1) chromophore design and computational modeling, 2) synthesis of chromophores and layer-to-layer coupling schemes, and 3) device design, modeling, fabrication, and integration of Sequential Synthesis OEO layers.

Example 1. Chromophore Building Block Design and Computational Modeling

The design of chromophores for Sequential Synthesis is based on the disclosed OEO materials, nanostructured dielectric layers, and the disclosed OEO materials surface grown into polymers. The developed disclosed OEO materials feature robust process to deposit aligned OEO multilayers with macro EO coefficient of r33=300 pm/V to 10000 pm/V at 1064, 1300 and 1500 nm. The disclosed OEO materials are a vast improvement over relatively low β chromophores that were used in previous OEO systems which prevented them from widespread adoption. The previous systems used simpler coupling chemistry, which resulted in lower EO coefficients than could be achieved with contemporary poled materials, a sequence of properties that the current disclosed OEO materials solve. Second issue that needs to be solved is that OEO molecules have large dipole moments, and intermolecular repulsion at high densities reduced maximum achievable order, a sequence of properties that the disclosed OEO materials solve. The third issue that needs resolving from previous systems, while the acentric order achieved was good initially, beyond ~100 chromophore multilayers monolayer defects had a multiplicative effect leading to poor alignment in higher layers, limiting application in contemporary device architectures requiring micron-thick films, a sequence of properties that the disclosed OEO materials solve. The disclosed OEO materials circumvents these limitations, exploiting the advantages of nanophotonic electrode dimensions, and enable better nonlinear materials than the best poled OEO materials and enable deposition over a large device area.

Example 2: Computational Modeling

Figure 3:
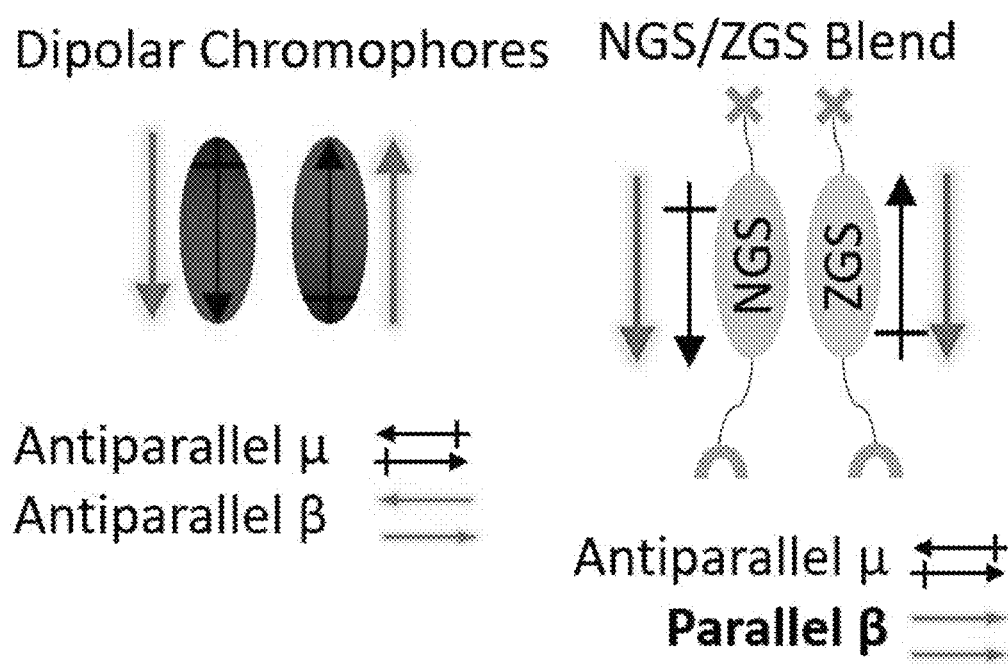
FIG. 3. Dipolar chromophores tend to align dipole moments antiparallel, resulting in antiparallel β(left). An NGS/ZGS blend will have antiparallel dipole moment but parallel and additive β (right).
Figure 4:
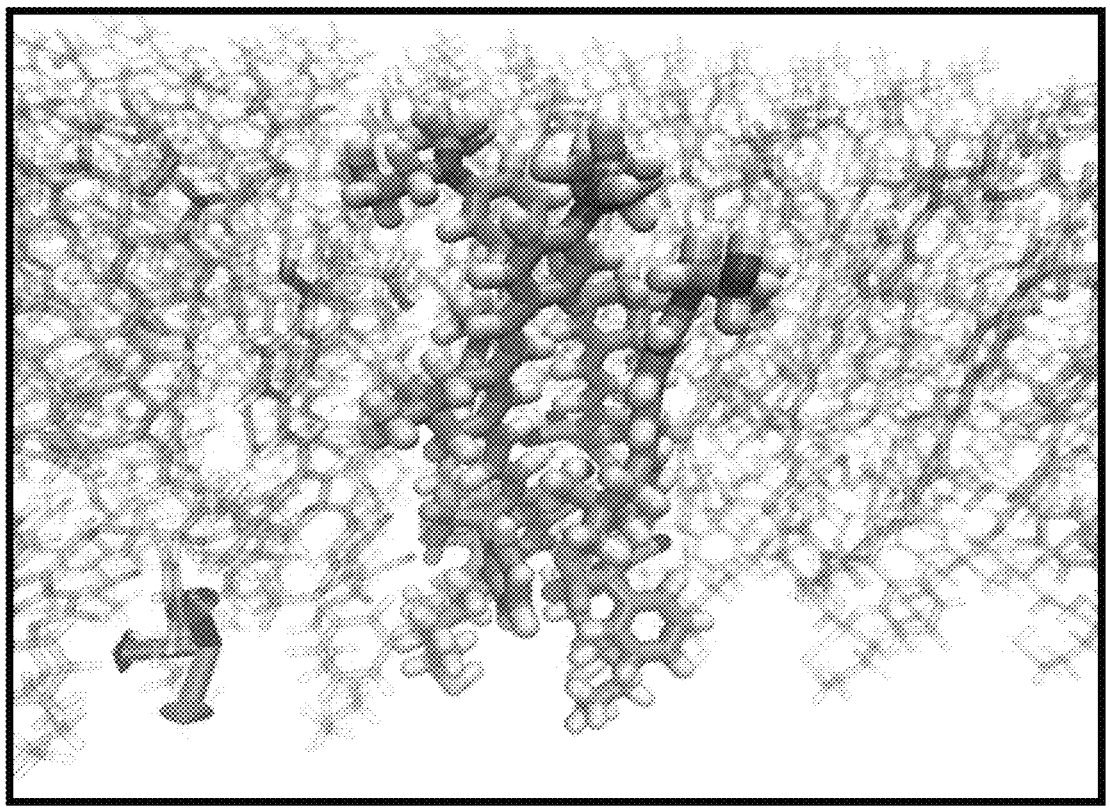
FIG. 4. Snapshots from molecular dynamics simulation of a chromophore-containing self-assembled monolayer (SAM), showing packing and alignment from the side. Typical surface density of attachment units causes the chromophores to pack upright, perpendicular to the surface; this orientation leads to optimal EO activity.
Figure 5:
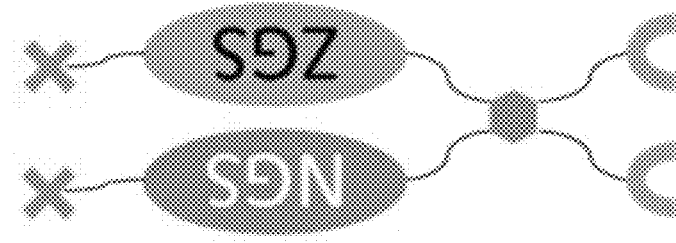
FIG. 5. Sections of the chromophore building blocks that can be modified to optimize monolayer acentric order (left). NGS and ZGS chromophores may be covalently attached forming a dimer to make a more uniform chromophore monolayer.
Figure 5:
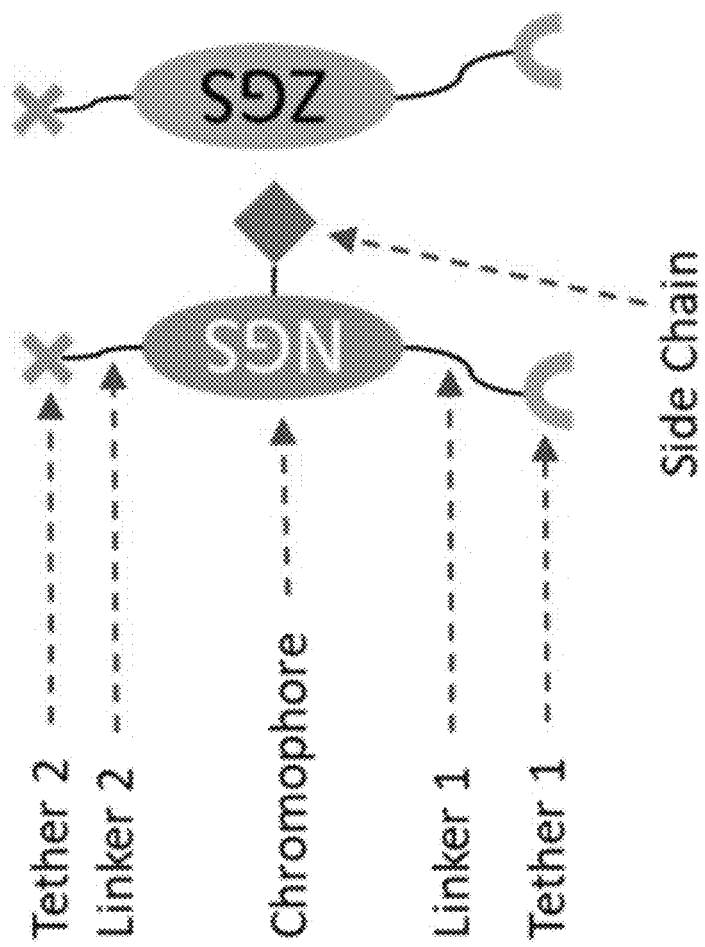
Figure 6:
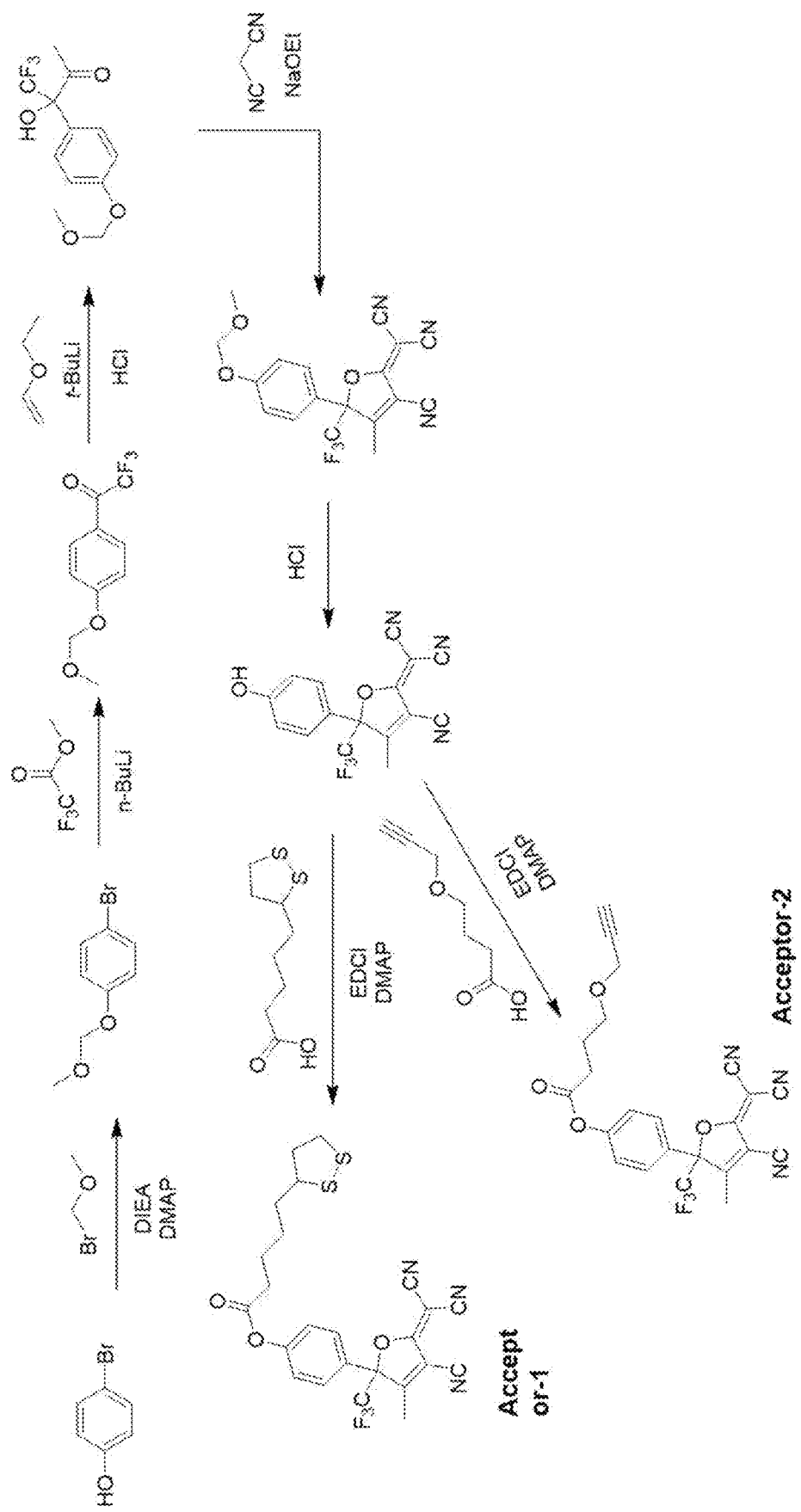
FIG. 6. Synthesis of tricyanofuran acceptors for NGS Chromophores.
Figure 7:
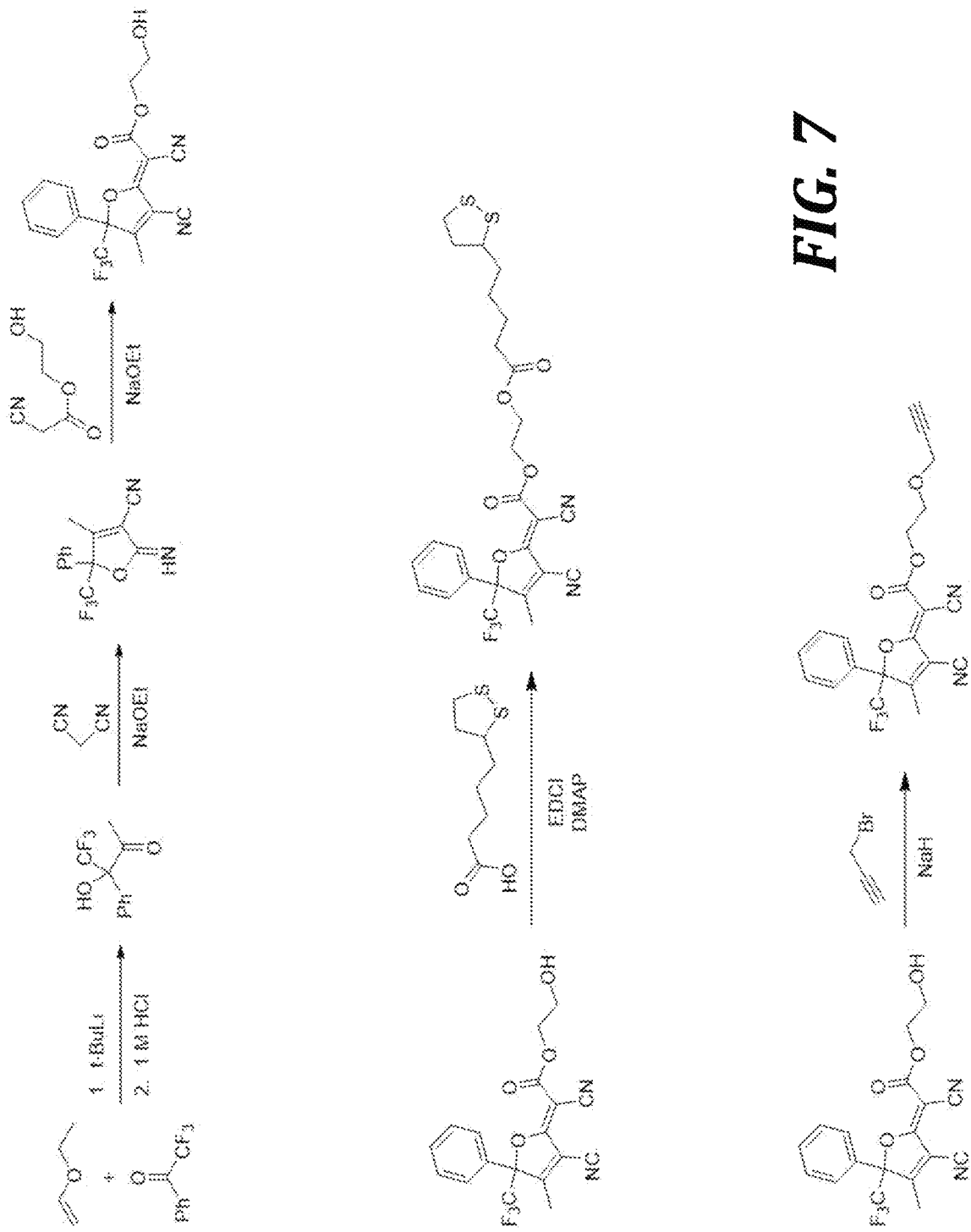
FIG. 7. Synthesis of dicyanofuran acceptors for NGS Chromophores.
Figure 8:
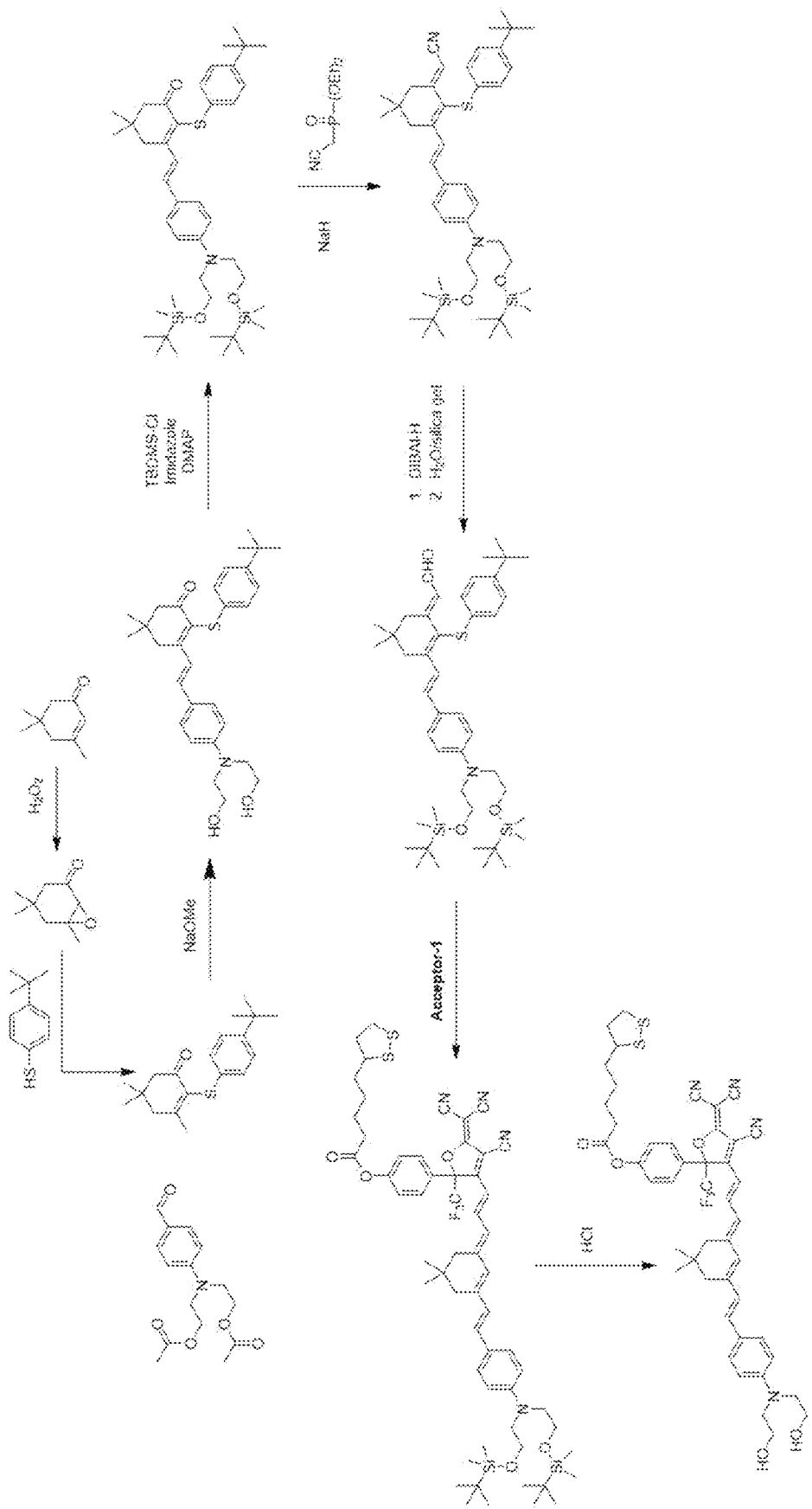
FIG. 8. Synthesis of NGS Chromophore with tricyanofuran acceptor and tail substituted on the phenyl group and with sulfur functionality.
Figure 9:
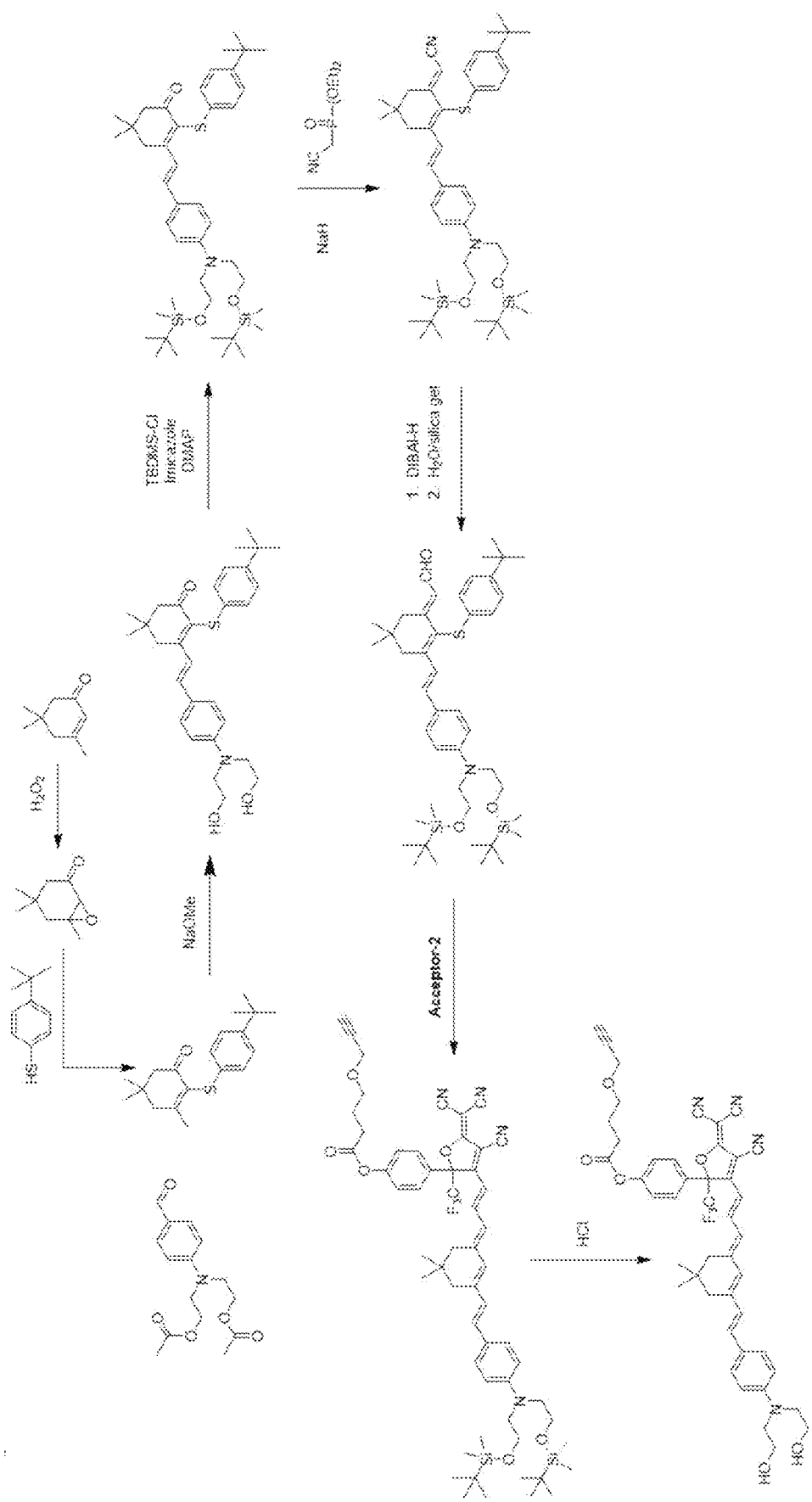
FIG. 9. Synthesis of NGS Chromophore with tricyanofuran acceptor and tail substituted on the phenyl group and with alkyne functionality.
Figure 10:
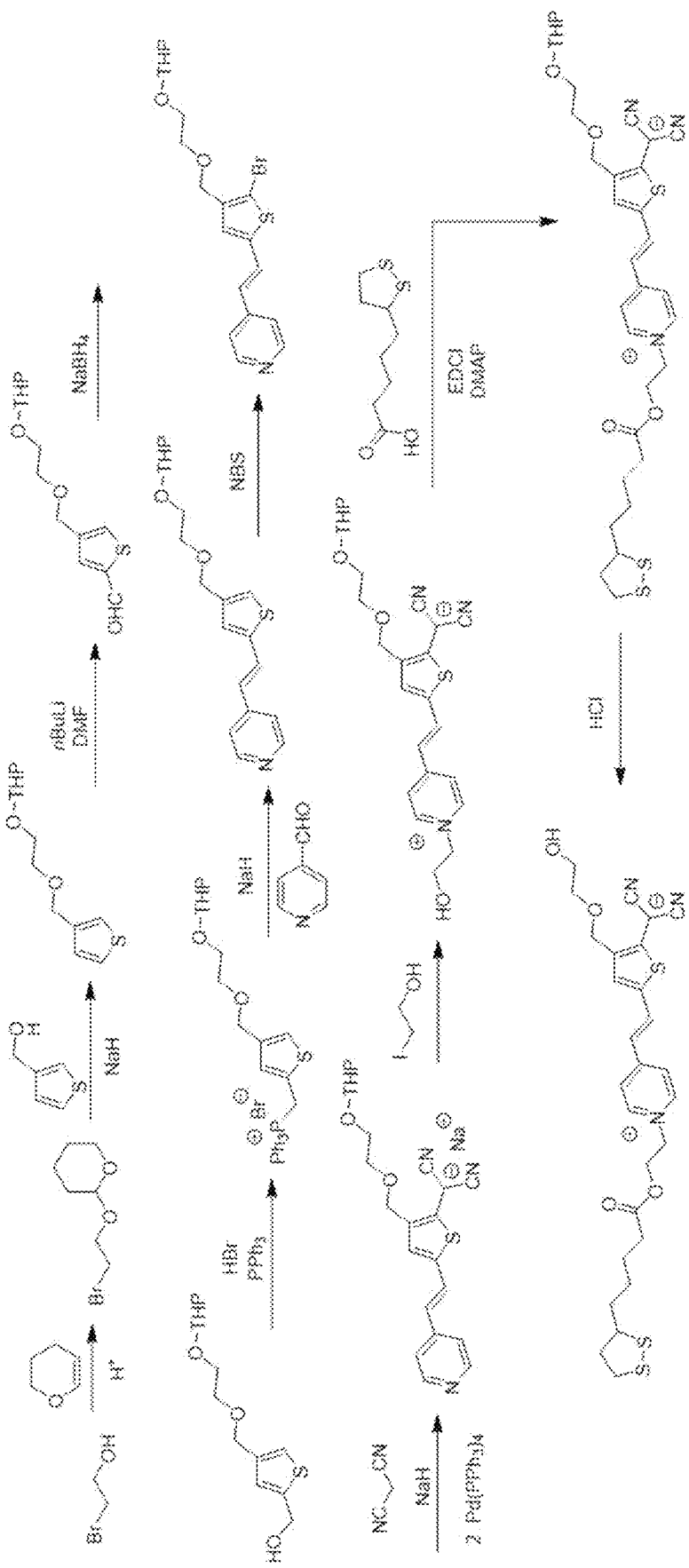
FIG. 10. Synthesis of ZGS Chromophore with sulfur functionality.
Figure 11:
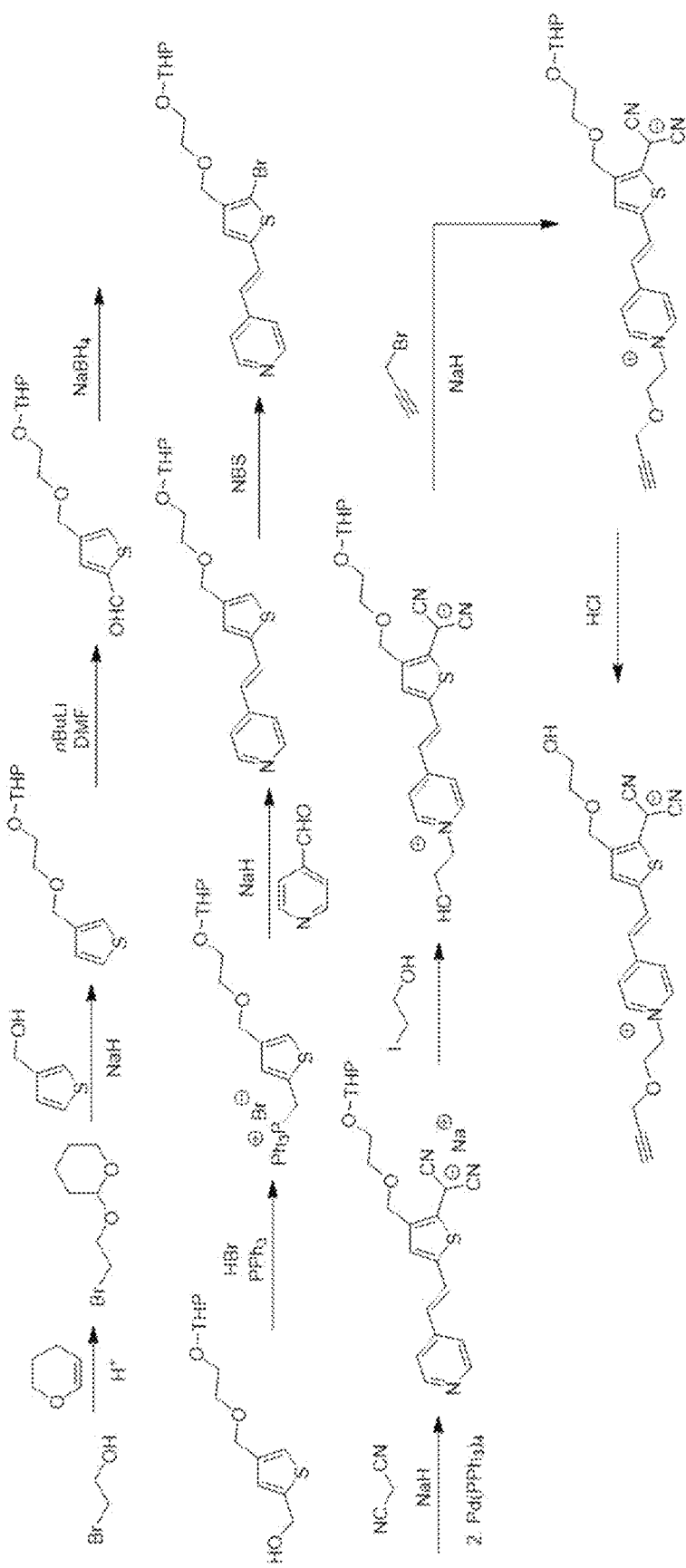
FIG. 11. Synthesis of ZGS Chromophore with alkyne functionality.

Computational modeling is used to fine tune the molecular structures and intermolecular interactions to optimize acentric order in chromophore self-assembled monolayers. Structural elements of the NGS and ZGS chromophore building blocks that are optimized include linker length (short, long), linker rigidity (aliphatic or aromatic), and acceptor geometry. Side chain functionality can be used to enhance the linearity of the chromophore (enforcing an all-trans polyene backbone) and fine tune the NGS/ZGS packing density. Modeling is also used to screen different ZGS structures to optimize $\beta$ while balancing its dipole moment with that of its NGS partner. This is accomplished by building energy minimized chromophore monolayers with various structural elements and assessing the average acentric order (chromophore tilt) and packing density. Evaluation of cooperativity effects on hyperpolarizability has been performed, which is crucial in a highly ordered environment, FIG. 3. The modeling work is shown in FIG. 4. A further modification evaluated is covalently attaching the NGS and ZGS building blocks into NGS/ZGS dimers (FIG. 5 and FIGS. 2A-2B). Since Sequential Synthesis is a solution process, dimerizing the NGS and ZGS chromophores ensures that they reach the surface together; avoids phase separation in the monolayer; and avoids NGS/NGS and ZGS/ZGS antiparallel pairing in solution that could result in slow monolayer formation rates and lower film quality.

Example 3. Synthesis of Chromophore-SAMs and Layer-to-Layer Coupling Schemes

Figure 12:
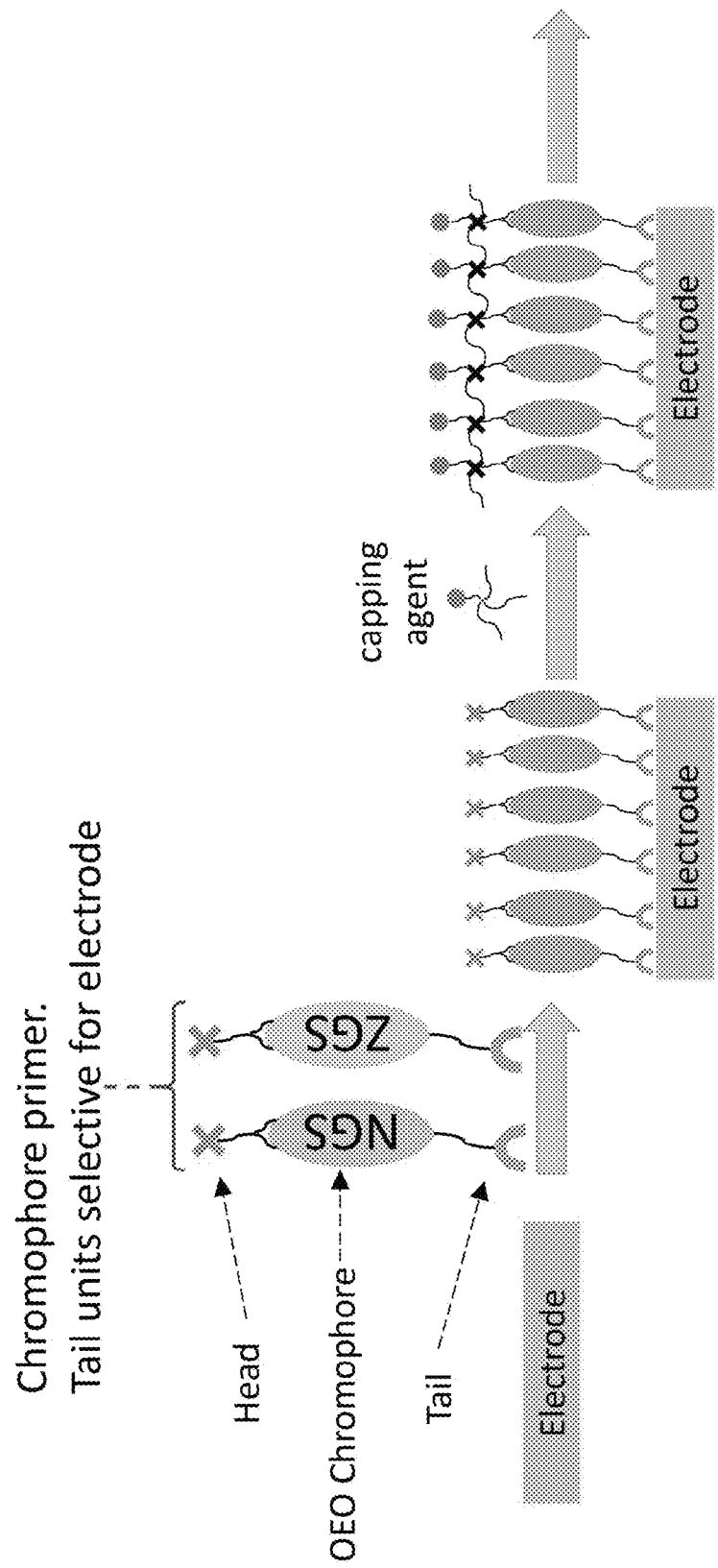
FIG. 12. Initially an aligned chromophore primer layer is deposited through selective bonding of the chromophore tail units to the electrode surface (FIG. 4). Then a capping agent is deposited through selective reaction of the capping agent with the head units of the chromophore building blocks. Subsequent chromophore building blocks have tail units selective for capping agent. Repeating deposition of chromophore building blocks and capping agent builds up aligned OEO bilayers.
Figure 12:
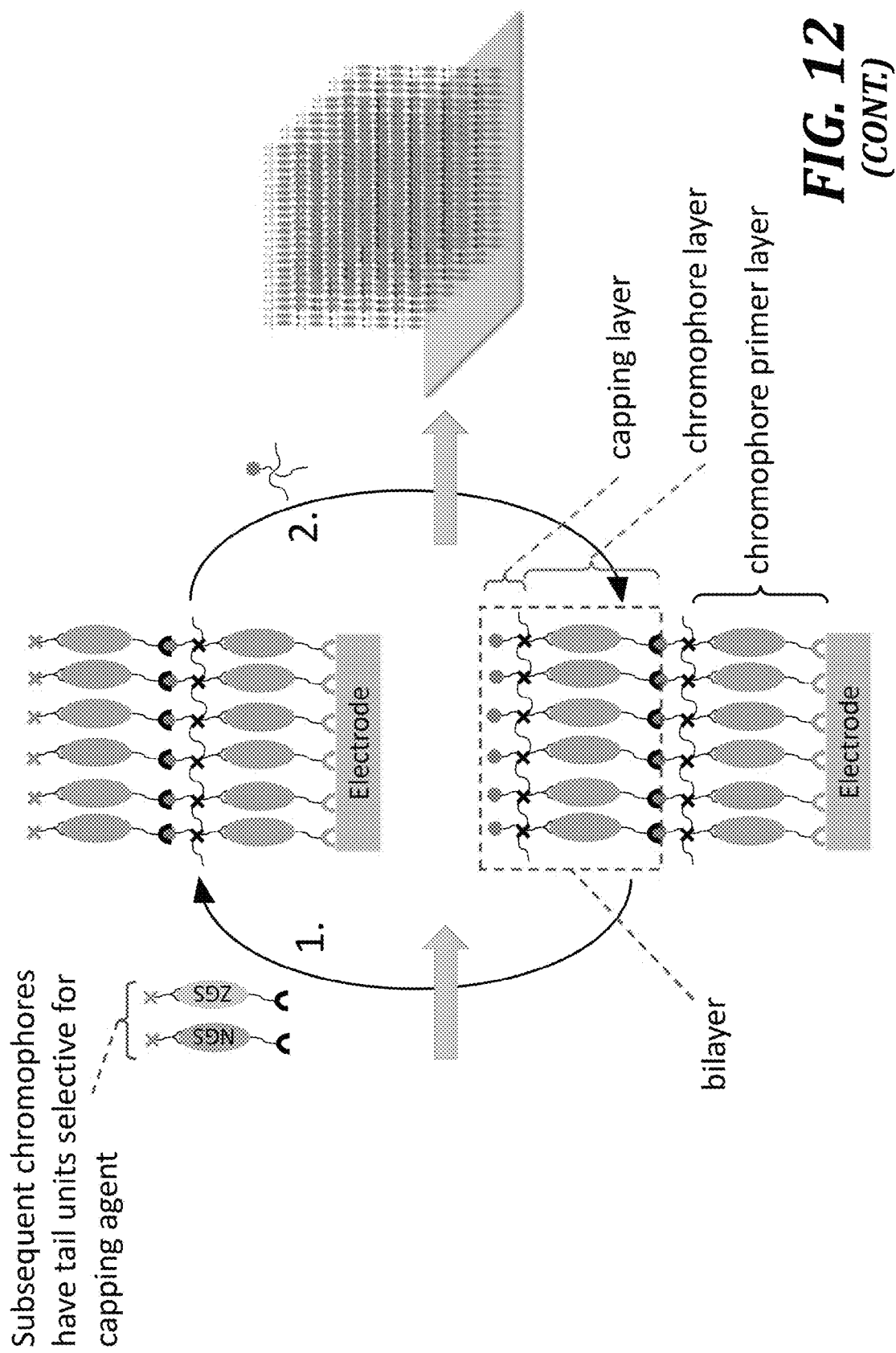
Figure 13:
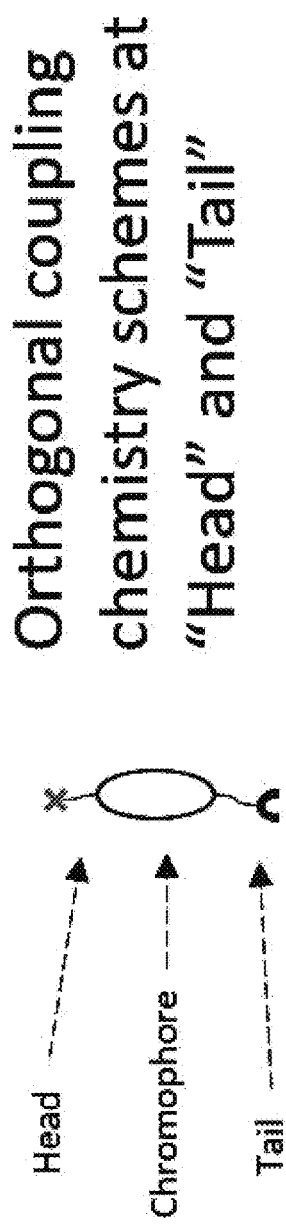
FIG. 13. Recommended coupling chemistries, which are required to be orthogonal (noninterfering) for Head and Tail units.
Figure 14:
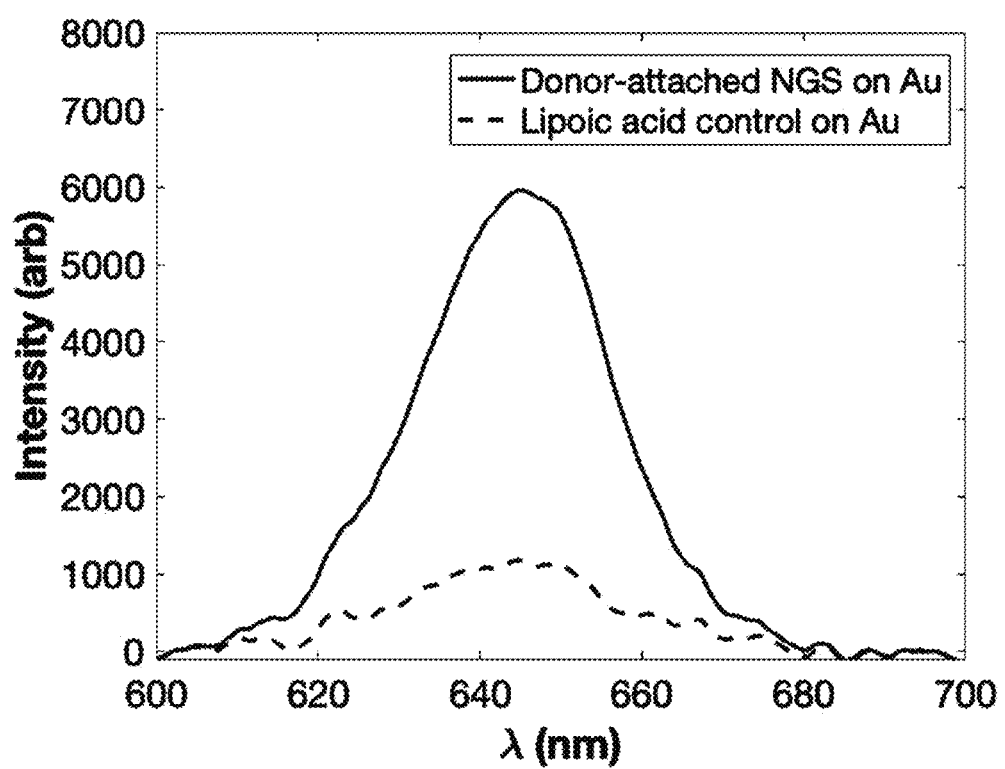
FIG. 14. Second harmonic generation (SHG) spectra of chromophore-SAMs on gold attached through sulfur-gold bonds, compared with lipoic acid SAM control film.

Chromophore cores for Sequential Synthesis building blocks are based on aniline donor, vinylic, thiophene or isophorone bridges, and either a carboxydicyanofuran or tricyannofuran acceptor. The synthesis schemes for the acceptors, bridges and donors are shown in FIGS. 6-11. Following chromophore building block optimization of linkers and side chains, there was a focus on coupling chemistry needed to build multilayers. The disclosed OEO materials self-assemble into monolayers byatomic/molecular layer deposition (ALD/MLD), layer-by-layer deposition, click chemistry, sol-gel, metal/covalent organic framework, and solid phase peptide synthesis techniques. The synthesis schemes to impart the self-assemble chemistry to the NGS and ZGS chromophores is shown in FIGS. 8-11. The disclosed sequential synthesis relies on two self-limiting surface reactions carried out sequentially, generating bilayers. To generate acentric alignment, the chromophore building blocks need to have different chemical coupling units on the "head" and "tail," as show schematically in FIG. 12. The tail unit is designed to selectively react with the electrode surface, generating a chromophore self-assembled monolayer (chromophore-SAM). In a second subsequent reaction, the head unit will react with a capping agent. These two reaction processes are repeated multiple times to deposit bilayers (chromophore layer and capping layer). The head and tail coupling chemistries need to be selective (orthogonal), high yielding, rapid, and compatible. Fortunately, there are numerous proven click chemistry techniques to choose from. Some examples of orthogonal pairs of click chemistry reactions that are compatible with NGS and ZGS chromophore synthesis and multilayer deposition are shown in FIG. 13, FIG. 13A and FIG. 13B. Examples using siloxane coupling at the head and azide/alkyne coupling at the tail are shown in more detail. The coupling units are common enough that many synthetic starting materials are available commercially, and little additional synthesis are required. The capping layer has two roles: it presents a new functional group to bind the next chromophore building block, and, if chosen properly, it forms a 2D sheet cross-linking the chromophores at the top giving structural rigidity to provide high thermal stability of the acentric order. Thin film and surface science techniques can be used to monitor the quality of the chromophore-SAMs and progress of the deposited layers. Second harmonic generation (SHG) spectroscopy is an ideal analytical technique in that it is directly proportional to the EO effect and is thus very sensitive to acentric order. Example SHG spectra comparing several different monolayers are shown in FIG. 14. Other techniques useful in monitoring monolayer growth, acentric order, and film quality include variable angle spectroscopic ellipsometry (VASE), polarized absorbance spectroscopy, grazing-angle attenuated total internal reflection (ATR) FTIR, and AFM. VASE and dielectric spectroscopy are used to measure the real and imaginary optical constants and dielectric constant.

Example 4. Devices

Figure 15:
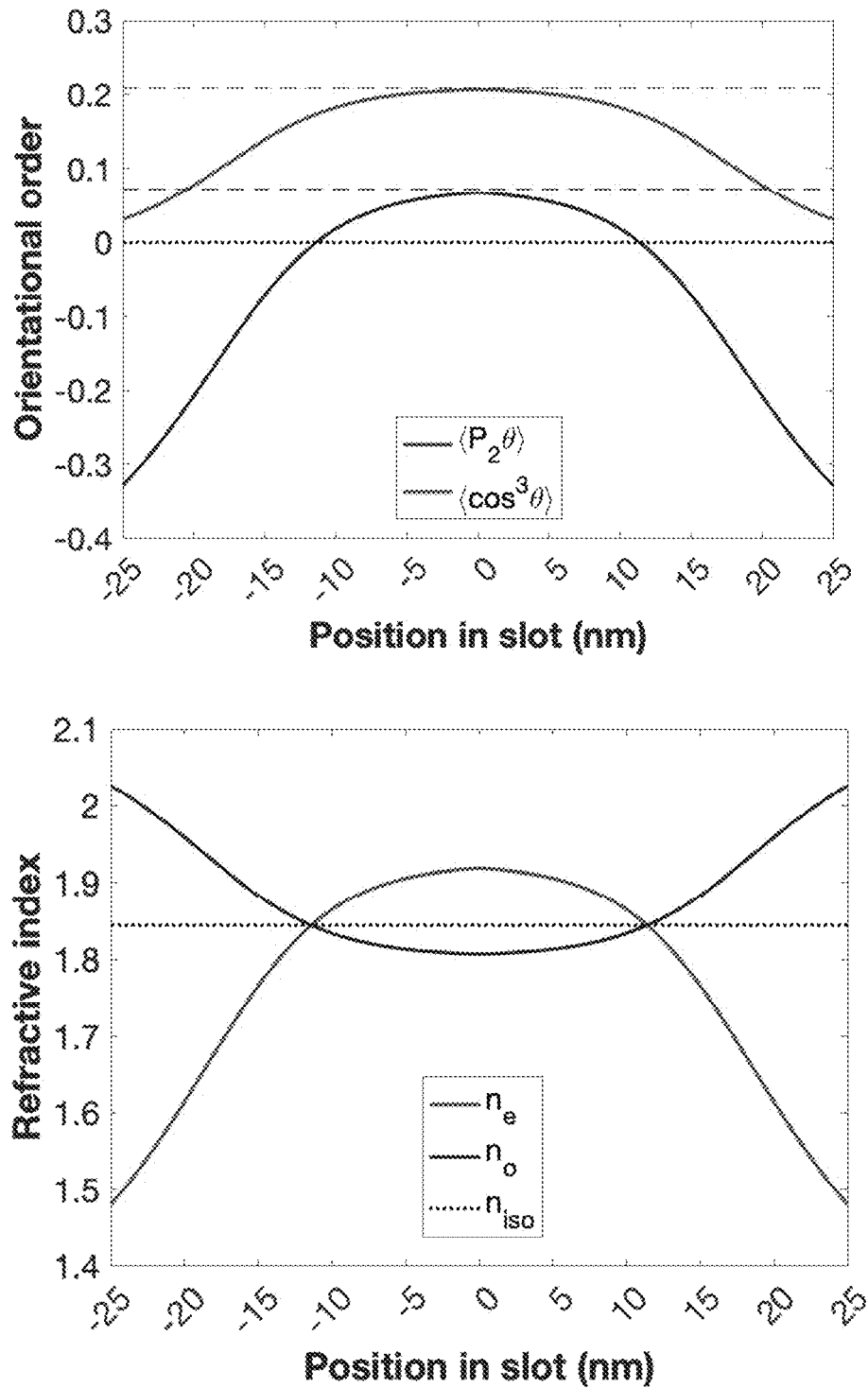
FIG. 15. Illustration of material property heterogeneity in a 50 nm slot waveguide POH device, with reduced acentric and centrosymmetric order along the electric field axis (left), leading to a reduced material index along the axis of the mode and reduced Pockels response in the surface region where the mode in a plasmonic-organic hybrid device is most intense (center). The boundaries of the slot waveguide at +25 nm in the upper center figure are indicated by dashed white lines. As the surface region becomes a larger fraction of the total at narrower waveguide widths, modulation efficiency is expected to increase due to tighter confinement of the mode, but the effect is limited by the reduction in material EO performance due to reduced poling efficiency (right). Calculation of material performance from device $V\pi L$ yields an apparent r33 averaged over the cross-section of the mode, which decreases for poled materials as waveguide width is reduced, leading to performance lagging expected performance if r33 retained its bulk value ("isotropic" line in the lower center panel).
Figure 15:
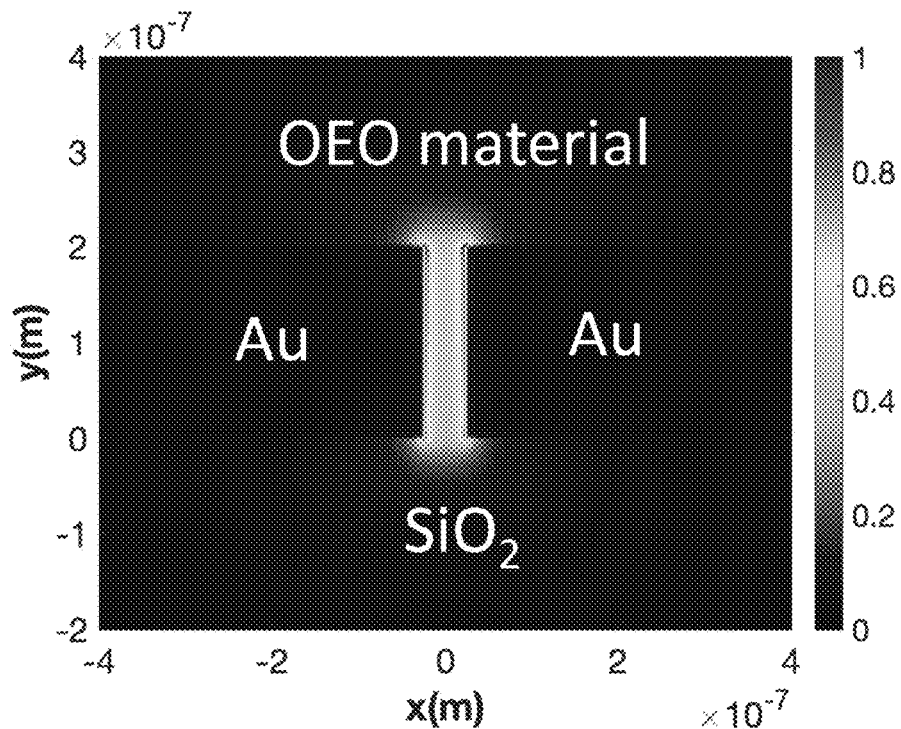
Figure 15:
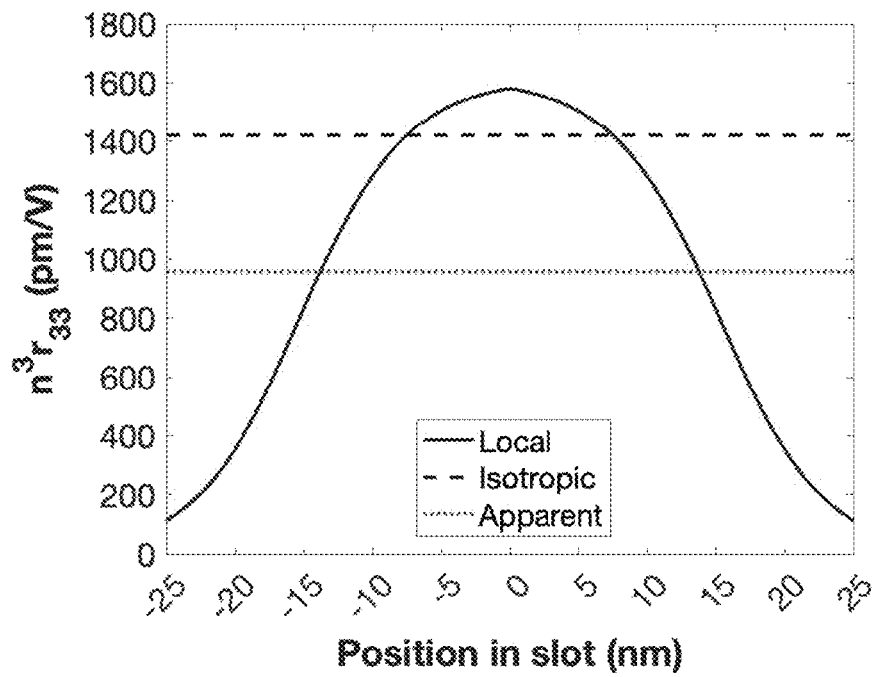
Figure 15:
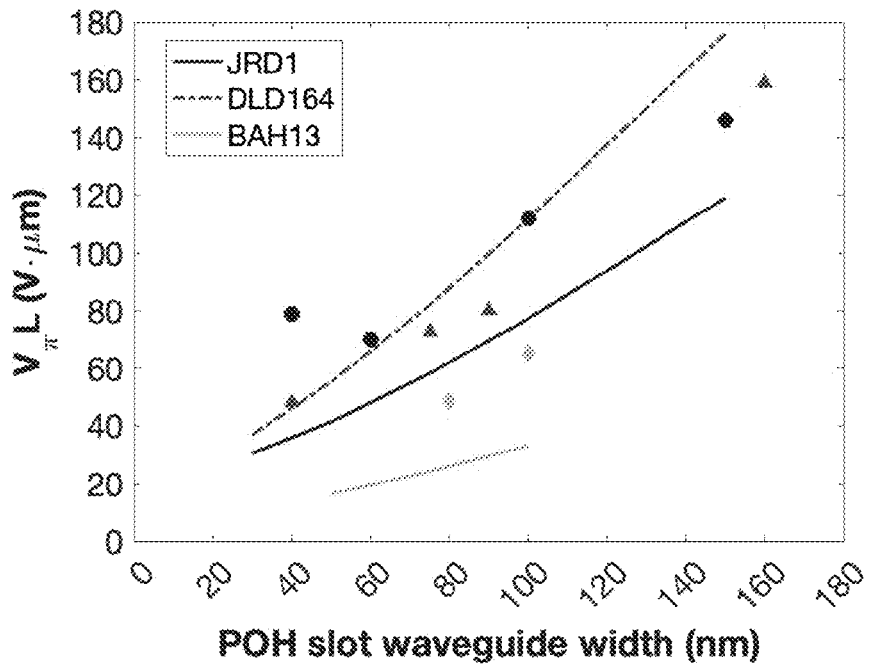
Figure 15:
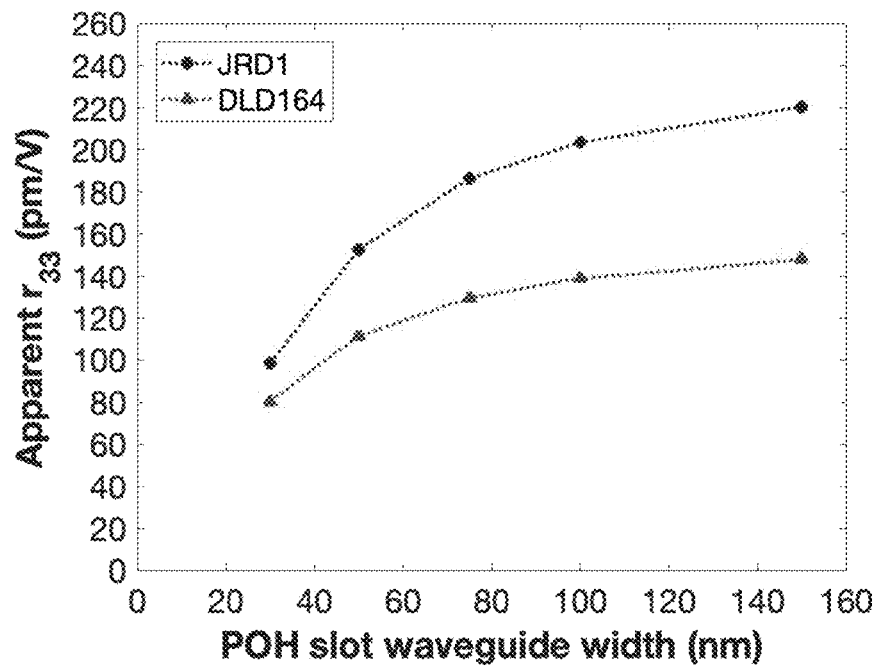

Device Design, Modeling, Fabrication, and Integration of Sequential Synthesis OEO Layer: Sequential Synthesis is compatible with various EO device designs and materials including SOH and POH, slot or rib waveguides, vertical or horizontal slots that operate efficiently in the O-band to L-band. 2-D finite-difference eigenmode (FDE) and 3D finite-difference time-domain (FDTD) simulations are used to define device dimensions (electrode separation distance d, electrode length L, and width of gold rails r; FIG. 15) to optimize overlap of optical and electric fields ($\Gamma$), minimize loss and V$\pi$, and maximize bandwidth; previously developed multi-scale techniques for translating theoretical or computational order distributions into materials properties for these electrodynamics calculations were used.

The Sequential Synthesis techniques with the disclosed OEO materials have been applied to various device architectures including hybrid organic/inorganic device architectures. where the disclosed organic OEO material is confined on the nanoscale dimensions between either semiconductors or plasmonic metals, tightly confining the optical (usually telecom near-IR wavelengths, 1064, 1300, 1500 nm) and electrical (RF or mmWave) modes within the OEO material, efficiently utilizing the high EO sensitivity (r33) of the OEO material. Such hybrid architectures have enabled extraordinary EO modulator performance in silicon-organic hybrid (SOH) and plasmonic-organic hybrid (POH) devices shown FIGS. 16-18.

POH MZM fabrication. 1) Silicon waveguides and grating couplers are fabricated on a silicon-on-insulator wafer by photolithography. 2) Gold active region bottom electrodes and contact lines are deposited and patterned by e-beam evaporation and lift-off lithography. 3) OEO material deposited by Sequential Synthesis. 4) Deposition and patterning of top gold electrodes by e-beam evaporation and dry etching.

In order for Sequential Synthesis to produce EO active devices, the symmetry of the devices is broken to enable acentric layer by layer growth. If not, growth would be symmetric from both sides of the device, resulting in net centro-symmetry and negligible EO activity. This symmetry breaking can be accomplished in a number of ways.

The simplest method involves so-called 'horizontal slot' devices, where the device is fabricated in a stepwise fashion. Growth of the Sequential Synthesis is initiated from an activated surface (e.g. gold) corresponding to the bottom device layer, and repeated until the desired OEO layer thickness is achieved (e.g. ~150 nm). The OEO layer is then capped via deposition of the corresponding top layer of material (e.g. gold), sandwiching the OEO material in a horizontal layer between the upper and lower device layers. This method utilizes the order of deposition to naturally create asymmetry in the device but has the downside of requiring Sequential Synthesis deposition prior to final metallization of the devices. While conceptually simple, this fabrication method may be more prone to failure due to the active deposition on top of the OEO Sequential Synthesis material. This may be mitigated through the addition of CBL layers above and/or below the OEO material to help prevent damage during the top material deposition.

The majority of hybrid OEO devices fabricated are not horizontal slot devices, instead they are vertical slot devices in which all the other device layers are fabricated before OEO deposition. This greatly simplifies fabrication, avoids potential contamination of the fabrication tools from OEO materials not fab-tested, and protects the OEO material from potential high-temperature or otherwise aggressive fabrication processes. In vertical slot devices, however, the sidewalls are normally identical, and so additional steps are required to break symmetry. There are multiple methods to achieve this.

1) After device manufacture, additional lithography (high-resolution optical or electron-beam) can be used to break the inherent device symmetry as follows. Another layer of lithography resist is deposited on the device and careful exposure performed to illuminate only one half of the device. Development of this structure then exposes just one half of the device, which the other remains covered (which half is exposed and which half is covered depends on the type of resist used and can vary depending on a variety of factors). Then a conformal coating can be deposited (e.g. via ALD) on the exposed half of the device that leaves a surface functionality that is completely different from the buried half of the device. For example, if it is a POH device, and the buried half is gold, then a metal oxide can be deposited on the exposed half. If it is a SOH device, and the buried half is silicon (with a thin native oxide layer, presumably), then a metal nitride layer can be deposited on the exposed half). After stripping of the resist, the device symmetry is broken, with half of the slot exposing a native device layer, and half the capped device layer with different surface chemistry. Then, when Sequential Synthesis is initiated, the process will only proceed from the half with the native surface chemistry, and not from the modified half, then enabling acentric growth.

2) An alternative method to achieving asymmetry is available in the specific case of POH devices, e.g. gold surfaces, and the use of organo-thiols as the surface-active initial chromophore SAM layer. As has been shown in the literature, organo-thiols can be desorbed from a gold surface on application of the correct surface potential, as it reduces the gold-sulfur bond. Such a surface potential can also help prevent the formation of an organo-thiol SAM in the first place, by immediately reducing the gold-sulfur bond of any molecules that do attempt to attach to the surface. Thus, by selectively applying a surface potential to one sidewall of a POH device, the first chromophore-SAM layer can be selectively applied to just one side of the device. This accomplishes the symmetry breaking of the device, and the subsequent Sequential Synthesis fabrication steps can utilize the chemical groups on the first chromophore-SAM layer to build off of the initial broken symmetry.

Figure 16:
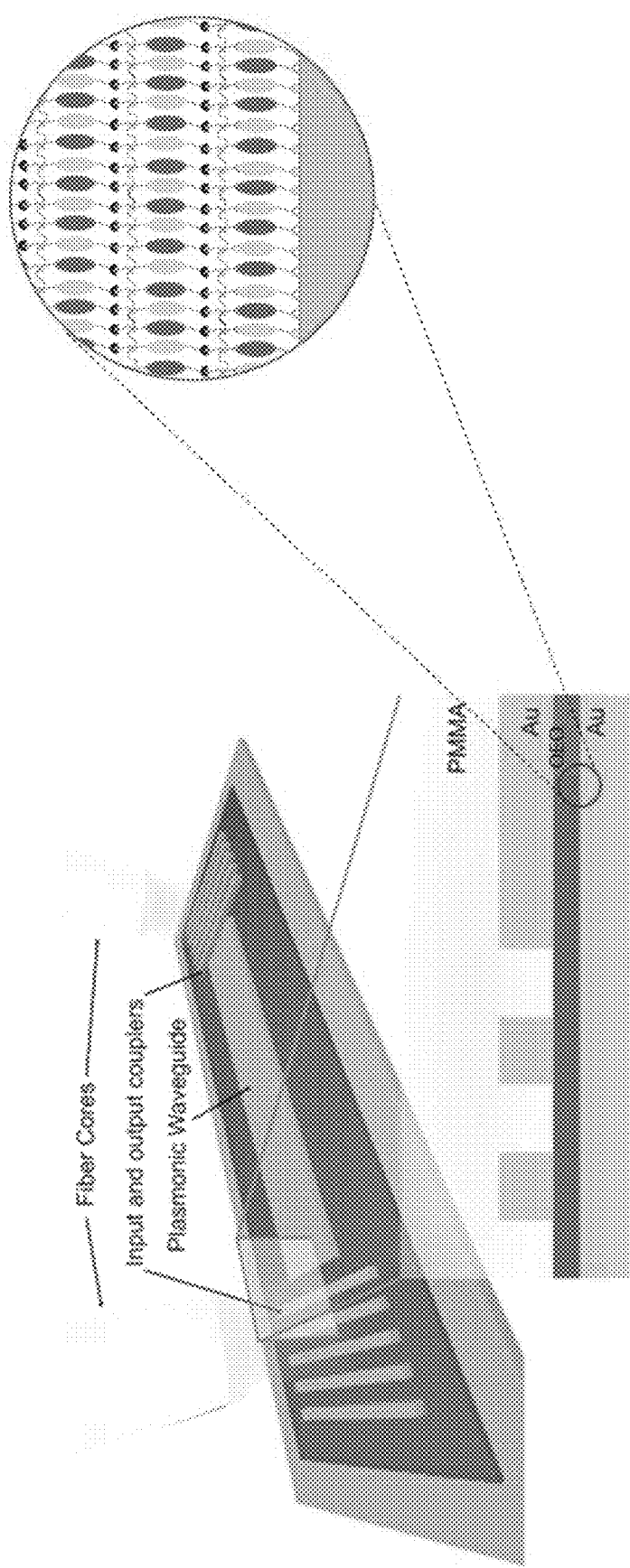
FIG. 16. Compact horizontal slot POH phase modulator and grating couplers.
Figure 17:
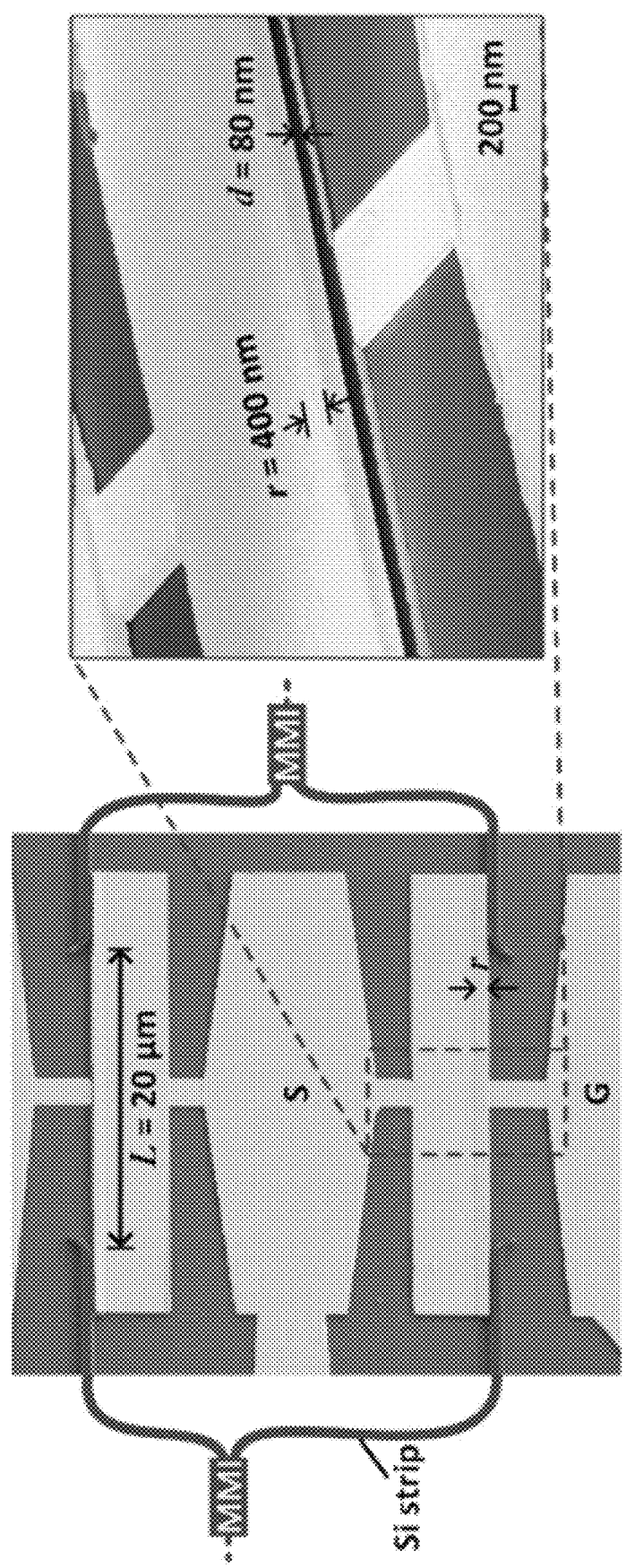
FIG. 17. Horizontal slot POH MZM with silicon waveguides and metal contact pads.

As a representative example, the fabrication of a horizontal slot plasmonic phase modulator can be described as follows. The device consists of a metal-insulator-metal stack, with gold strips serving as the waveguide boundaries and drive electrodes. A horizontal slot device is fabricated from the bottom up, depositing the bottom gold electrode by e-beam evaporation (typically patterned by lift-off lithography), followed by the Sequential Synthesis OEO layer, and then the top gold layer. Literature examples of horizontal slot POH phase modulators and MZM are shown in FIGS. 16 and 17. The OEO Sequential Synthesis reactions are carried out by immersing the device substrate in a solution of reactants at the desired temperature for an appropriated amount of time followed by rinsing and drying. The substrate can be a chip, wafer, or cassette of wafers, so the process is scalable. Solvents and reagents are compatible with typical semiconductors, dielectrics, and metals used in chipmaking, in order to avoid etching or doping of underlying layers. The first layer of chromophore building blocks will have a gold selective bonding unit, so OEO material will only be deposited on gold regions. Subsequent layers of OEO building blocks will bind selectively to the capping layer. Thickness is controlled by the number of bilayers, with each bilayer ~3-4 nm thick (FIG. 18).

Figure 19:
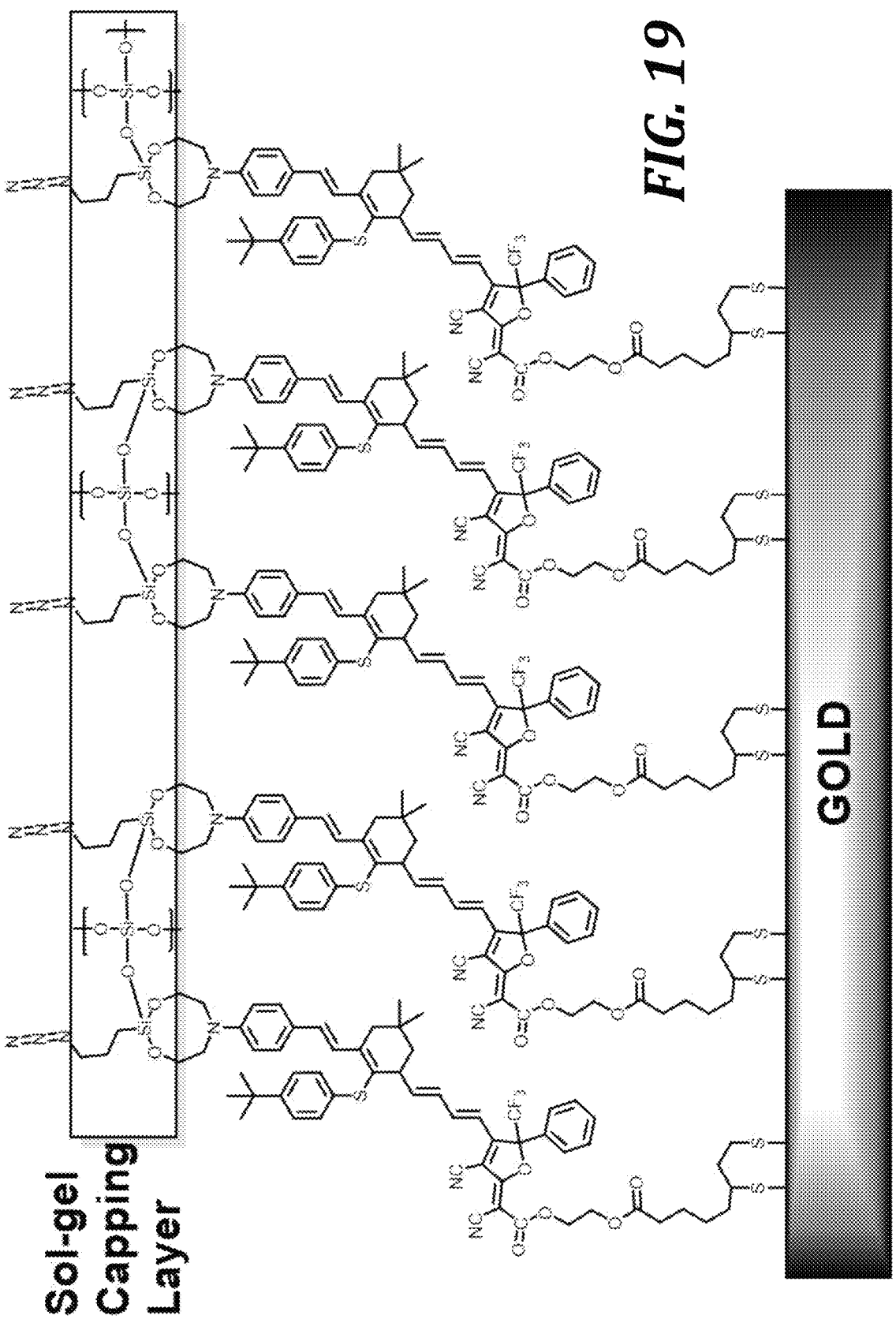
FIG. 19. A NGS chromophore is shown to be bonded to a gold surface through a dithiolane which provides for sulfur-gold bonding. The bonding of the sulfur to the gold surface orients the chromophores in non-centrosymmetric order. The dithiolane is connected to a hydrocarbon ester tail which links the dithiolane to the acceptor end of the NGS chromophore. The donor end of the NGS chromophore is contacted with 3-azopropyltrimethoxysilane and catena-octachlorotrisiloxane to cap the donor with a solgel glass with azide surface functionalization.
Figure 20:
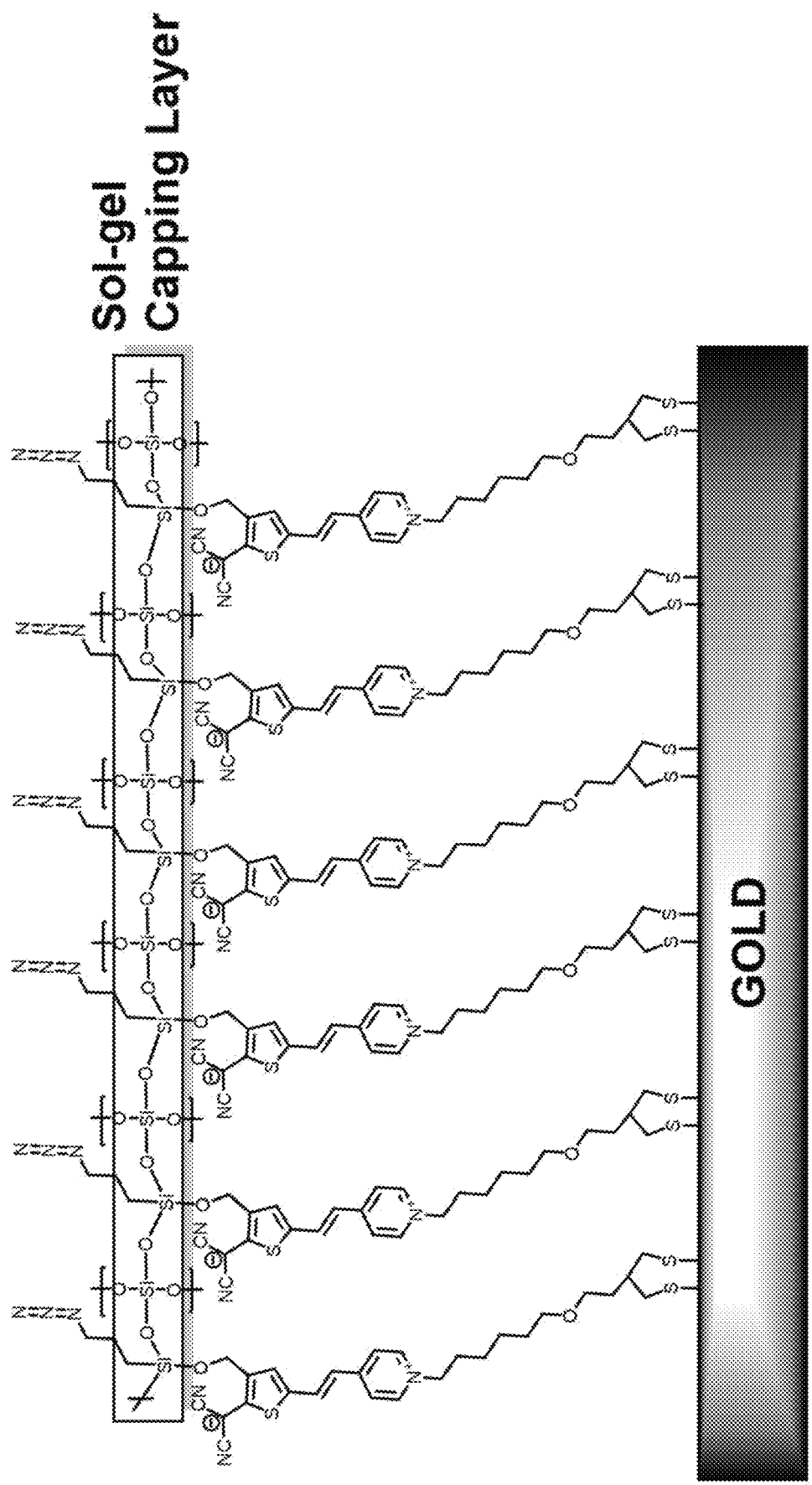
FIG. 20. A ZGS chromophore is shown to be bonded to a gold surface through a dithiolane which provides for sulfur-gold bonding. The bonding of the sulfur to the gold surface orients the chromophores in non-centrosymmetric order. The dithiolane is connected to a hydrocarbon ester tail which links the dithiolane to the acceptor end of the ZGS chromophore. The donor end of the ZGS chromophore is contacted with 3-azopropyltrimethoxysilane and catena-octachlorotrisiloxane to cap the donor with a solgel glass with azide surface functionalization.
Figure 21:
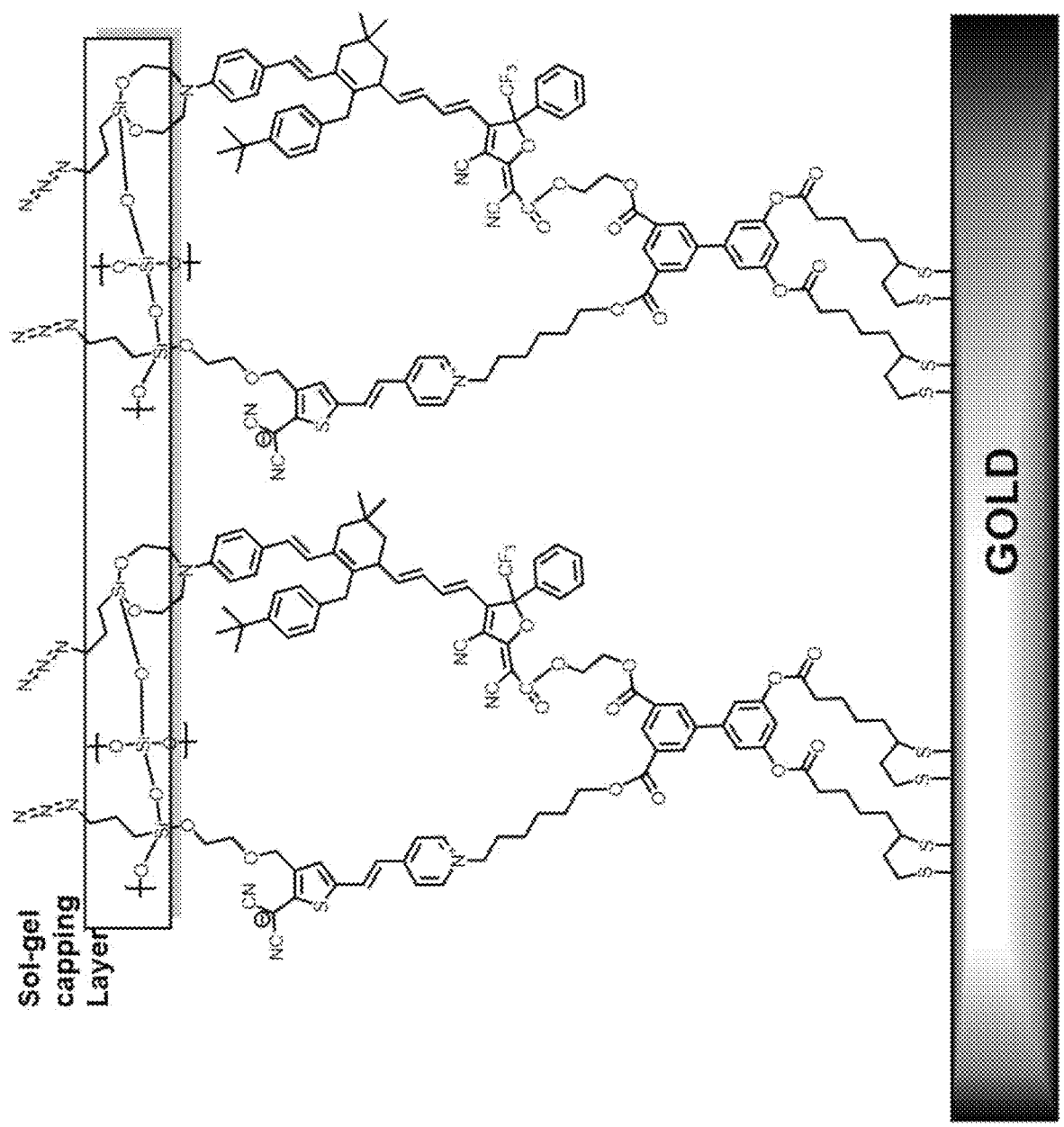
FIG. 21. An NGS-ZGS dimer chromophore is shown to be bonded to a gold surface through a dithiolane which provides for sulfur-gold bonding. The bonding of the sulfur to the gold surface orients the chromophores in non-centrosymmetric order. The dithiolane is connected to a hydrocarbon ester tail which links the dithiolane to the acceptor end of the NGS-ZGS dimer chromophore. The donor end of the NGS-ZGS dimer chromophore is contacted with 3-azopropyltrimethoxysilane and catena-octachlorotrisiloxane to cap the donor with a solgel glass with azide surface functionalization.

FIGS. 19-21 describe the emplacement of a monolayer of NGS, ZGS, or NGS-ZGS dimer chromophore upon a gold electrode. The NGS, ZGS, or NGS-ZGS dimer chromophore has a moiety that is capable of forming a bond with a gold electrode surface with dithiolane shown. The sulfur-sulfur bond in dithiolane opens and sulfur-gold bonds result. The process emplaces a monolayer of NGS, ZGS, or NGS-ZGS dimer chromophore upon the gold surface with the chromophores arranged in non-centrosymmetric order. The donor end of the chromophore is contacted with 3-azopropyltrimethoxysilane and catena-octachlorotrisiloxane to cap the donor. 3-Azopropyltrimethoxysilane and catena-octachlorotrisiloxane forms a solgel glass as a capping layer. The glass functions to hold the chromophores in place while the glass is also functionalized with azide moieties.

Figure 18:
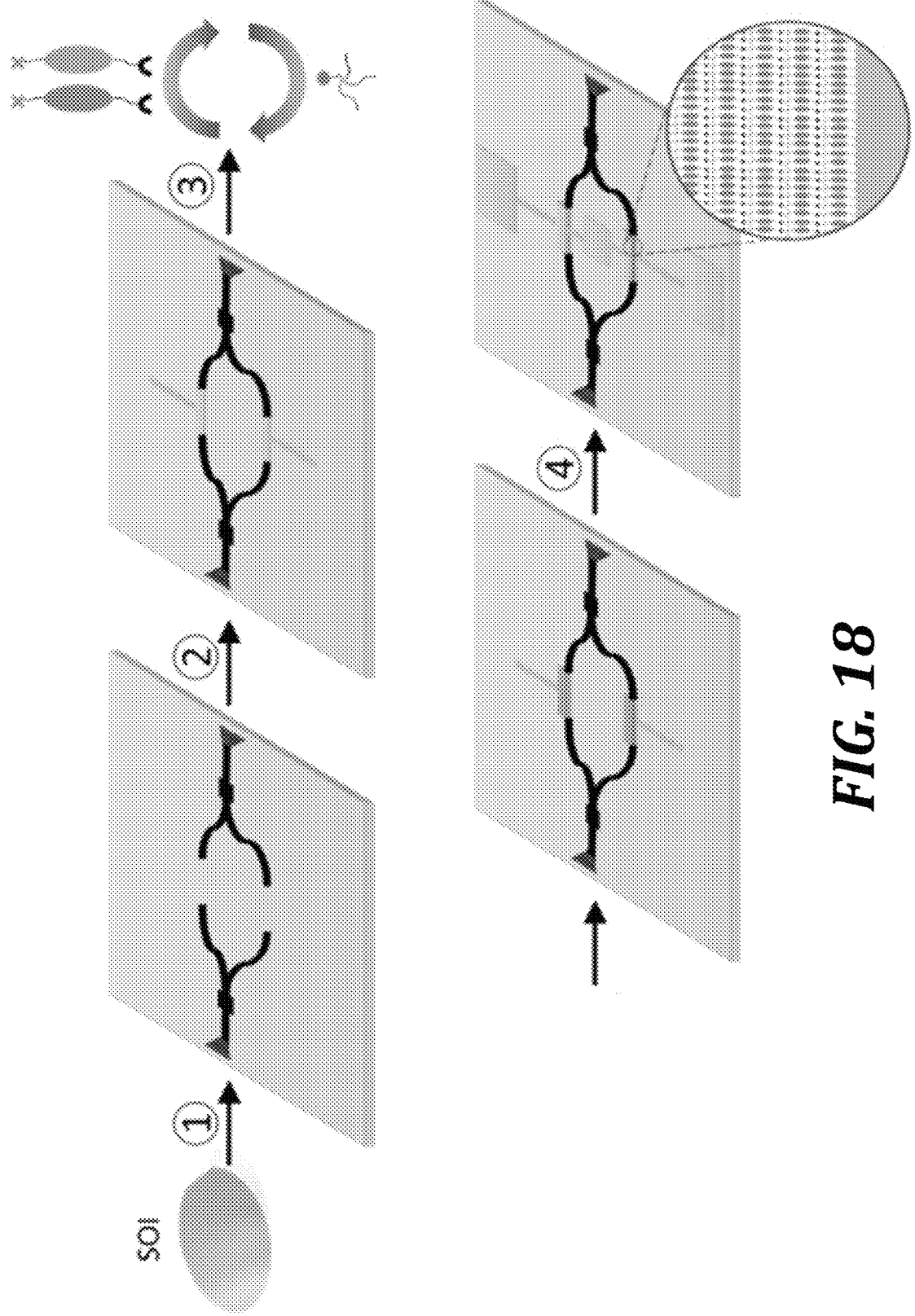
FIG. 18. POH MZM fabrication. 1) Silicon waveguides and grating couplers are fabricated on a silicon-on-insulator wafer by photolithography. 2) Gold active region bottom electrodes and contact lines are deposited and patterned by e-beam evaporation and lift-off lithography. 3) OEO material deposited by Sequential Synthesis. 4) Deposition and patterning of top gold electrodes by e-beam evaporation and dry etching.

FIG. 18 describes the building of multiple layers of chromophore. A foundation to build more layers of chromophore with the monolayer of chromophore emplaced on the surface of the electrode as described in FIGS. 19-21. The azide moiety is similar to dienophiles and capable of reacting with an alkyne in a 3+2 cycloaddition. The cycloaddition reaction allows for subsequent layers of chromophore to be built sequentially, up to many thousands (FIG. 17). A solgel glass separates each layer. The layers of chromophore can be processed using solution techniques.

Figure 22:
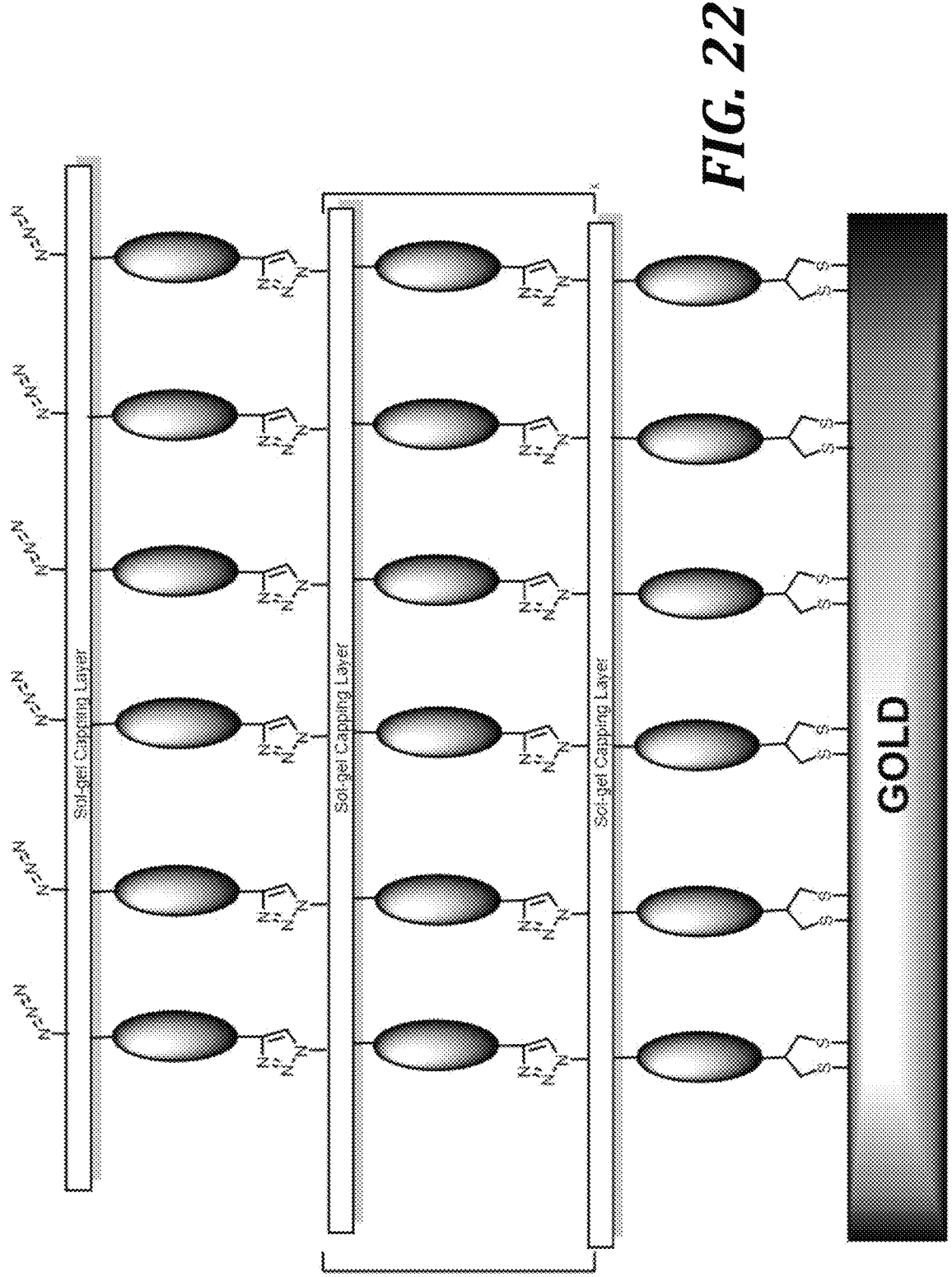
FIG. 22. The azide surface functionalization from FIGS. 19-21 is contacted with a NGS, ZGS, NGS/ZGS blend, or NGS-ZGS dimer chromophore with alkyne functionality. The alkyne reacts with the azide in a 3+2 cycloaddition reaction. The reaction imparts a second layer of NGS, ZGS, NGS/ZGS blend, or NGS-ZGS dimer chromophore and orients the chromophores in non-centrosymmetric order. The donor end of the NGS-ZGS dimer chromophore is contacted with 3-azopropyltrimethoxysilane and catena-octachlorotrisiloxane to cap the donor with a solgel glass with azide surface functionalization. Repeated reactions build layer upon layer of NGS, ZGS, NGS/ZGS blend, or NGS-ZGS dimer chromophore with solgel glass separating each layer of NGS, ZGS, NGS/ZGS blend, or NGS-ZGS dimer chromophore with the terminal layer surface functionalized with azide moieties.

The final layer of chromophore emplaced allows for a surface with a moiety that is capable of forming a bond with the next overlying surface be it another chromophore layer or the electrode surface (FIG. 22).

Figure 23:
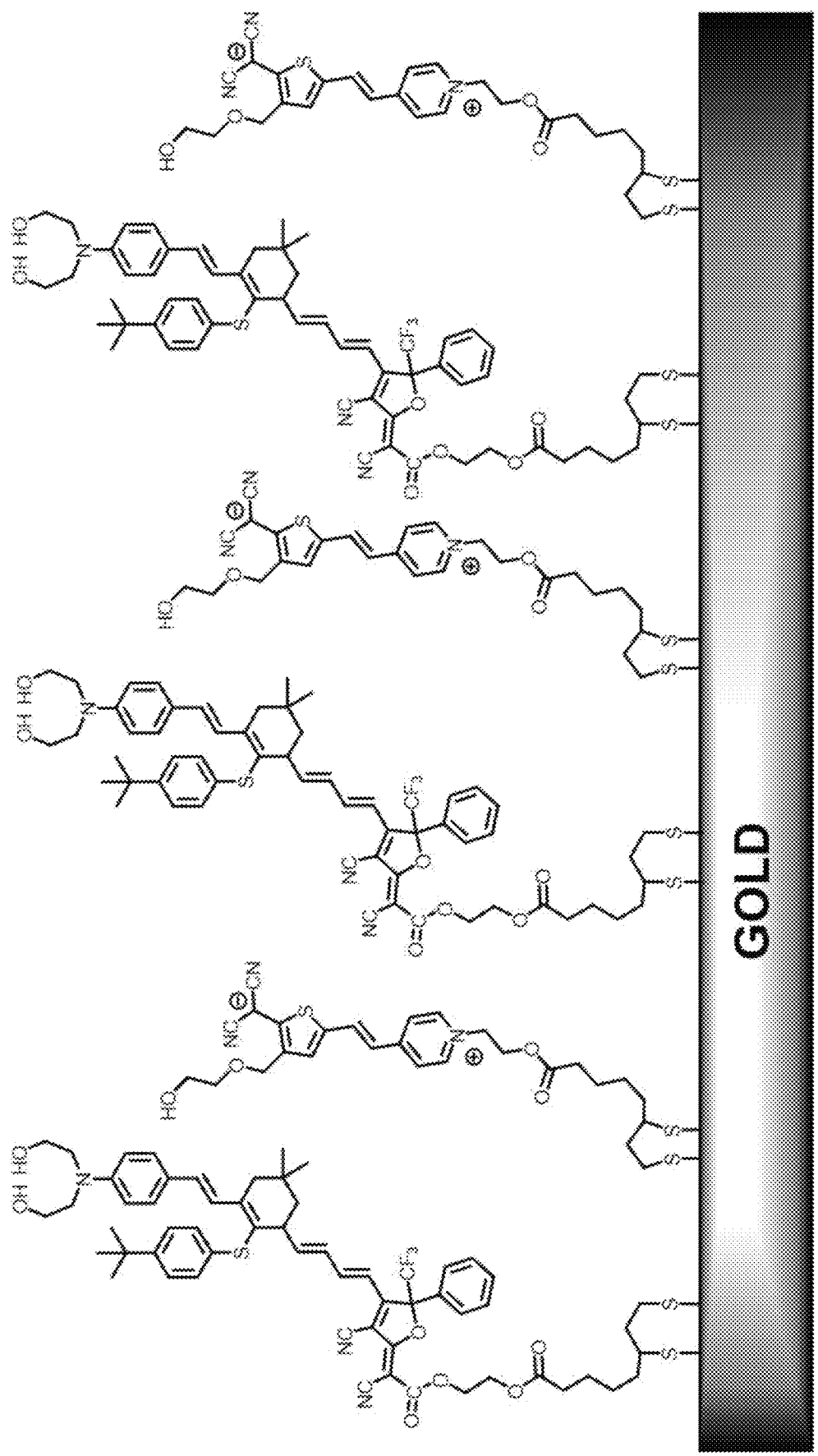
FIG. 23. NGS/ZGS blend of chromophores are shown to be grown from and bonded to a gold surface through sulfur-gold bonds with the NGS/ZGS blend of chromophores prior to being capped with 3-azopropyltrimethoxysilane and catena-octachlorotrisiloxane. Succeeding layers of chromophore can be grown from the NGS/ZGS blend sequentially.

FIG. 23 shows the adaptability of the sequential synthesis method. FIG. 21 shows a NGS-ZGS dimer chromophore on an electrode surface. FIG. 23 shows a blend of NGS and ZGS chromophores on the electrode surface. The blend can be a monolayer on the electrode surface. The blend can be contacted with 3-azopropyltrimethoxysilane and catena-octachlorotrisiloxane to place a solgel cap. The blend can be contacted with further chromophores to sequentially had further layers of chromophore up to many thousands of layers.

Figure 24:
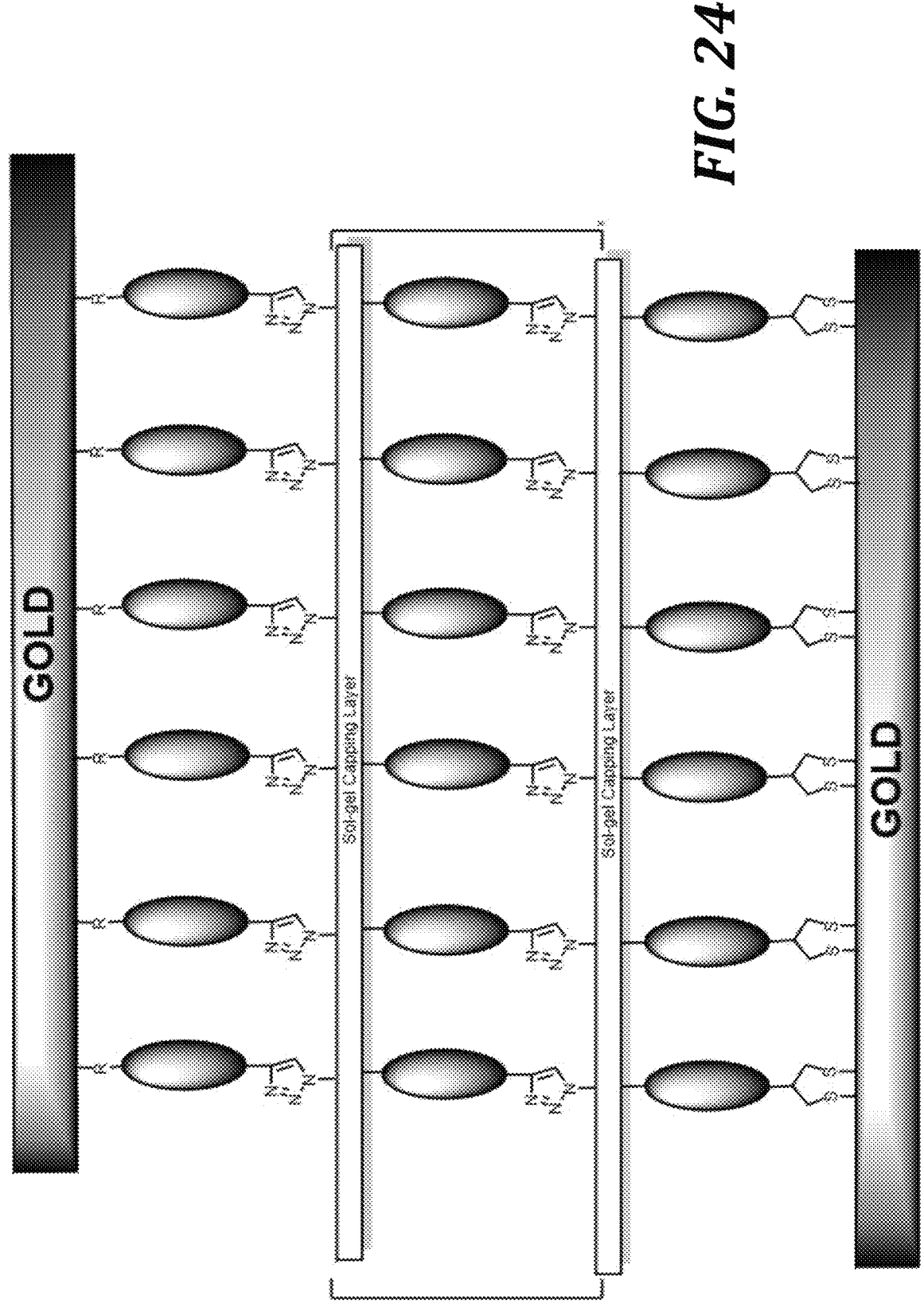
FIG. 24. The many layers of NGS, ZGS, NGS/ZGS blend, or NGS-ZGS dimer chromophore with the terminal layer of chromophore with R moieties is vapor deposited with gold. The R moieties and gold may or may not interact with each other. The R moieties may be alkyl, aryl, heteroalkyl, heteroaryl, hydroxyl, thiol, selenol, amino, dithiolane, azide, F, Cl, Br, I), OR, $NR_2$, SR, $SO_2R$, $SO_2NR_2$, $NRSO_2R$, $NRCONR_2$, NRC(O)OR, NRC(O)R, CN, C(O)OR, C(O)$NR_2$, OC(O)R, C(O)R, and $NO_2$, wherein each R is independently H, C1-C8 alkyl, C2-C8 heteroalkyl, C2-C8 alkenyl, C2-C8 heteroalkenyl, C2-C8 alkynyl, C2-C8 heteroalkynyl, C6-C10 aryl, C5-C10 heteroaryl, C7-C12 arylalkyl, or C6-C12 heteroarylalkyl. The result is a stack of many layers of NGS, ZGS, NGS/ZGS blend, or NGS-ZGS dimer chromophore sandwiched between two gold electrode and the many layers of NGS, ZGS, NGS/ZGS blend, or NGS-ZGS dimer chromophore are chemically bonded to the gold electrodes through gold-sulfur bonds.

FIG. 24 shows the stack of chromophore layers vapor deposited with gold and the subsequent sulfur-gold bond. The result is a multi-layered stack of chromophore units that are non-centrosymmetric in order and chemically bonded to each other and the gold electrode surface.

Figure 25:
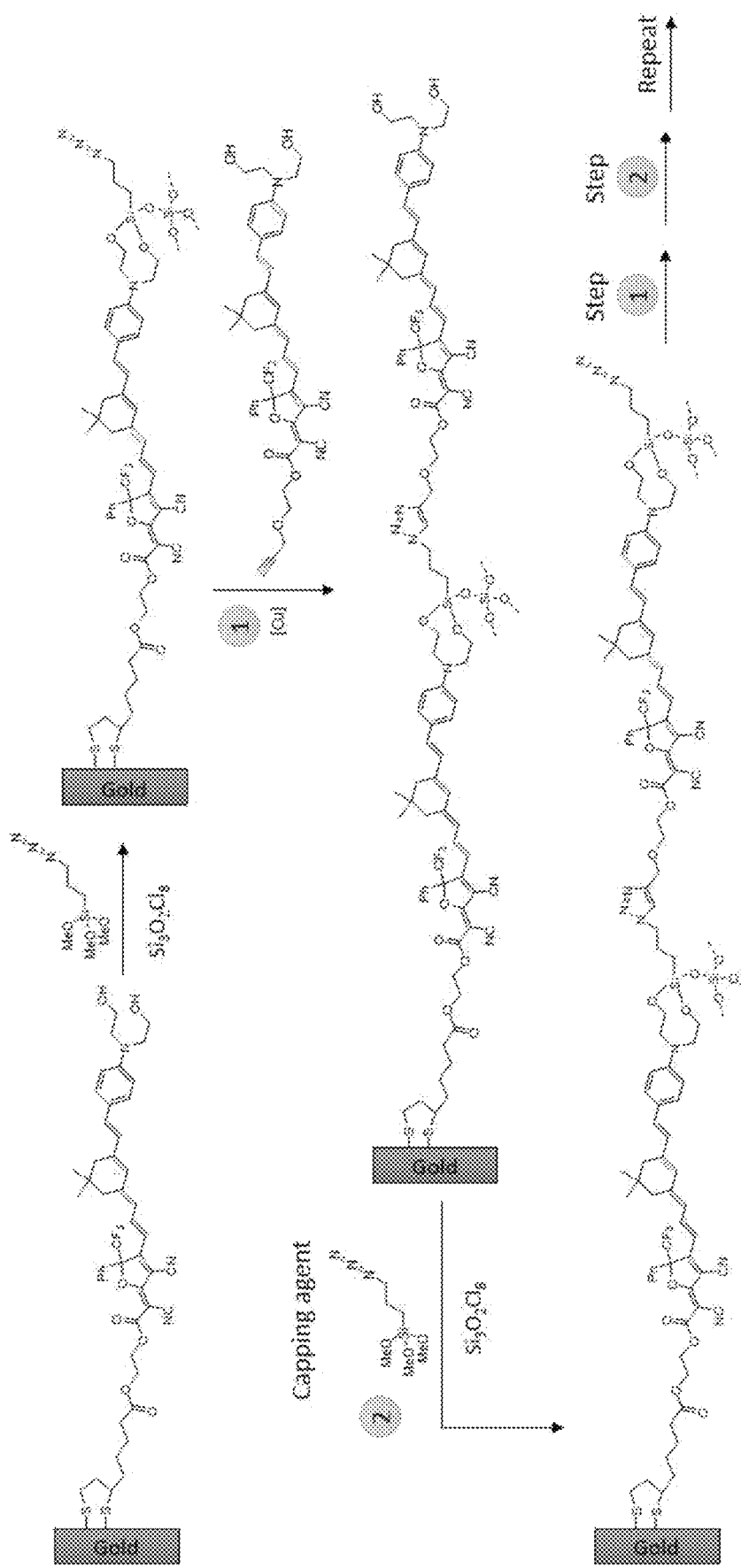
FIG. 25. Sequential Synthesis using azide-alkyne and siloxane chemistry is used to build macromolecular layered structures of chromophore in non-centrosymmetric order. The sequence of reactions involves bonding to an electrode surface and putting on a capping solgel glass layer. At step 1 a chromophore with alkyne functional tail is contacted with the azide on the surface of the solgel glass and a subsequent 3+2 cycloaddition to place another chromophore layer. At step 2 a new capping solgel glass layer with azide moieties on the surface is emplaced. Steps 1 and 2 are repeated and a composite structure consisting of up to many thousands of layers of chromophore is built sequentially.

FIG. 25 shows the Sequential Synthesis using azide-alkyne and siloxane chemistry is used to build macromolecular layered structures of chromophore in non-centrosymmetric order. A chromophore with a tail with a moiety containing sulfur is contacted with a gold electrode surface. The sulfur bonds to the gold emplacing the chromophore on the surface of the electrode. A capping layer is added to the chromophore by contacting the head of the chromophore with 3-azopropyltrimethoxysilate and catena-octachlorotrisiloxane. A solgel glass capping the chromophore layer results with the solgel glass having azide surface moieties. 1.) A chromophore with alkyne functional tail is contacted with the azide on the surface of the solgel glass. A 3+2 cycloaddition takes place between the azide and alkyne in a reaction catalyzed by copper. 2.) A capping layer is added to the chromophore by contacting the head of the chromophore with 3-azopropyltrimethoxysilate and catena-octachlorotrisiloxane. A solgel glass capping the chromophore layer results with the solgel glass having azide surface moieties. Steps 1 and 2 are repeated to build up to many thousands of layers of chromophore sequentially.

In the foregoing description, specific details are set forth to provide a thorough understanding of representative embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

As used herein, the terms "alkyl," "alkenyl," and "alkynyl" include straight-chain, branched-chain, and cyclic monovalent hydrocarbyl radicals, and combinations of these, which contain only C and H when they are unsubstituted. Examples include methyl, ethyl, isobutyl, cyclohexyl, cyclopentylethyl, 2-propenyl, 3-butynyl, and the like. The total number of carbon atoms in each such group is sometimes described herein, e.g., when the group can contain up to ten carbon atoms it can be disclosed as 1-10C, as C1-C10, C-C10, or C1-10.

The terms "heteroalkyl," "heteroalkenyl," and "heteroalkynyl," as used herein, mean the corresponding hydrocarbons wherein one or more chain carbon atoms have been replaced by a heteroatom. Exemplary heteroatoms include N, O, S, and P. When heteroatoms are allowed to replace carbon atoms, for example, in heteroalkyl groups, the numbers describing the group, though still written as e.g. C3-C10, represent the sum of the number of carbon atoms in the cycle or chain and the number of such heteroatoms that are included as replacements for carbon atoms in the cycle or chain described.

Typically, the alkyl, alkenyl, and alkynyl substituents contain 1-20 carbon atoms (alkyl) or 2-10 carbon atoms (alkenyl or alkynyl). Preferably, they contain 1-10 carbon atoms (alkyl) or 2-10 carbon atoms (alkenyl or alkynyl). A single group can include more than one type of multiple bond, or more than one multiple bond, such groups are included within the definition of the term "alkenyl" when they contain at least one carbon-carbon double bond, and are included within the term "alkynyl" when they contain at least one carbon-carbon triple bond. As used herein, the terms "cycloalkyl," "cycloalkenyl," and "cycloalkynyl" specifically refer to cyclic alkyls, alkenyls, and alkynyls, respectively.

As used herein, the terms "alkylene," "alkenylene," and "alkynylene" can include straight-chain, branched-chain, and cyclic divalent hydrocarbyl radicals, and combinations thereof. As used herein, the terms "cycloalkylene," "cycloalkenylene," and "cycloalkynylene" specifically refer to cyclic divalent hydrocarbyl radicals.

Alkyl, alkenyl, and alkynyl groups can be optionally substituted to the extent that such substitution makes sense chemically. Typical substituents include, but are not limited to, halogens (F, Cl, Br, I), =O, =N—CN, =N—OR, =NR, OR, NR$_2$, SR, SO$_2$R, SO$_2$NR$_2$, NRSO$_2$R, NRCONR$_2$, NRC(O)OR, NRC(O)R, CN, C(O)OR, C(O)NR$_2$, OC(O)R, C(O)R, and NO$_2$, wherein each R is independently H, C1-C8 alkyl, C2-C8 heteroalkyl, C1-C8 acyl, C2-C8 heteroacyl, C2-C8 alkenyl, C2-C8 heteroalkenyl, C2-C8 alkynyl, C2-C8 heteroalkynyl, C6-C10 aryl, or C5-C10 heteroaryl, and each R is optionally substituted with halogens (F, Cl, Br, I), =O, =N—CN, =N—OR', =NR', OR', NR'$_2$, SR', SO$_2$R', SO$_2$NR'$_2$, NR'SO$_2$R', NR'CONR'$_2$, NR'C(O)OR', NR'C(O)R', CN, C(O)OR', C(O)NR'$_2$, OC(O) R', C(O)R', and NO$_2$, wherein each R' is independently H, C1-C8 alkyl, C2-C8 heteroalkyl, C1-C8 acyl, C2-C8 heteroacyl, C6-C10 aryl or C5-C10 heteroaryl. Alkyl, alkenyl, and alkynyl groups can also be substituted by C1-C8 acyl, C2-C8 heteroacyl, C6-C10 aryl or C5-C10 heteroaryl, each of which can be substituted by the substituents that are appropriate for the particular group.

While "alkyl" as used herein includes cycloalkyl and cycloalkylalkyl groups, the term "cycloalkyl" is used herein to describe a carbocyclic non-aromatic group that is connected via a ring carbon atom, and "cycloalkylalkyl" is used to describe a carbocyclic non-aromatic group that is connected to the molecule through an alkyl linker. Similarly, "heterocyclyl" is used to identify a non-aromatic cyclic group that contains at least one heteroatom as a ring member and that is connected to the molecule via a ring atom, which may be C or N; and "heterocyclylalkyl" may be used to describe such a group that is connected to another molecule through an alkylene linker. As used herein, these terms also include rings that contain a double bond or two, as long as the ring is not aromatic.

"Aromatic" or "aryl" substituent or moiety refers to a monocyclic or fused bicyclic moiety having the well-known characteristics of aromaticity; examples include phenyl and naphthyl. Similarly, the terms "heteroaromatic" and "heteroaryl" refer to such monocyclic or fused bicyclic ring systems which contain as ring members one or more heteroatoms. Suitable heteroatoms include N, O, and S, inclusion of which permits aromaticity in 5-membered rings as well as 6-membered rings. Typical heteroaromatic systems include monocyclic C5-C6 aromatic groups such as pyridyl, pyrimidyl, pyrazinyl, thienyl, furanyl, pyrrolyl, pyrazolyl, thiazolyl, oxazolyl, and imidazolyl, and fused bicyclic moieties formed by fusing one of these monocyclic groups with a phenyl ring or with any of the heteroaromatic monocyclic groups to form a C8-C10 bicyclic group such as indolyl, benzimidazolyl, indazolyl, benzotriazolyl, isoquinolyl, quinolyl, benzothiazolyl, benzofuranyl, pyrazolopyridyl, quinazolinyl, quinoxalinyl, cinnolinyl, and the like. Any monocyclic or fused ring bicyclic system which has the characteristics of aromaticity in terms of electron distribution throughout the ring system is included in this definition. It also includes bicyclic groups where at least the ring which is directly attached to the remainder of the molecule has the characteristics of aromaticity. Typically, the ring systems contain 5-12 ring member atoms. Preferably, the monocyclic heteroaryls contain 5-6 ring members, and the bicyclic heteroaryls contain 8-10 ring members.

Aryl and heteroaryl moieties can be substituted with a variety of substituents including C1-C8 alkyl, C2-C8 alkenyl, C2-C8 alkynyl, C5-C12 aryl, C1-C8 acyl, and heteroforms of these, each of which can itself be further substituted; other substituents for aryl and heteroaryl moieties include halogens (F, Cl, Br, I), OR, NR$_2$, SR, SO$_2$R, SO$_2$NR$_2$, NRSO$_2$R, NRCONR$_2$, NRC(O)OR, NRC(O)R, CN, C(O)OR, C(O)NR$_2$, OC(O)R, C(O)R, and NO$_2$, wherein each R is independently H, C1-C8 alkyl, C2-C8 heteroalkyl, C2-C8 alkenyl, C2-C8 heteroalkenyl, C2-C8 alkynyl, C2-C8 heteroalkynyl, C6-C10 aryl, C5-C10 heteroaryl, C7-C12 arylalkyl, or C6-C12 heteroarylalkyl, and each R is optionally substituted as described above for alkyl groups. The substituent groups on an aryl or heteroaryl group may of course be further substituted with the groups described herein as suitable for each type of such substituents or for each component of the substituent. Thus, for example, an arylalkyl substituent may be substituted on the aryl portion with substituents described herein as typical for aryl groups, and it may be further substituted on the alkyl portion with substituents described herein as typical or suitable for alkyl groups.

"Optionally substituted," as used herein, indicates that the particular group described may have one or more hydrogen substituents replaced by a non-hydrogen substituent. In some optionally substituted groups or moieties, all hydrogen substituents are replaced by a non-hydrogen substituent, e.g., C1-C6 alkyl, C2-C6 heteroalkyl, alkynyl, halogens (F, Cl, Br, I), $N_3$, OR, $NR_2$, $SiR_3$, $OSiR_3$, SR, $SO_2R$, $SO_2NR_2$, $NRSO_2R$, $NRCONR_2$, NRC(O)OR, NRC(O)R, CN, C(O)OR, C(O)$NR_2$, OC(O)R, C(O)R, oxo, and $NO_2$, wherein each R is independently H, C1-C6 alkyl, C6-C10 aryl, or C2-C6 heteroalkyl. Where an optional substituent is attached via a double bond, such as a carbonyl oxygen or oxo (=O), the group takes up two available valences, so the total number of substituents that may be included is reduced according to the number of available valences. In some embodiments, the optional non-hydrogen substituent is OSiRR'R", wherein R, R', and R' are independently H, C1-C10 alkyl, or C6-C10 aryl.

The present application may use the term DONOR, BRIDGE, and ACCEPTOR. High hyperpolarizability chromophores typically have a donor-x bridge-acceptor (D-x-A) structure, containing an electron donating moiety such as a substituted amine group which is a donor, an electron-accepting moiety containing strong electron-withdrawing groups such as cyano (CN) or nitro (NO2) which is an acceptor, and the donor and acceptor are connected by a z-conjugated linker which is a bridge, often containing ene/polyene and/or heteroaromatic groups, such as a D-z bridge-A chromophore.

The present application may use the term MOIETY. A moiety is a chemical entity that imparts a particular functionality and/or reactivity. A moiety can be singular atoms, or larger chemical structures and/or molecules. The present application may use the term HEAD. The head relates to electrooptic chromophores. The head consists of the donor, the donor group, reactive moieties bonded to the donor, the donor that has been capped, the donor that has been protected, the donor that has been protected with a cap and also when the cap is a polymer, solgel, solgel glass or with the solgel glass with surface moieties. The present application may use the term TAIL. The tail is a structural entity that is terminated with functional groups and the structural entity connects the tail terminal groups with the acceptor. The tail can be alkyl, alkenyl, alkynyl, heteroacyl, heteroalkenyl, alkynyl, heteroalkynyl, cycloalkylalkyl, cycloalkyl, heterocyclyl, heterocyclylalkyl, aromatic, aryl, herteroaromatic, and heteroaryl.

The present application may use the term NEUTRAL. Neutral in relation to chromophores is a molecular entity that has no full separated charges. A neutral molecular entity may a dipoles that are either positive, negative or both positive and negative and with the positive and negative dipoles separated. The present application may use the term ZWITTERION. A zwitterion is a chromophore or molecular entity with a full positive charge in perpetuity and a full negative charge in perpetuity that are separated. There can be electronic intramolecular communication between the full positive charge and full negative charge. The present application may use the term DIMER. In the present application a dimer is a chromophore or molecular entity that comprises of a neutral and a zwitterion with the neutral and zwitterion molecular species commonly connected through a single structural unit. The dipoles of the neutral part of the dimer and the charges of the zwitterion part of the dimer can either align with each other or oppose with each other.

The present application may use the term SUBSTRATE. The substrate is an entity on which the layers described in this application are built. The substrate is often a metal or semimetals but can also be nonmetals, salts, molecules, macromolecules and ceramics. The tail or head can be configured to interact with the substance of the substrate. In this way the layers of chromophore can be configured to be SUBSTRATE-ACCEPTOR-n BRIDGE-DORNOR or SUBSTRATE-DONOR-7 BRIDGE-ACCEPTOR.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this document, the same or similar elements may bear the same references. Furthermore, the presence of reference numbers or letters in the drawings cannot be considered limiting, even when such numbers or letters are indicated in the claims.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

While illustrative embodiments have been illustrated and described, it will be appreciated that various changes can be made therein without departing from the spirit and scope of the disclosure.

The invention claimed is:

1. A film comprising a plurality of electrooptic chromophores, a first layer of the electrooptic chromophores bonded to a substrate in a first layer, such that the substrate imparts non-centrosymmetric order onto the electrooptic chromophores, the plurality of electrooptic chromophores including a plurality of least one neutral ground state (NGS) chromophore and a plurality of at least one zwitterionic ground state (ZGS) chromophore;

wherein the least one NGS chromophore comprises:
a head;
a donor;
a bridge;
an acceptor;
a tail;

wherein the head is a reactive group that is covalently bonded to the donor and is configured to react with the underlying surface or a capping agent that supplies a functional group;
wherein the donor is a group that has excess electron density and allows for connection to the head;
wherein the bridge electronically communicates between the donor and acceptor;
wherein the acceptor is deficient in electron density and allows for connection to the tail;
wherein the tail is a reactive group that is covalently bonded to the acceptor and is configured to react with the underlying surface or a capping agent that supplies a functional group; and
wherein the head and tail are configured to allow for sequential polymerization of the least one NGS electrooptic chromophore in non-centrosymmetric alignment; and
wherein the least one ZGS chromophore comprises:
a head;
a donor;
a bridge;
an acceptor;
a tail;
wherein the head is a reactive group that is covalently bonded to the donor and is configured to react with the underlying surface or a capping agent that supplies a functional group;
wherein the donor is a group that has excess electron density and allows for connection to the head;
wherein the bridge electronically communicates between the donor and acceptor;
wherein the acceptor is deficient in electron density and allows for connection to the tail;
wherein the tail is a reactive group that is covalently bonded to the acceptor and is configured to react with the underlying surface or a capping agent that supplies a functional group;
wherein the head and tail allow for sequential polymerization of the electrooptic chromophore; and
wherein one side of the chromophore perpetually carries a positive charge, one side of the chromophore perpetually carries a negative charge and the positive charge and negative charge are separated by the bridge.

2. The film according to claim 1, wherein the least one NGS electrooptic chromophore head has an alkene, alkyne, hydroxyl, trifluorovinylether, diene, propadiene, or azide group.

3. The film according to claim 1, wherein the least one NGS electrooptic chromophore the bridge has a structure:

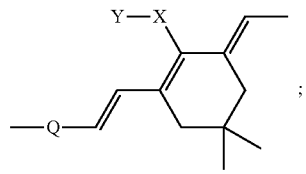

wherein Q is selected from the group consisting of vinyl, aryl, fused aryl, heteroaryl, and fused heteroaryl; X is selected from the group consisting of H, O, S, Se, Te, NH, PH, and AsH; and Y is selected from the group consisting of absent, H, C1-10 alkyl, phenyl, benzyl, C1-10 alkyl substituted phenyl, C1-10 substituted benzyl, and O-tert-butyldiphenylsilyl (OTBDPS).

4. The film according to claim 1, wherein the acceptor has a structure:

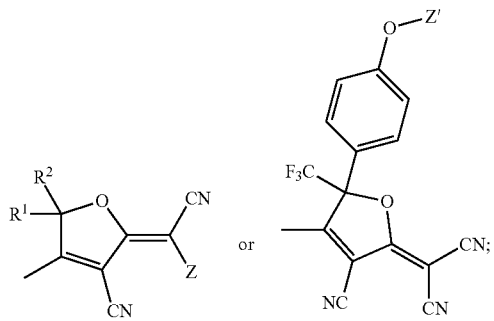

wherein R1 and R2 are independently selected from the group consisting of methyl, trifluoromethyl, ethyl, pentafluoroethyl, phenyl, pentafluorophenyl, and perfluoroalkyl; and Z or Z' is a structural unit which allows for forming a covalent bond with the tail.

5. The film according to claim 1, wherein the least one NGS electrooptic chromophore tail has an alkene, alkyne, hydroxyl, trifluorovinylether, diene, propadiene, or azide group.

6. The film according to claim 1, wherein the film is sol-gel capped and the least one NGS electrooptic chromophore has a structure:

(VIII)

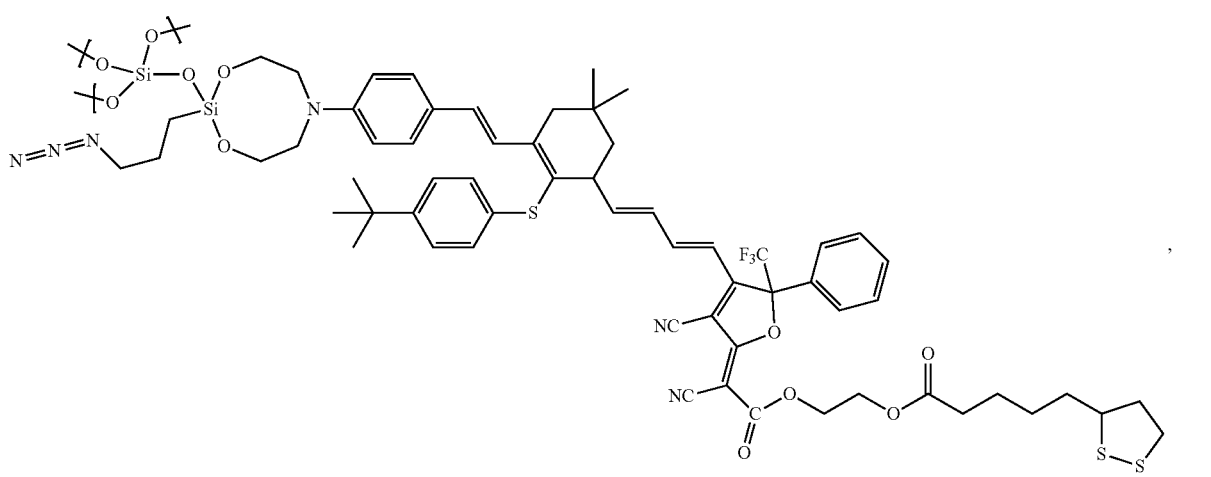

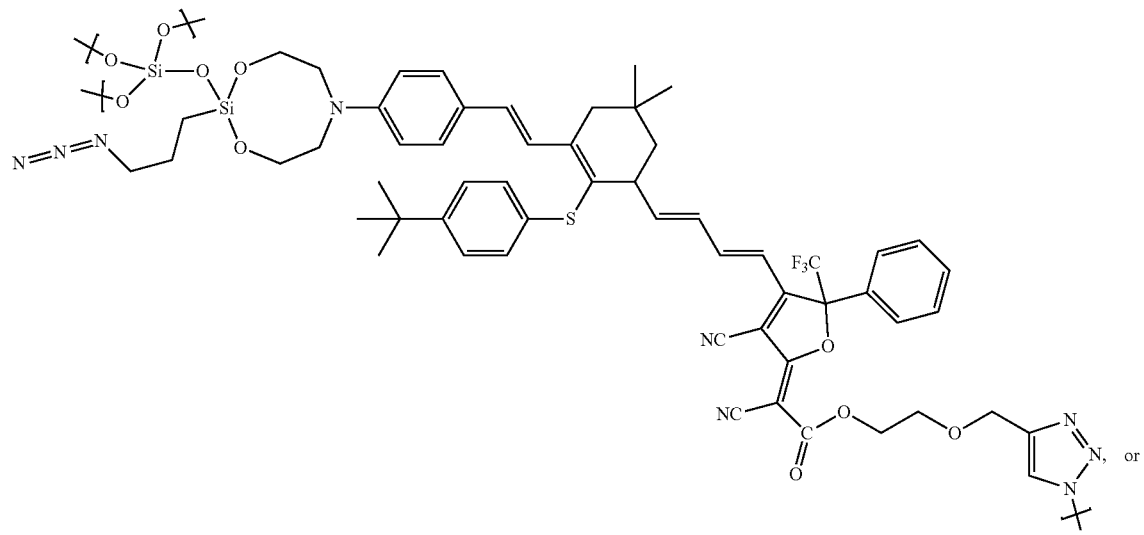
(XIX)
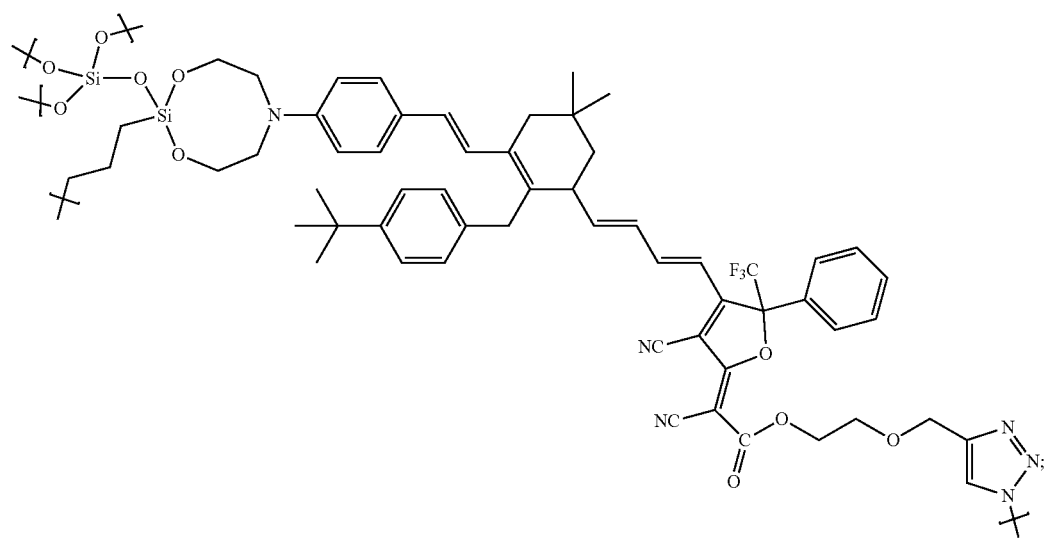
(X)
wherein the sulfur can be bonded to a substrate.
7. The film according to claim 1, wherein the least one ZGS chromophore cation is carbocation, ammonium, pyridinium, phosphonium, phosphininium or borinine.
8. The film according to claim 1, wherein the least one ZGS chromophore is sol-gel capped and has the structure:

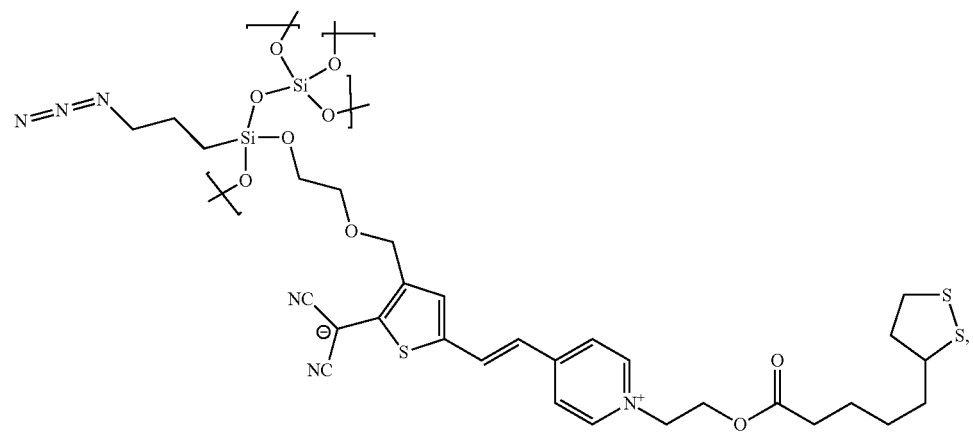
(XV)
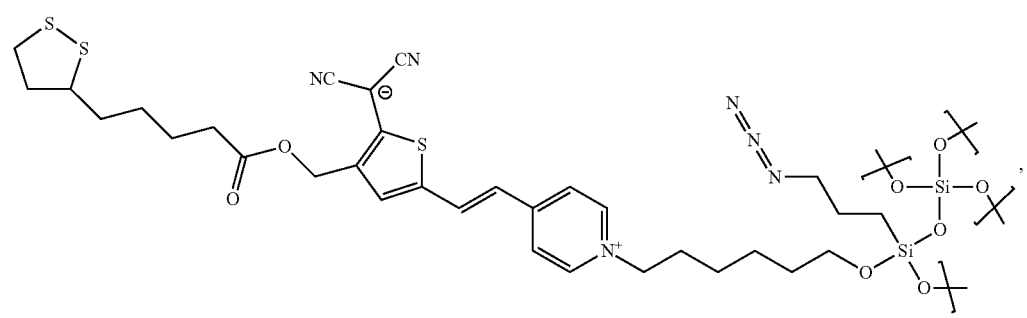
(XVI)
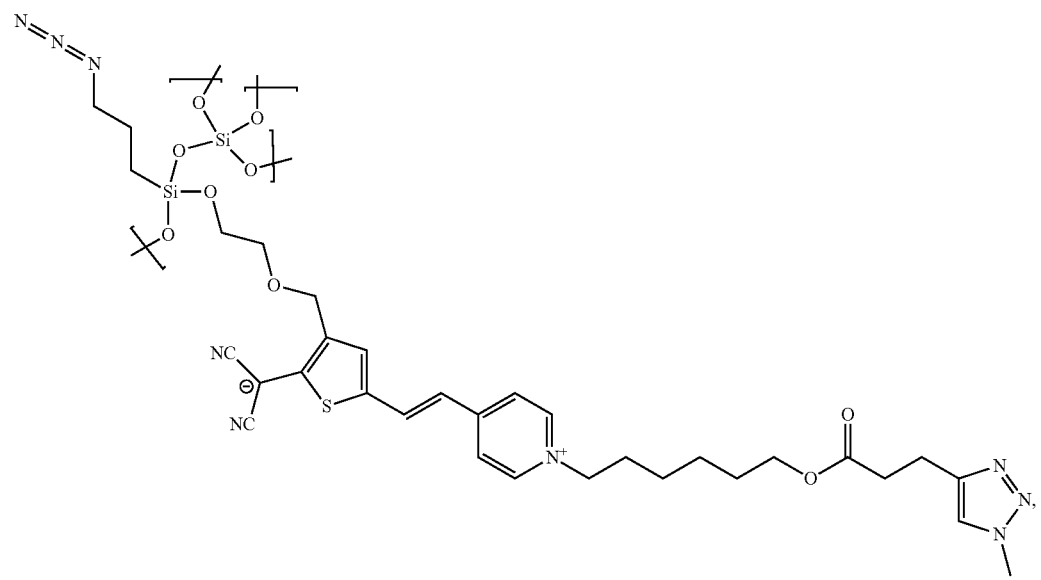
(XVII)

(XIX)

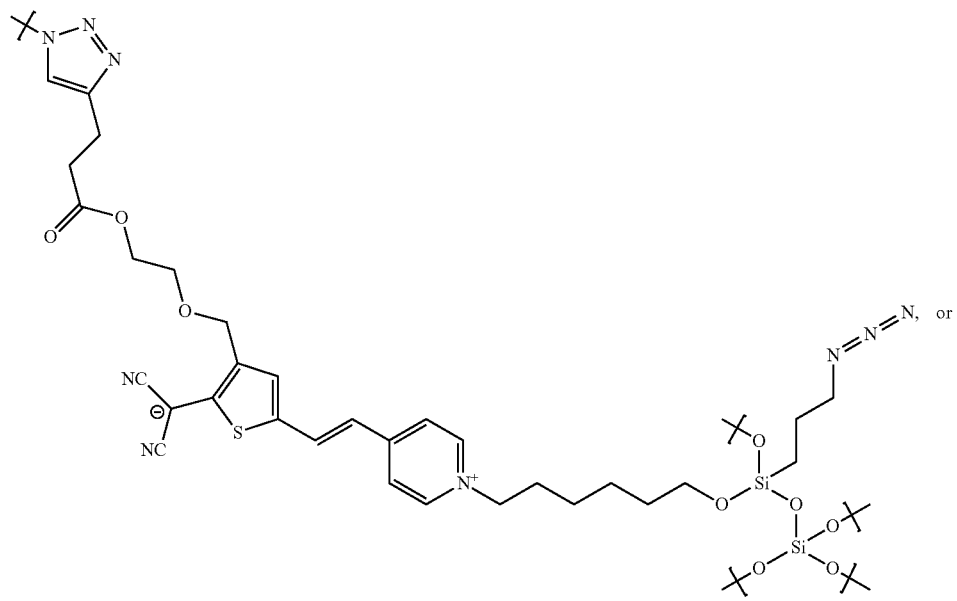

(XX)

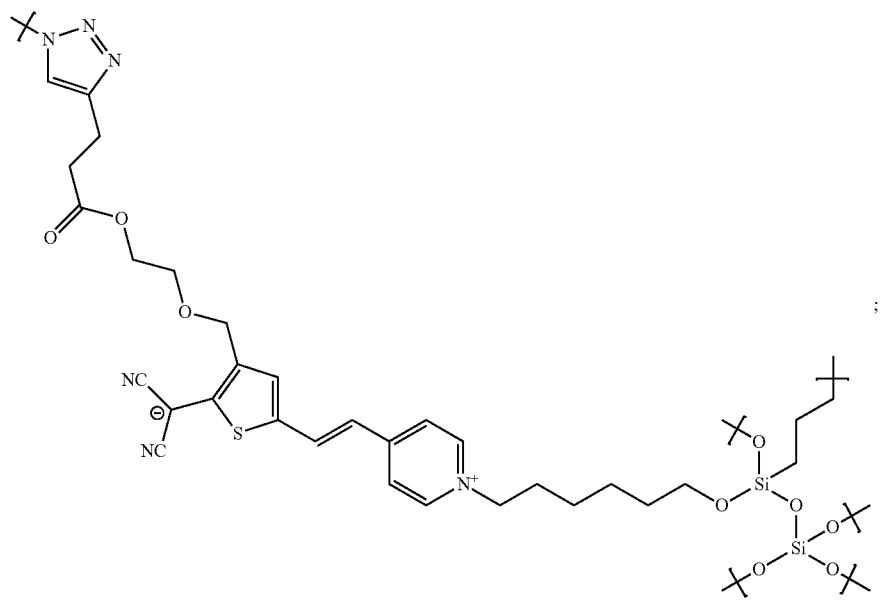

where in the sulfur can be bonded to a substrate.

9. The film according to claim 1, wherein at least some of the least one NGS chromophores and at least some of the least one ZGS chromophores are present in the form of chromophore dimers that include both an the least one NGS chromophore portion and a the least one ZGS chromophore portion bound together through at least one common structural unit.

10. The film according to claim 9, wherein the chromophore dimer common structural unit is aryl, bisaryl, trisaryl, teraryl, pentaryl, hexaryl, fused aryl, heteroaryl, bisheteroaryl, trisheteroaryl, terheteroaryl, pentheteroaryl, hexheteroaryl, or fused heteroaryl with at least 4 substituents.

11. The film according to claim 10, wherein the chromophore dimer is sol-gel capped and has a structure:

(XXVI)
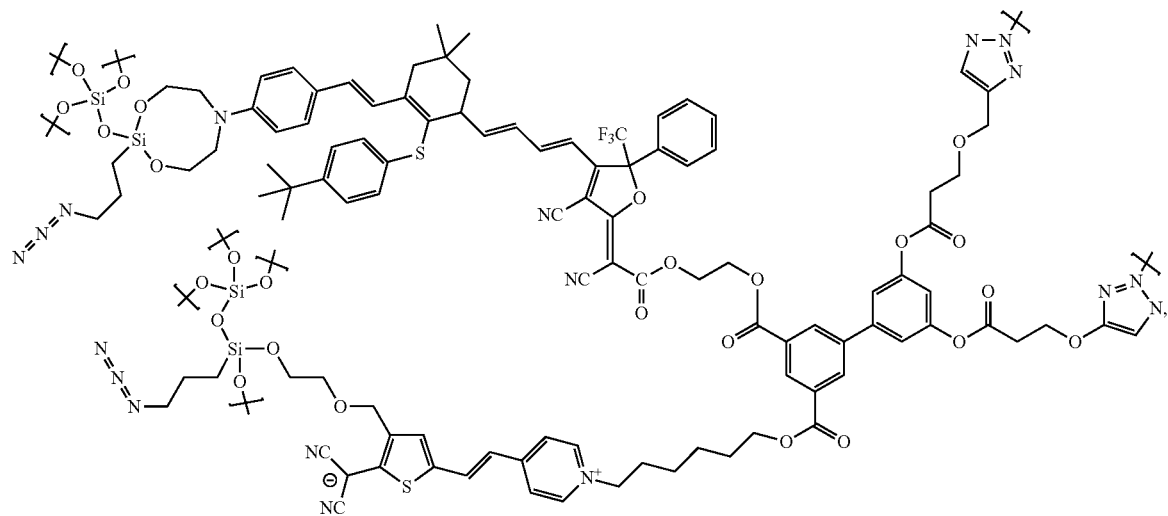
(XXVII)
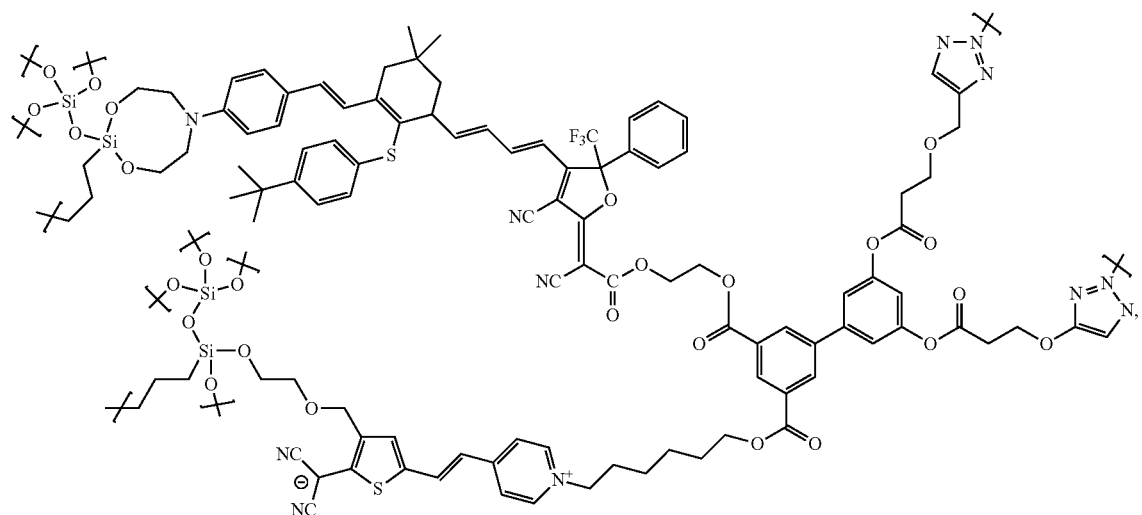
(XXVIII)
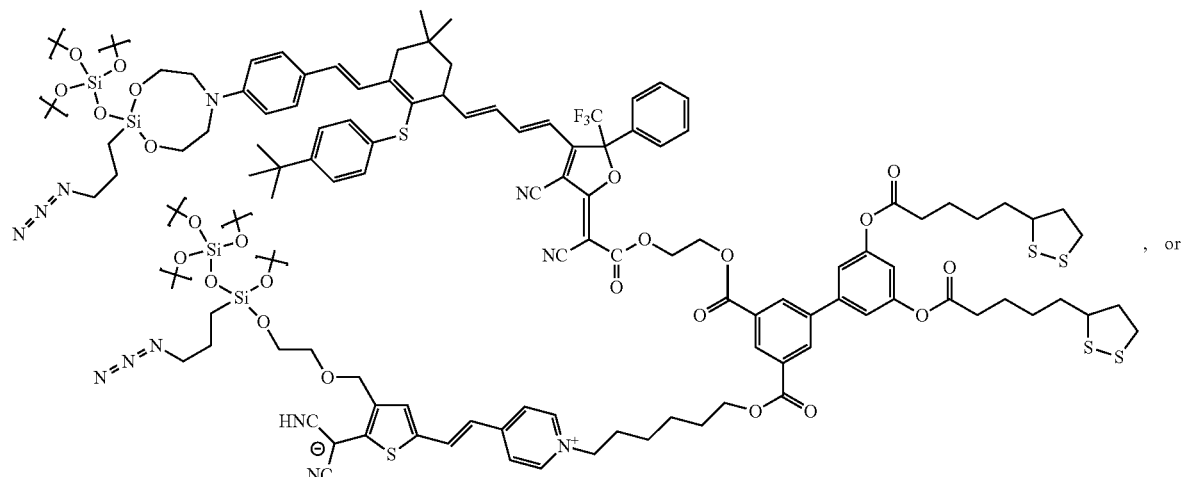
, or (XXIX)

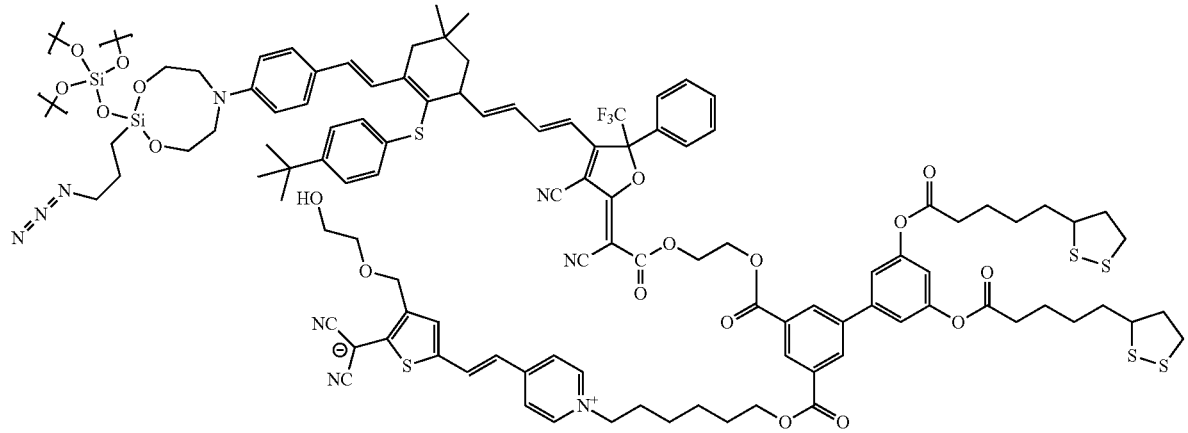

12. The film of according to claim 1, further comprising a second layer, that includes a plurality of least one NGS chromophore and a plurality of at least one ZGS chromophore, covalently bonded to the first layer, such that the non-centrosymmetric order is maintained in the second layer of chromophores.

13. The film according to claim 12, formed by a cycloaddition reaction between (a) in the layer a first polarizable chromophore comprising at least two first reactive groups crosslinkable by sol-gel followed by cycloaddition and (b) in the second layer a second polarizable chromophore comprising one or more compounds comprising at least two counterpart reactive groups.

14. The film according to claim 1, wherein the first layer is capped with a sol-gel glass that the second layer is bonded to.

15. The film according to claim 14, wherein the sol-gel glass comprises of 3-azopropyltrimethoxysilane and catena-octachlorotrisiloxane.

16. The film according to claim 1, wherein the film has a crosslinked structure between the least one NGS chromophores and the least one ZGS chromophores.

17. The film of according to claim 1, wherein the film comprises of 1-2000 layers of chromophores.

18. The film according to claim 1, wherein the substrate comprises a metal, silicon, or a silicon oxide that the first layer of chromophore is bonded to.

19. The film according to claim 1, wherein the film has an electrooptic coefficient r33 value of about 100 pm/V or greater.

20. A device comprising a film according to claim 1, wherein the substrate includes a first electrode that the first layer of electrooptic chromophores is bonded to, wherein the device is selected from an electro-optic modulator, antenna, Mach-Zehnder modulator, phase modulator, silicon-organic hybrid modulator, plasmonic-organic hybrid modulator, electrical-to-optical convertor, terahertz detector, frequency shifter, spatial light modulator, and frequency comb source.

* * * * *